United States Patent
Inoue et al.

(10) Patent No.: US 10,610,833 B2
(45) Date of Patent: Apr. 7, 2020

(54) FUNCTIONAL POLYMER MEMBRANE, METHOD FOR MANUFACTURING SAME, COMPOSITION FOR FORMING FUNCTIONAL POLYMER MEMBRANE, SEPARATION MEMBRANE MODULE, AND ION-EXCHANGE DEVICE

(71) Applicant: FUJIFILM Corporation, Tokyo (JP)

(72) Inventors: Kazuomi Inoue, Kanagawa (JP); Yusuke Iizuka, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 386 days.

(21) Appl. No.: 15/785,435

(22) Filed: Oct. 17, 2017

(65) Prior Publication Data

US 2018/0036689 A1 Feb. 8, 2018

Related U.S. Application Data

(63) Continuation of application No. PCT/JP2016/055294, filed on Feb. 23, 2016.

(30) Foreign Application Priority Data

Apr. 28, 2015 (JP) .................. 2015-091160
Jan. 8, 2016 (JP) .................. 2016-002525

(51) Int. Cl.
*B32B 27/32* (2006.01)
*B01D 71/40* (2006.01)
(Continued)

(52) U.S. Cl.
CPC ............. *B01D 71/40* (2013.01); *B01D 61/44* (2013.01); *B01D 69/10* (2013.01); *B01J 39/04* (2013.01);
(Continued)

(58) Field of Classification Search
CPC ....... B01D 71/40; C08F 220/56; C08F 220/58
See application file for complete search history.

(56) References Cited

U.S. PATENT DOCUMENTS

| 5,256,503 A | 10/1993 | Cook et al. |
| 2015/0259227 A1 | 9/2015 | Takamoto et al. |
| 2015/0353696 A1 | 12/2015 | Sano et al. |

FOREIGN PATENT DOCUMENTS

| JP | S63-503074 | 11/1988 |
| JP | 2000-212306 | 8/2000 |

(Continued)

OTHER PUBLICATIONS

Jung et al., "Synthesis of Crosslinkable m-Aramid Ionomer Containing Sulfonated Ether Sulfone and Their Characterization for PEMFC Membrane", 2010, Polymer (Korea), Polymer Society of Korea, vol. 34, Issue 3, pp. 202-210 (Year: 2010).*

(Continued)

*Primary Examiner* — Prashant J Khatri
*Assistant Examiner* — Zachary M Davis
(74) *Attorney, Agent, or Firm* — JCIPRNET

(57) ABSTRACT

A functional polymer membrane contains a polymer compound having a constitutional unit represented by Formula I as a constitutional unit A, a constitutional unit represented by Formula I' as a constitutional unit A', and a constitutional unit derived from a polyfunctional monomer having a C log (Continued)

P value of equal to or greater than −0.3 to less than 3.0 as a constitutional unit B.

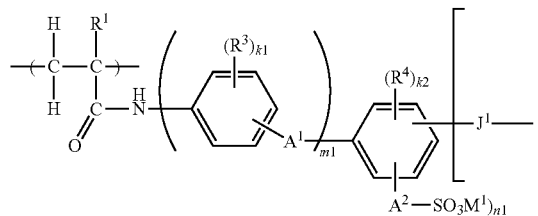

(I)

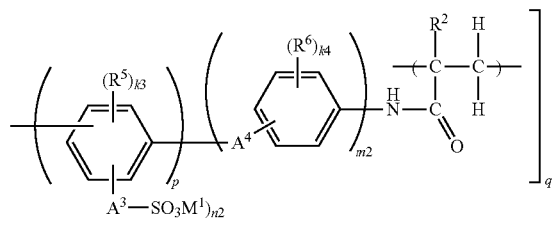

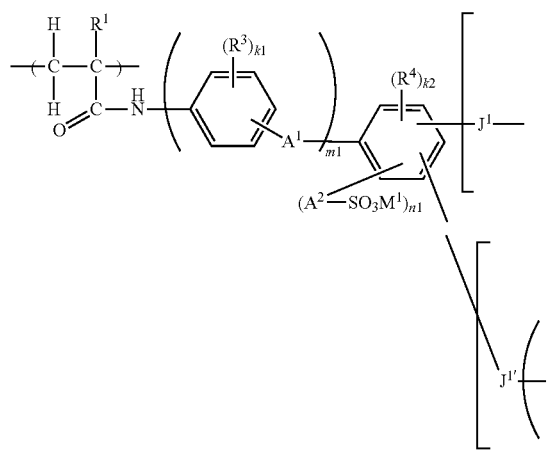

(I')

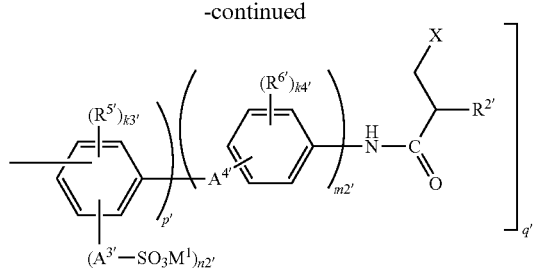

19 Claims, 1 Drawing Sheet

(51) Int. Cl.
  B01J 39/04 (2017.01)
  B01J 39/20 (2006.01)
  B01D 69/10 (2006.01)
  B01J 47/12 (2017.01)
  C08F 220/56 (2006.01)
  B01D 61/44 (2006.01)
  C08F 220/58 (2006.01)
  C08J 5/22 (2006.01)

(52) U.S. Cl.
  CPC ............... *B01J 39/20* (2013.01); *B01J 47/12* (2013.01); *C08F 220/56* (2013.01); *C08F 220/58* (2013.01); *C08J 5/2231* (2013.01); *C08F 2220/585* (2013.01); *C08J 2333/26* (2013.01)

(56) References Cited

FOREIGN PATENT DOCUMENTS

| | | |
|---|---|---|
| JP | 2007-186608 | 7/2007 |
| JP | 2014-171951 | 9/2014 |
| JP | 2014-195798 | 10/2014 |
| WO | 2014050992 | 4/2014 |
| WO | 2014136697 | 9/2014 |

OTHER PUBLICATIONS

Machine Translation of "Synthesis of Crosslinkable m-Aramid Ionomer Containing Sulfonated Ether Sulfone and Their Characterization for PEMFC Membrane" (Year: 2010).*

"International Search Report (Form PCT/ISA/210) of PCT/JP2016/055294", with English translation thereof, dated May 31, 2016, pp. 1-4.

"Written Opinion (Form PCT/ISA/237) of PCT/JP2016/055294", dated May 31, 2016, with English translation thereof, pp. 1-12.

"Search Report of European Counterpart Application," dated Apr. 20, 2018, pp. 1-5.

* cited by examiner

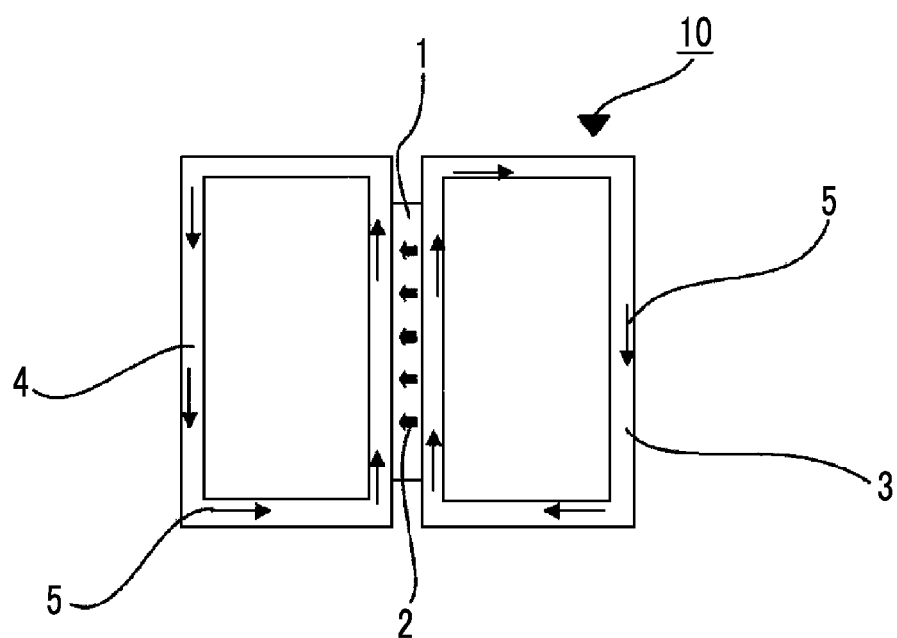

FUNCTIONAL POLYMER MEMBRANE, METHOD FOR MANUFACTURING SAME, COMPOSITION FOR FORMING FUNCTIONAL POLYMER MEMBRANE, SEPARATION MEMBRANE MODULE, AND ION-EXCHANGE DEVICE

CROSS-REFERENCE TO RELATED APPLICATIONS

This application is a Continuation of PCT International Application No. PCT/JP2016/55294, filed on Feb. 23, 2016, which claims priority under 35 U.S.C. § 119(a) to Japanese Patent Application No. 2015-091160, filed on Apr. 28, 2015, and Japanese Patent Application No. 2016-002525, filed on Jan. 8, 2016. Each of the above application(s) is hereby expressly incorporated by reference, in its entirety, into the present application.

BACKGROUND OF THE INVENTION

1. Field of the Invention

The present invention relates to a functional polymer membrane, a method for manufacturing the same, a composition for forming a functional polymer membrane, a separation membrane module, and an ion-exchange device.

2. Description of the Related Art

A functional polymer membrane is used as an ion-exchange membrane for electrodeionization (EDI), continuous electrodeionization (CEDI), electrodialysis (ED), electrodialysis reversal (EDR), and the like.

EDI is a water treatment process of removing ions from an aqueous liquid by using an ion-exchange membrane and potential for achieving ion transport. Unlike other water purification techniques such as ion exchange used in the related art, EDI does not need to use an acid or a chemical such as sodium hydroxide and can be used for producing ultrapure water. ED and EDR are electrochemical separation processes of removing ions and the like from water and other fluids.

As ion-exchange membranes of the related art, for example, those described in JP2014-195798A and JP2014-171951A are known.

SUMMARY OF THE INVENTION

An object of the present invention is to provide a functional polymer membrane having excellent pH resistance, a method for manufacturing the same, a composition for forming a functional polymer membrane from which the functional polymer membrane is obtained, and a separation membrane module and an ion-exchange device which have the functional polymer membrane.

The aforementioned object of the present invention was achieved by means described below in <1> and <18> to <20> or <39>. Preferred embodiments are also described below in <2> to <17> and <21> to <38>.

<1> A functional polymer membrane comprising a polymer compound having a constitutional unit represented by Formula I as a constitutional unit A and a constitutional unit derived from a polyfunctional monomer having a Clog P value of equal to or greater than −0.3 to less than 3.0 as a constitutional unit B.

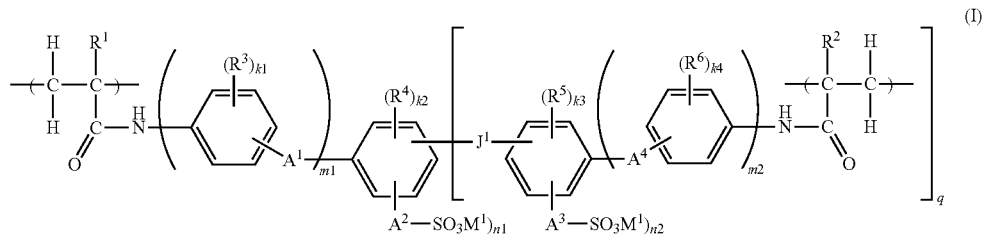

In Formula I, $R^1$ and $R^2$ each independently represent a hydrogen atom or an alkyl group; $R^3$ to $R^6$ each independently represent a substituent; k1 and k4 each independently represent an integer of 0 to 4; k2 and k3 each independently represent an integer of 0 to 3; in a case where there is a plurality of groups represented by at least any one of $R^3$, $R^4$, $R^5$, or $R^6$, $R^3$ to $R^6$ may be the same as or different from each other and may form a ring by being bonded to each other; $A^1$ to $A^4$ each independently represent a single bond or a divalent linking group; $M^1$ represents a hydrogen atom, an organic base ion, or a metal ion; n1 and n2 each independently represent an integer of 1 to 4; m1 and m2 each independently represent 0 or 1; $J^1$ represents a single bond, —O—, —S—, —$SO_2$—, —CO—, —$CR^7R^8$—, or an alkenylene group; $R^7$ and $R^8$ each independently represent a hydrogen atom, an alkyl group, or a halogen atom; p represents an integer of equal to or greater than 1; and q represents an integer of 1 to 4.

<2> The functional polymer membrane described in 1, in which the constitutional unit B is represented by Formula CR-1 or CR-2.

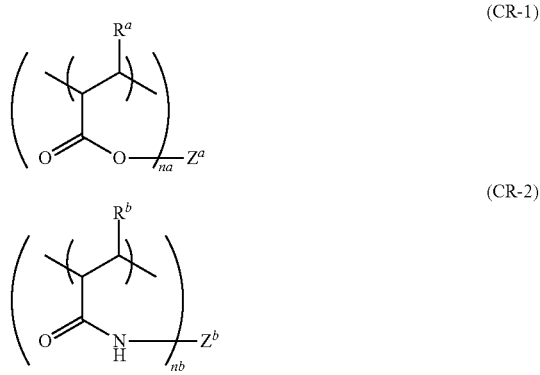

In Formula CR-1, na represents an integer of equal to or greater than 2, $Z^a$ represents an na-valent organic group, and $R^a$ each independently represents a hydrogen atom or a methyl group.

In Formula CR-2, nb represents an integer of equal to or greater than 2, $Z^b$ represents an nb-valent organic group, and $R^b$ each independently represents a hydrogen atom or a methyl group.

<3> The functional polymer membrane described in <1> or <2>, in which the constitutional unit B contains a constitutional unit derived from a (meth)acrylamide compound and/or a constitutional unit derived from a (meth)acrylate compound.

<4> The functional polymer membrane described in any one of <1> to 3, in which the constitutional unit B contains a constitutional unit derived from a (meth)acrylate compound.

<5> The functional polymer membrane described in any one of <1> to <4>, in which a content of the constitutional unit A is equal to or greater than 10% by mass to less than 70% by mass with respect to a dry mass of the functional polymer membrane.

<6> The functional polymer membrane described in any one of <1> to <5>, in which a content of the constitutional unit B is equal to or greater than 1 by mass to less than 25% by mass with respect to a dry mass of the functional polymer membrane.

<7> The functional polymer membrane described in any one of <1> to <6>, in which the polymer compound further contains, as a constitutional unit C, a constitutional unit derived from a monofunctional monomer having an anionic group.

<8> The functional polymer membrane described in <7>, in which the constitutional unit C contains a sulfo group or a salt thereof.

<9> The functional polymer membrane described in <7> or <8>, in which a content of the constitutional unit C is equal to or greater than 5% by mass to less than 40% by mass with respect to a dry mass of the functional polymer membrane.

<10> The functional polymer membrane described in any one of <1> to 9, in which the polymer compound further contains, as a constitutional unit D, a constitutional unit derived from a monofunctional monomer not having an ionic group.

<11> The functional polymer membrane described in <10>, in which the constitutional unit D contains a constitutional unit derived from a (meth)acrylamide compound and/or a constitutional unit derived from a (meth)acrylate compound.

<12> The functional polymer membrane described in <10> or <11>, in which the constitutional unit D contains a constitutional unit derived from a (meth)acrylate compound.

<13> The functional polymer membrane described in any one of <10> to <12>, in which a content of the constitutional unit D is equal to or greater than 5% by mass to less than 25% by mass with respect to a dry mass of the functional polymer membrane.

<14> The functional polymer membrane described in any one of <1> to <13>, in which the polymer compound further contains, as a constitutional unit A', a constitutional unit represented by Formula I'.

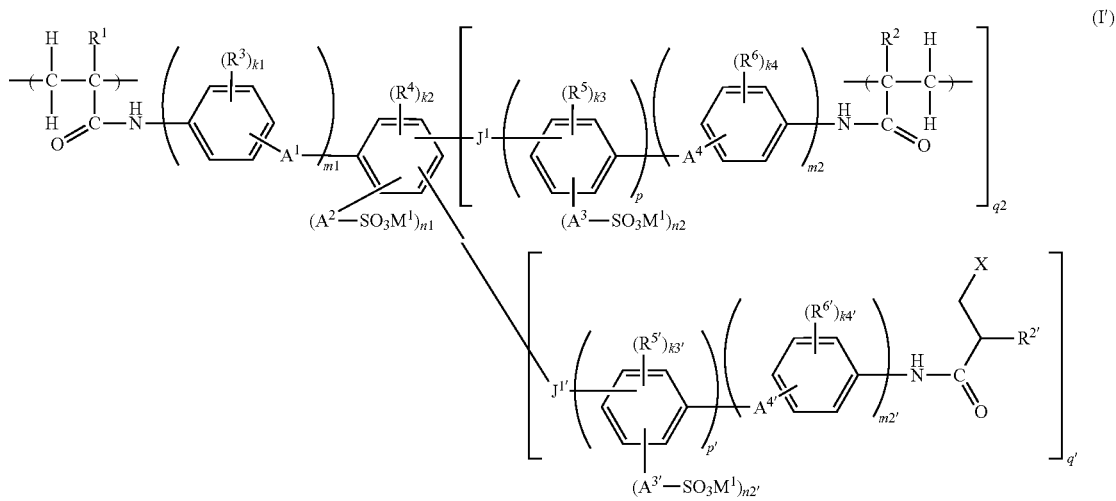

In Formula I', $R^1$, $R^2$, and $R^{2'}$ each independently represent a hydrogen atom or an alkyl group; $R^3$ to $R^6$, $R^{5'}$, and $R^{6'}$ each independently represent a substituent; k1, k4, and k4' each independently represent an integer of 0 to 4; k2, k3, and k3' each independently represent an integer of 0 to 3; in a case where there is a plurality of groups represented by at least any one of $R^3$, $R^4$, $R^5$, $R^6$, $R^{5'}$, or $R^{6'}$, $R^3$ to $R^6$, $R^{5'}$, and $R^{6'}$ may be the same as or different from each other or may form a ring by being bonded to each other; $A^1$ to $A^4$, $A^{3'}$, and $A^{4'}$ each independently represent a single bond or a divalent linking group; $M^1$ represents a hydrogen atom, an organic base ion or a metal ion; n1, n2, and n2' each independently represent an integer of 1 to 4; m1, m2, and m2' each independently represent 0 or 1; $J^1$ and $J^{1'}$ each independently represent a single bond, —O—, —S—, —$SO_2$—, —CO—, —$CR^7R^8$—, or an alkenylene group; $R^7$ and $R^8$ each independently represent a hydrogen atom, an alkyl group, or a halogen atom; p represents an integer of equal to or greater than 1; p' represents an integer of equal to or greater than 1; q2 represents an integer of 0 to 3; q' represents an integer of 1 to 4; and X represents a halogen atom.

<15> The functional polymer membrane described in <14>, in which a content of the constitutional unit A' in the polymer compound is equal to or greater than 0.1% by mass to less than 10% by mass with respect to a total mass of the constitutional unit A and the constitutional unit A'.

<16> The functional polymer membrane described in any one of <1> to <15>, further comprising a porous support.

<17> The functional polymer membrane described in any one of <1> to <16> that is an ion-exchange membrane.

<18> A separation membrane module comprising the functional polymer membrane described in any one of <1> to <17>.

<19> An ion-exchange device comprising the functional polymer membrane described in any one of <1> to <17>.

<20> A composition for forming a functional polymer membrane, comprising a monomer represented by Formula II as a component A and a polyfunctional monomer having a C log P value of equal to or greater than −0.3 to less than 3.0 as a component B.

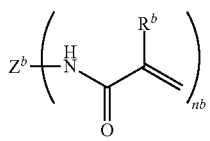

In Formula M-1, na represents an integer of equal to or greater than 2, $Z^a$ represents an na-valent organic group, and $R^a$ each independently represents a hydrogen atom or a methyl group.

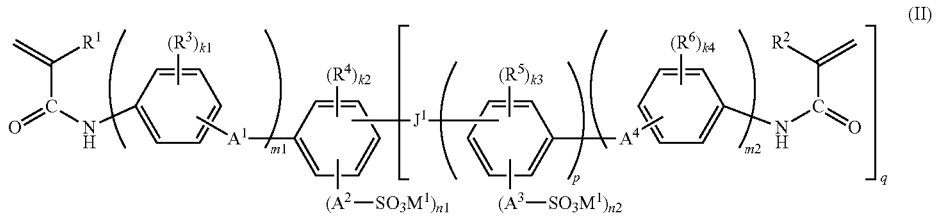

In Formula II, $R^1$ and $R^2$ each independently represent a hydrogen atom or an alkyl group; $R^3$ to $R^6$ each independently represent a substituent; k1 and k4 each independently represent an integer of 0 to 4; k2 and k3 each independently represent an integer of 0 to 3; in a case where there is a plurality of groups represented by at least any one of $R^3$, $R^4$, $R^5$, or $R^6$, $R^3$ to $R^6$ may be the same as or different from each other and may form a ring by being bonded to each other; $A^1$ to $A^4$ each independently represent a single bond or a divalent linking group; $M^1$ represents a hydrogen atom, an organic base ion, or a metal ion; n1 and n2 each independently represent an integer of 1 to 4; m1 and m2 each independently represent 0 or 1; $J^1$ represents a single bond, —O—, —S—, —SO$_2$—, —CO—, —CR$^7$R$^8$—, or an alkenylene group; $R^7$ and $R^8$ each independently represent a hydrogen atom, an alkyl group, or a halogen atom; p represents an integer of equal to or greater than 1; and q represents an integer of 1 to 4.

<21> The composition for forming a functional polymer membrane described in <20>, in which the component B contains a compound represented by Formula M-1 or M-2.

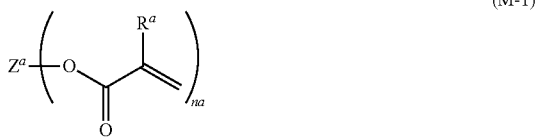

In Formula M-2, nb represents an integer of equal to or greater than 2, $Z^b$ represents an nb-valent organic group, and $R^b$ each independently represents a hydrogen atom or a methyl group.

<22> The composition for forming a functional polymer membrane described in <20> or <21>, in which the component B contains a (meth)acrylate compound and/or a (meth)acrylamide compound.

<23> The composition for forming a functional polymer membrane described in any one of <20> to <22>, in which the component B contains a (meth)acrylate compound.

<24> The composition for forming a functional polymer membrane described in any one of <20> to <23>, in which a content of the component A is equal to or greater than 10% by mass to less than 60% by mass with respect to a total mass of the composition for forming a functional polymer membrane.

<25> The composition for forming a functional polymer membrane described in any one of <20> to <24>, in which a content of the component B is equal to or greater than 1% by mass to less than 20% by mass with respect to a total mass of the composition for forming a functional polymer membrane.

<26> The composition for forming a functional polymer membrane described in any one of <20> to <25>, further comprising a monofunctional monomer having an anionic group as a component C.

<27> The composition for forming a functional polymer membrane described in <26>, in which the component C contains a sulfo group or a salt thereof.

<28> The composition for forming a functional polymer membrane described in <26> or <27>, in which a content of the component C is equal to or greater than 5% by mass to less than 35% by mass with respect to a total mass of the composition for forming a functional polymer membrane.

<29> The composition for forming a functional polymer membrane described in any one of <20> to <28>, further comprising a monofunctional monomer not having an ionic group as a component D.

<30> The composition for forming a functional polymer membrane described in <29>, in which the component D contains a (meth)acrylamide compound and/or a (meth)acrylate compound.

<31> The composition for forming a functional polymer membrane described in <29> or <30>, in which the component D contains a (meth)acrylate compound.

<32> The composition for forming a functional polymer membrane described in any one of <29> to <31>, in which a content of the component D is equal to or greater than 5% by mass to less than 20% by mass with respect to a total mass of the composition for forming a functional polymer membrane.

<33> The composition for forming a functional polymer membrane described in any one of <20> to <32>, further comprising a nonionic surfactant as a component E.

<34> The composition for forming a functional polymer membrane described in any one of <20> to <33>, further comprising a polymerization initiator as a component F.

<35> The composition for forming a functional polymer membrane described in <34>, in which the component F contains a compound represented by Formula PI-1 or PI-2.

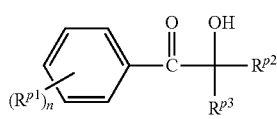
(PI-1)

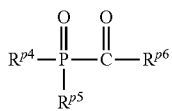
(PI-2)

In Formula PI-1, $R^{p1}$ represents an alkyl group, an alkenyl group, an alkoxy group, or an aryloxy group; $R^{p2}$ and $R^{p3}$ each independently represent a hydrogen atom, an alkyl group, an alkenyl group, an alkoxy group, or an aryloxy group; $R^{p2}$ and $R^{p3}$ may form a ring by being bonded to each other; and n represents an integer of 0 to 5.

In Formula PI-2, $R^{p4}$ represents an alkyl group, an aryl group, an alkylthio group, or an arylthio group; $R^{p5}$ represents an alkyl group, an aryl group, an alkylthio group, an arylthio group, or an acyl group; and $R^{p6}$ represents an alkyl group or an aryl group.

<36> The composition for forming a functional polymer membrane described in <34>, in which the component F contains a compound represented by Formula AI.

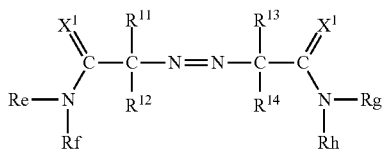
(AI)

In Formula AI, to $R^{11}$ to $R^{14}$ each independently represent an alkyl group; $X^1$ represents =O or =N-Ri; Re to Ri each independently represent a hydrogen atom or an alkyl group; Re and Rf, Rg and Rh, Re and Ri, and Rg and Ri may form a ring by being bonded to each other respectively.

<37> The composition for forming a functional polymer membrane described in any one of <20> to <36>, further comprising a monomer represented by Formula II' as a component A'.

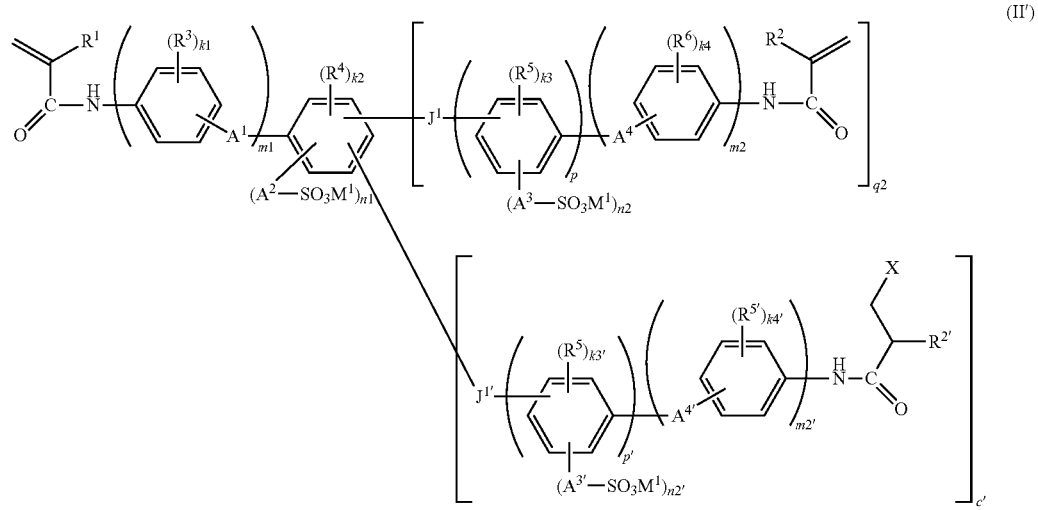
(II')

In Formula II', $R^1$, $R^2$, and $R^{2'}$ each independently represent a hydrogen atom or an alkyl group; $R^3$ to $R^6$, $R^{5'}$, and $R^{6'}$ each independently represent a substituent; k1, k4, and k4' each independently represent an integer of 0 to 4; k2, k3, and k3' each independently represent an integer of 0 to 3; in a case where there is a plurality of groups represented by at least any one of $R^3$, $R^4$, $R^5$, $R^6$, $R^{5'}$, or $R^{6'}$, $R^3$ to $R^6$, $R^{5'}$, and $R^{6'}$ may be the same as or different from each other and may form a ring by being bonded to each other; $A^1$ to $A^4$, $A^{3'}$, and $A^{4'}$ each independently represent a single bond or a divalent linking group; $M^1$ represents a hydrogen atom, an organic base ion, or a metal ion; n1, n2, and n2' each independently represent an integer of 1 to 4; m1, m2, and m2' each independently represent 0 or 1; $J^1$ and $J^{1'}$ each independently represent a single bond, —O—, —S—, —$SO_2$—, —CO—, —$CR^7R^8$—, or an alkenylene group; $R^7$ and $R^8$ each independently represent a hydrogen atom, an alkyl group, or a halogen atom; p represents an integer of equal to or greater than 1; p' represents an integer of equal to or greater than 1; q2 represents an integer of 0 to 3; q' represents an integer of 1 to 4; and X represents a halogen atom.

<38> The composition for forming a functional polymer membrane described in <37>, in which a content of the component A' is equal to or greater than 0.1% by mass to less than 10% by mass with respect to a total mass of the component A and the component A'.

<39> A method for manufacturing a functional polymer membrane, comprising a step of polymerizing the composition for forming a functional polymer membrane described in any one of <20> to <38> by heating and/or energy ray irradiation.

According to the present invention, it is possible to provide a functional polymer membrane having excellent pH resistance, a method for manufacturing the same, a composition for forming a functional polymer membrane from which the functional polymer membrane is obtained, and a separation membrane module and an ion-exchange device which have the functional polymer membrane.

BRIEF DESCRIPTION OF THE DRAWINGS

FIG. 1 is a schematic view of a flow channel of a device for measuring a water permeability of a membrane.

DESCRIPTION OF THE PREFERRED EMBODIMENTS

Hereinafter, the contents of the present invention will be specifically described. The following constituents will be described based on typical embodiments of the present invention in some cases, but the present invention is not limited to the embodiments. In the present specification, "to" is used to signify that numerical values listed before and after "to" are a lower limit and an upper limit respectively.

In the present specification, in a case where there is no description regarding whether a group (atomic group) is substituted or unsubstituted, the group includes both of a group not having a substituent and a group having a substituent. For example, an "alkyl group" includes not only an alkyl group not having a substituent (unsubstituted alkyl group) but also an alkyl group having a substituent (substituted alkyl group).

In the present specification, some chemical structural formulae will be described as simplified structural formulae in which a hydrogen atom is omitted.

In the present specification, "(meth)acrylate" represents acrylate and methacrylate, "(meth)acryl" represents acryl and methacryl, "(meth)acryloyl" represents acryloyl and methacryloyl, and "(meth)acrylamide" represents acrylamide and methacrylamide.

In the present invention, "% by mass" has the same definition as "% by weight", and "part by mass" has the same definition as "part by weight".

In the present invention, a combination of preferred aspects is a more preferred aspect.

(Functional Polymer Membrane)

The functional polymer membrane of the present invention contains a polymer compound having (hereinafter, referred to as "specific polymer compound" as well) a constitutional unit represented by Formula I as a constitutional unit A and a constitutional unit derived from a polyfunctional monomer having a C log P value of equal to or greater than −0.3 to less than 3.0 as a constitutional unit B.

In the present specification, "polymerizable compound" refers to a compound which has at least one polymerizable group. In the present specification, "monomer" means a polymerizable compound having a molecular weight (in a case where the monomer has a molecular weight distribution, the weight-average molecular weight) of equal to or smaller than 3,000.

The molecular weight (in a case where the monomer has a molecular weight distribution, the weight-average molecular weight) of the polyfunctional monomer is preferably equal to or smaller than 2,000, and more preferably equal to or smaller than 1,000. In a case where the polyfunctional monomer has a molecular weight within the above range, excellent curing properties are obtained.

In the present specification, in a case where the structural formula of a monomer is known, a theoretical value is used as the molecular weight. In a case where the structural formula is unclear or the monomer has a molecular weight distribution, as the molecular weight, a value is used which is measured by gel permeation chromatography (GPC) and expressed in terms of standard polystyrene.

In a case where electrodialysis is performed over a long period of time by using a functional polymer membrane, sometimes a poorly water-soluble precipitate (scaling) resulting from a calcium ion or a magnesium ion occurs. Generally, the precipitate is washed using an acid. In order to be used for a long period of time, the functional polymer membrane needs to endure the washing, and it is very important for the functional polymer membrane has excellent pH resistance.

As a result of conducting an intensive examination, the inventors of the present invention found that the functional polymer membrane containing the polymer compound having the constitutional unit A and the constitutional unit B is suitable as an ion-exchange membrane, has excellent pH resistance, particularly, long-term pH resistance, has low electric resistance and low water permeability, exhibits excellent selective permeability, and has excellent dimensional stability.

A detailed mechanism thereof is unclear, but presumably, by mixing the membrane with a monomer (component B) having a suitable C log P value, the membrane could be hydrophobized, and the crosslink density could be improved. Accordingly, it is difficult for an acid to permeate the membrane, and hence excellent pH resistance may be obtained.

Furthermore, the inventors of the present invention also found that in a case where a polymer compound having a constitutional unit derived from a monomer having a C log P value of less than 3.0 is used to hydrophobize the membrane, the electric resistance of the membrane is reduced, and hence the electric resistance and the pH resistance can be simultaneously achieved in the membrane.

In a case where a monomer having a C log P value of equal to or greater than 3.0 is used, in the composition, the monomer having a C log P value of equal to or greater than 3.0 is separated from other monomers, and accordingly, at a certain site within the membrane, the density of uncharged monomers becomes high. Presumably, because the site functions as an insulating portion, the electric resistance may increase.

In addition, by hydrophobizing the membrane as described above, the inventors of the present invention found, as an unexpected effect, excellent dimensional stability of the membrane in pure water.

The functional polymer membrane of the present invention is preferably an ion-exchange membrane.

Furthermore, the functional polymer membrane of the present invention is preferably a membrane obtained by polymerizing (curing) the composition for forming a functional polymer membrane of the present invention that will be described later.

Hereinafter, each of the components constituting the functional polymer membrane of the present invention will be described.

<Specific Polymer Compound>

The specific polymer compound used in the present invention has a constitutional unit represented by Formula I as a constitutional unit A and a constitutional unit derived from a polyfunctional monomer having a C log P value of equal to or greater than −0.3 to less than 3.0 as a constitutional unit B.

[Constitutional Unit A]

The constitutional unit A is a constitutional unit represented by Formula I.

The constitutional unit A is preferably a constitutional unit derived from a component A contained in the composition for forming a functional polymer membrane of the present invention that will be described later.

The constitutional unit A does not contain the constitutional unit corresponding to a constitutional unit A' which will be described later.

organic base ion, or a metal ion; n1 and n2 each independently represent an integer of 1 to 4; m1 and m2 each independently represent 0 or 1; $J^1$ represents a single bond, —O—, —S—, —SO$_2$—, —CO—, —CR$^7$R$^8$—, or an alkenylene group; R$^7$ and R$^8$ each independently represent a hydrogen atom, an alkyl group, or a halogen atom; p represents an integer of equal to or greater than 1; and q represents an integer of 1 to 4.

In Formula I, $R^1$ and $R^2$ each independently represent a hydrogen atom or an alkyl group. The alkyl group is preferably an alkyl group having 1 to 4 carbon atoms, more preferably a methyl group or an ethyl group, and even more preferably a methyl group. $R^1$ and $R^2$ particularly preferably represent a hydrogen atom or a methyl group.

In Formula I, $R^3$, $R^4$, $R^5$, and $R^6$ each independently represent a substituent. Examples of the substituent include an alkyl group (preferably having 1 to 24 carbon atoms, more preferably having 1 to 12 carbon atoms, and even more preferably having 1 to 4 carbon atoms), an aryl group (preferably having 3 to 20 carbon atoms, and more preferably having 6 to 10 carbon atoms), an alkenyl group (preferably having 2 to 20 carbon atoms, more preferably having 2 to 12 carbon atoms, and even more preferably having 2 to 4 carbon atoms), an alkynyl group (preferably having 2 to 20 carbon atoms, more preferably having 2 to 12 carbon atoms, and even more preferably having 2 to 4 carbon atoms), an alkoxy group (preferably having 1 to 24 carbon atoms, more preferably having 1 to 12 carbon atoms, and even more preferably having 1 to 4 carbon atoms), an aryloxy group (preferably having 3 to 20 carbon atoms, and more preferably having 6 to 10 carbon atoms), a halogen atom, an acyl group (preferably having 2 to 20 carbon atoms, more preferably having 2 to 12 carbon atoms, and even more preferably having 2 to 4 carbon atoms), an acyloxy group (preferably having 2 to 20 carbon atoms, more preferably having 2 to 12 carbon atoms, and even more preferably having 2 to 4 carbon atoms), and a cyano group. The aforementioned alkyl group may be linear, branched, or cyclic. The aforementioned aryl group may be a heteroaryl group containing a N atom, an O atom, or a S atom as a heteroatom. The above substituents may be further substituted with the above substituents.

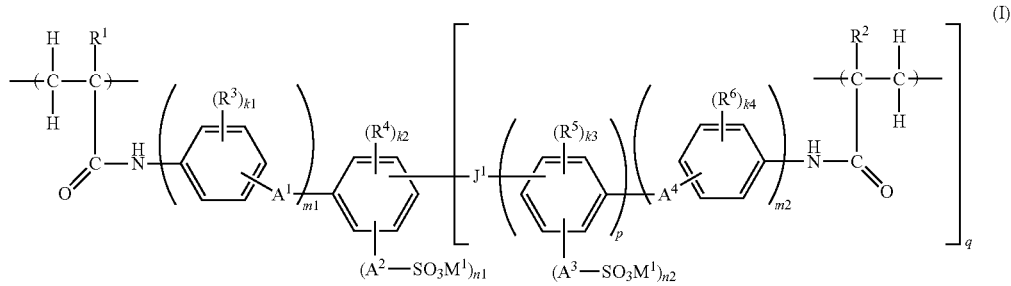

In Formula I, $R^1$ and $R^2$ each independently represent a hydrogen atom or an alkyl group; $R^3$ to $R^6$ each independently represent a substituent; k1 and k4 each independently represent an integer of 0 to 4; k2 and k3 each independently represent an integer of 0 to 3; in a case where there is a plurality of groups represented by at least any one of $R^3$, $R^4$, $R^5$, or $R^6$, $R^3$ to $R^6$ may be the same as or different from each other and may form a ring by being bonded to each other; $A^1$ to $A^4$ each independently represent a single bond or a divalent linking group; $M^1$ represents a hydrogen atom, an k1 and k4 each independently represent an integer of 0 to 4, preferably represent 0 or 1, and more preferably represent 0.

k2 and k3 each independently represent an integer of 0 to 3, preferably represent 0 or 1, and more preferably represent 0.

$A^1$, $A^2$, $A^3$, and $A^4$ each independently represent a single bond or a divalent linking group. Examples of the divalent linking group include a linear, branched, or cyclic alkylene group (preferably having 1 to 30 carbon atoms, more preferably having 1 to 12 carbon atoms, and even more preferably having 1 to 4 carbon atoms; examples thereof include methylene, ethylene, propylene, butylene, pentylene, hexylene, octylene, and decylene; in a case where the alkylene group is a cyclic alkylene group, that is, a cycloalkylene group, the cycloalkylene group preferably has 3 to 12 carbon atoms, more preferably has 3 to 8 carbon atoms, and even more preferably has 3 to 6 carbon atoms), a linear, branched, or cyclic alkenylene group (preferably having 2 to 30 carbon atoms, more preferably having 2 to 12 carbon atoms, and even more preferably having 2 to 4 carbon atoms; examples thereof include ethenylene and propenylene; a cyclic alkenylene group is preferably a 5- or 6-membered cycloalkenylene group), an alkyleneoxy group (preferably having 1 to 30 carbon atoms, more preferably having 1 to 12 carbon atoms, and even more preferably having 1 to 4 carbon atoms; examples thereof include methyleneoxy, ethyleneoxy, propyleneoxy, butyleneoxy, pentyleneoxy, hexyleneoxy, octyleneoxy, and decyleneoxy), an aralkylene group (preferably having 7 to 30 carbon atoms, and more preferably having 7 to 13 carbon atoms; examples thereof include benzylidene and cinnamylidene), an arylene group (preferably having 6 to 30 carbon atoms, and more preferably having 6 to 15 carbon atoms; examples thereof include phenylene, cumenylene, mesitylene, tolylene, and xylylene), an ether bond (—O—), a thioether bond (—S—), a sulfonyl group (—$SO_2$—), and a carbonyl group (—C(=O)—). These may further have a substituent, and as the substituent, a hydroxyl group or a halogen atom is preferable.

$M^1$ each independently represents a hydrogen atom, an organic base ion, or a metal ion. Examples of the organic base ion include organic base ions selected from an ammonium ion (for example, ammonium, methyl ammonium, dimethyl ammonium, trimethyl ammonium, diethyl ammonium, triethyl ammonium, or dibenzyl ammonium) and an organic heterocyclic ion (preferably a nitrogen-containing heterocyclic ion; the heterocyclic ring in the nitrogen-containing heterocyclic ion is preferably 5- or 6-membered ring and may be an aromatic ring or may be simply a heterocyclic ring; the heterocyclic ring may be fused with other rings such as a benzene ring or may form a spiro ring or a cross-linked ring; examples thereof include pyridinium, N-methylimidazolium, N-methylmorpholinium, 1,8-diazabicyclo[5.4.0]-7-undecanium, 1,8-diazabicyclo[4.3.0]-7-nonenium, and guanidium). Examples of the metal ion include metal ions selected from an alkali metal ion (for example, a lithium ion, a sodium ion, or a potassium ion) and an alkaline earth metal ion (for example, a beryllium ion, a magnesium ion, or a calcium ion). Among these, an alkali metal ion is preferable. In a case where there is a plurality of $M^1$'s, the plurality of $M^1$'s may be the same as or different from each other.

$M^1$ is preferably a hydrogen atom, an organic base ion, or an alkali metal ion, more preferably a hydrogen atom, an organic heterocyclic ion, a lithium ion, a sodium ion, or a potassium ion, and even more preferably a hydrogen atom, pyridinium, N-alkylmorpholinium (preferably N-methylmorpholinium), or N-alkylimidazolium (preferably N-methylimidazolium), a lithium ion, or a sodium ion.

n1 and n2 each independently represent an integer of 1 to 4, and m1 and m2 each independently represent 0 or 1.

n1 and n2 each independently preferably represent 1 to 3, more preferably represent 1 or 2, and particularly preferably represent 1. m1 and m2 each independently represent 0 or 1 and preferably represent 0.

$J^1$ represents a single bond, —O—, —S—, —$SO_2$—, —CO—, —$CR^7R^8$—, or an alkenylene group. $R^7$ and $R^8$ each independently represent a hydrogen atom, an alkyl group, or a halogen atom.

$J^1$ is preferably a single bond, —O—, —$SO_2$—, —CO—, —$CR^7R^8$—, or an alkenylene group (preferably an ethylene group), more preferably a single bond, —$SO_2$—, —$CR^7R^8$—, or an alkenylene group, and particularly preferably a single bond.

$R^7$ and $R^8$ each independently preferably represent an alkyl group or a halogen atom, and more preferably represent a methyl group or a fluorine atom.

p represents an integer of equal to or greater than 1. p is preferably 1 to 5, more preferably 1 to 3, and particularly preferably 1. q represents an integer of 1 to 4. q is preferably 1 to 3, more preferably 1 or 2, and even more preferably 1.

The constitutional unit A is preferably a constitutional unit represented by Formula I-A.

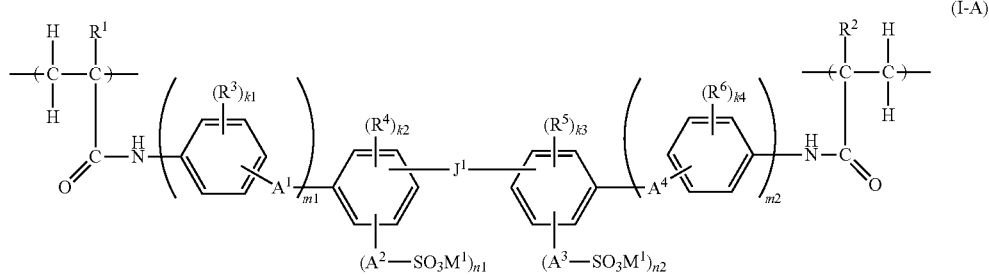

(I-A)

$R^1$ to $R^6$, k1 to k4, $A^1$ to $A^4$, $M^1$, m1, m2, n1, n2, and $J^1$ in Formula I-A have the same definition as $R^1$ to $R^6$, k1 to k4, $A^1$ to $A^4$, $M^1$, m1, m2, n1, n2, and $J^1$ in Formula I, and the preferred aspect thereof is also the same.

Specific examples of the constitutional unit A include the constitutional units shown below, but the present invention is not limited thereto. In the following examples, R represents a hydrogen atom or a methyl group.

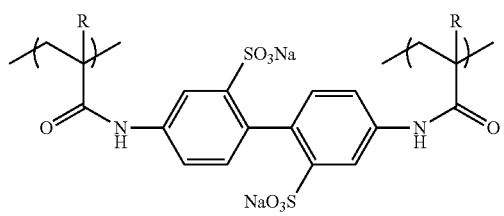

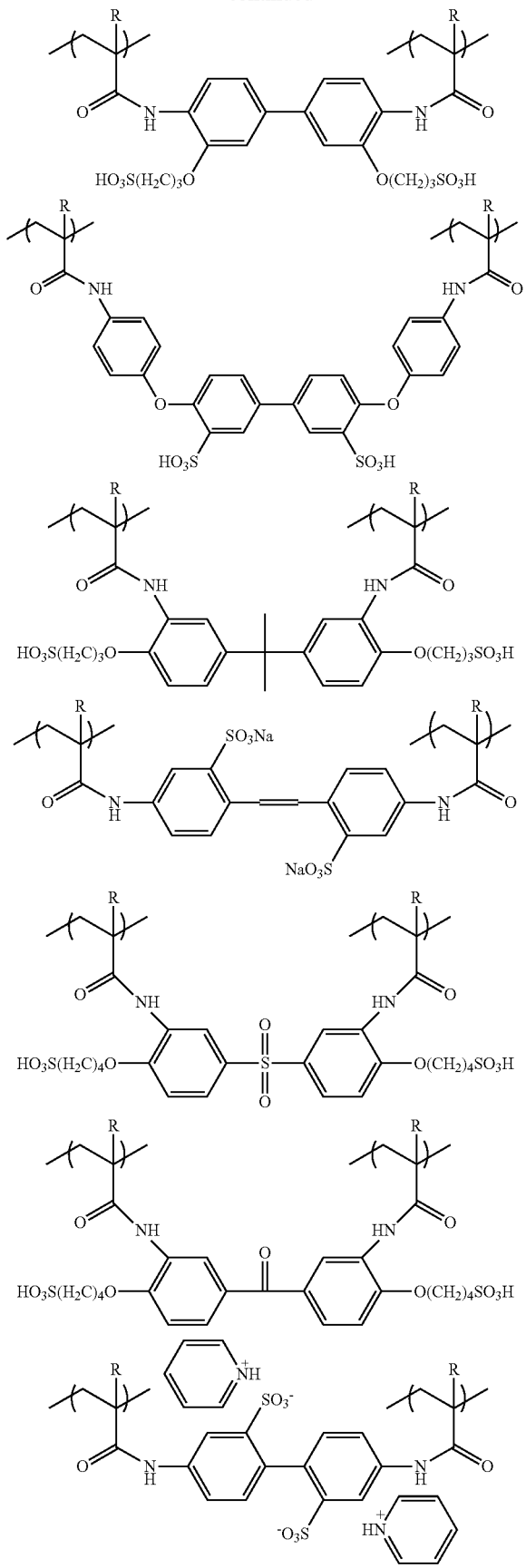

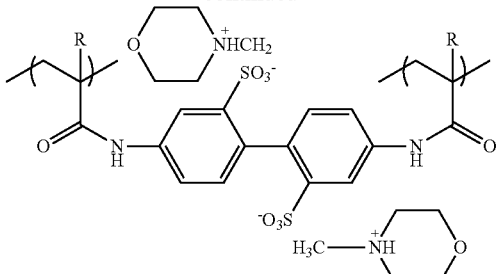

The content of the constitutional unit A with respect to the dry mass of the functional polymer membrane is preferably equal to or greater than 10% by mass to less than 70% by mass, and more preferably equal to or greater than 20% by mass to less than 60% by mass.

"Dry mass" refers to a mass measured after drying the functional polymer membrane. For example, for a functional polymer membrane composed only of the specific polymer compound and a support, the dry mass thereof refers to the total mass of the specific polymer compound and the support.

The content of the constitutional unit A with respect to the dry mass of the functional polymer membrane can be calculated by the following equation from the mass of the specific polymer compound contained in the functional polymer membrane.

$$P_{tA} = ((M_A \times P_A)/M_M) \times 100$$

$P_{tA}$: content of constitutional unit A with respect to dry mass of functional polymer membrane (% by mass)

$M_A$: total mass of specific polymer compound in functional polymer membrane (g)

$P_A$: content of constitutional unit A with respect to total mass of specific polymer compound (% by mass)

$M_M$: dry mass of functional polymer membrane (g)

The content of constitutional units other than the constitutional unit A with respect to the dry mass of the functional polymer membrane can be calculated in the same manner.

[Constitutional Unit B]

The specific polymer compound used in the present invention has, as a constitutional unit B, a constitutional unit derived from a polyfunctional monomer having a C log P value of equal to or greater than −0.3 to less than 3.0.

The C log P value of the polyfunctional monomer is equal to or greater than −0.3 to less than 3.0, preferably equal to or greater than 0 to less than 3.0, and more preferably equal to or greater than 0.5 to less than 3.0.

In a case where the C log P value is within the above range, a functional polymer membrane is obtained which has excellent pH resistance and has low electric resistance.

The C log P value can be calculated using ChemBioDraw Ultra 12.0.

The polyfunctional monomer is preferably a radically polymerizable monomer, and more preferably a monomer having a plurality of ethylenically unsaturated groups (ethylenically unsaturated double bonds).

The constitutional unit B preferably contains a constitutional unit derived from a (meth)acrylamide compound and/or a constitutional unit derived from a (meth)acrylate compound, and more preferably contains a constitutional unit derived from a (meth)acrylate compound.

As the aforementioned polyfunctional monomer, a component B contained in the composition for forming a functional polymer membrane of the present invention that will be described later is preferable.

The constitutional unit B is preferably represented by Formula CR-1 and/or CR-2. From the viewpoint of reducing water permeability, the constitutional unit B is more preferably represented by Formula CR-1.

Herein, a constitutional unit corresponding to both the constitutional unit A and the constitutional unit B is regarded as the constitutional unit A but is not regarded as the constitutional unit B.

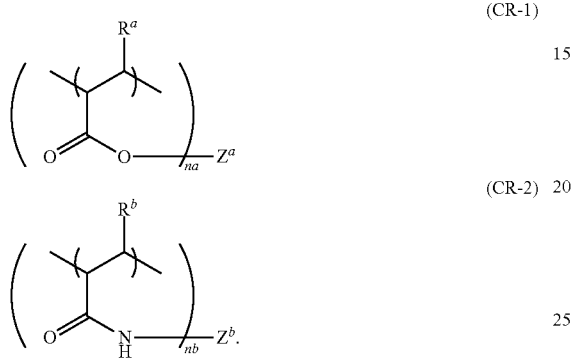

In Formula CR-1, na represents an integer of equal to or greater than 2; $Z^a$ represents an na-valent organic group; and $R^a$ each independently represents a hydrogen atom or a methyl group. In Formula CR-2, nb represents an integer of equal to or greater than 2; $Z^b$ represents an nb-valent organic group; and $R^b$ each independently represents a hydrogen atom or a methyl group.

In Formula CR-1, na represents an integer of equal to or greater than 2. na is preferably 2 to 10, and more preferably 2 to 6.

In Formula CR-1, $Z^a$ represents an na-valent organic group. $Z^a$ is preferably an na-valent saturated hydrocarbon group or an na-valent organic group obtained by combining at least one group selected from the group consisting of an arylene group, an ether bond (—O—), an ester bond (—C(=O)—O—), a carbonyl group (—C(=O)—), an amide bond (—C(=O)—NR—), a thioether bond (—S—), a thioester bond (—C(=O)—S—), a thienoester bond (—C(=S)—O—), a urethane bond (—NR—C(=O)—O—), and a urea bond (—NR—C(=O)—NR—) with an na-valent saturated hydrocarbon group.

The number of carbon atoms in the na-valent saturated hydrocarbon group is preferably 1 to 18, and more preferably 1 to 12. The na-valent saturated hydrocarbon group may be substituted with a substituent, and examples of preferred substituents include a halogen atom and a hydroxyl group.

The aforementioned arylene group preferably has 6 to 12 carbon atoms, and is more preferably a pheylene group.

$Z^a$ is preferably an na-valent organic group obtained by combining an na-valent saturated hydrocarbon group with at least one group selected from the group consisting of an ether bond, an ester bond, and an amide bond, and more preferably an na-valent organic group obtained by combining an na-valent saturated hydrocarbon group with an ether bond. The na-valent organic group also includes a polyalkyleneoxyalkylene group obtained by combining a plurality of na-valent saturated hydrocarbon groups with a plurality of ether bonds, and the like.

Furthermore, $Z^a$ preferably represents an na-valent organic group obtained by removing na hydroxyl groups from a polyhydric alcohol compound. Examples of the polyhydric alcohol compound preferably include alkylene diol having 2 to 10 carbon atoms, polyethylene glycol having 3 to 23 repeating units, polypropylene glycol having 2 to 12 repeating units, glycerin, pentaerythritol, and dipentaerythritol. The polyhydric alcohol compound may be substituted with a substituent, and examples of preferred substituents include a halogen atom and an alkyl group having 1 to 3 carbon atoms. Furthermore, one or more ethylene oxides may be added to the hydroxyl groups of the polyhydric alcohol compound.

Examples of $Z^a$ preferably include a group obtained by removing two hydroxyl groups from alkylene diole having 2 to 10 carbon atoms, a group obtained by removing two hydroxyl groups from polyethylene glycol having 3 to 23 repeating units, a group obtained by removing two hydroxyl groups from polypropylene glycol having 2 to 12 repeating units, a group obtained by removing two or three hydroxyl groups from glycerin, a group obtained by removing three or four hydroxyl groups from pentaerythritol, and a group obtained by removing four to six hydroxyl groups from dipentaerythritol. These groups may be substituted with a substituent and may be ethylene oxide adducts. Examples of preferred substituents include a halogen atom and an alkyl group having 1 to 3 carbon atoms.

In Formula CR-1, $R^a$ each independently represents a hydrogen atom or a methyl group, and preferably represents a hydrogen atom.

In Formula CR-2, nb represents an integer of equal to or greater than 2. nb is preferably 2 to 10, and more preferably 2 to 6.

In Formula CR-2, $Z^b$ represents an nb-valent organic group. $Z^b$ is preferably an nb-valent saturated hydrocarbon group or an nb-valent organic group obtained by combining at least one group selected from the group consisting of an arylene group, an ether bond (—O—), an ester bond (—C(=O)—O—), a carbonyl group (—C(=O)—), an amide bond (—C(=O)—NR—), a thioether bond (—S—), a thioester bond (—C(=O)—S—), a thienoester bond (—C(=S)—O—), a urethane bond (—NR—C(=O)—O—), and a urea bond (—NR—C(=O)—NR—) with an nb-valent saturated hydrocarbon group.

The number of carbon atoms in the nb-valent saturated hydrocarbon group is preferably 1 to 18, and more preferably 1 to 12. The nb-valent saturated hydrocarbon group may be substituted with a substituent. Examples of preferred substituents include a halogen atom and a hydroxyl group.

The aforementioned arylene group preferably has 6 to 12 carbon atoms, and is more preferably a phenylene group.

$Z^b$ is preferably an nb-valent organic group obtained by combining an nb-valent saturated hydrocarbon group with at least one group selected from the group consisting of a phenylene group, an ether bond, an ester bond, and an amide bond, and more preferably an nb-valent organic group obtained by combining an nb-valent saturated hydrocarbon group with an ether bond. The nb-valent organic group also includes a polyalkyleneoxyalkylene group obtained by combining a plurality of nb-valent saturated hydrocarbon groups with a plurality of ether bonds, and the like.

In Formula CR-2, $R^b$ each independently represents a hydrogen atom or a methyl group, and preferably represents a hydrogen atom.

Specific examples of the constitutional unit B will be shown below, but the present invention is not limited thereto. In the specific examples, R represents a hydrogen atom or a methyl group, a structure B1 is bonded to the position of $A^{B1}$, and a structure B2 is bonded to the position of $A^{B2}$. In the structure, * represents a binding position.

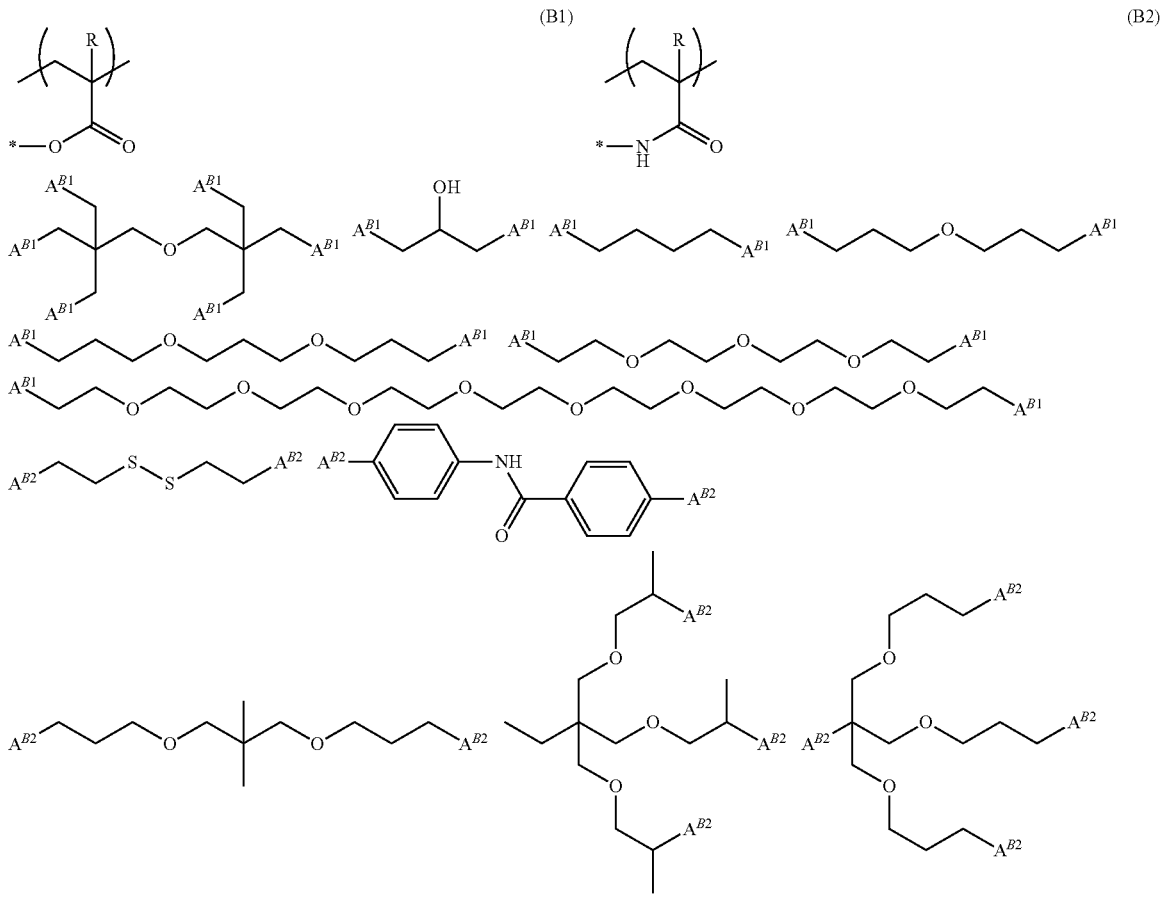

The content of the constitutional unit B with respect to the dry mass of the functional polymer membrane is preferably equal to or greater than 1% by mass to less than 25% by mass, and more preferably equal to or greater than 2% by mass to less than 18% by mass.

[Constitutional Unit C]

It is preferable that the specific polymer compound further contains, as a constitutional unit C, a constitutional unit derived from monofunctional monomer having an anionic group.

The constitutional unit C does not contain a constitutional unit corresponding to a constitutional unit A' which will be described later.

In a case where the specific polymer compound has the constitutional unit C, a functional polymer membrane having low electric resistance is obtained.

The monofunctional monomer having an anionic group is preferably a radically polymerizable monomer, more preferably a monomer having an ethylenically unsaturated group (ethylenically unsaturated double bond), and even more preferably a monomer having a (meth)acryloyloxy group or a (meth)acrylamide group, that is, a (meth)acrylate compound or a (meth)acrylamide compound. The molecular weight (in a case where the monomer has a molecular weight distribution, the weight-average molecular weight) of the monofunctional monomer having an anionic group is preferably equal to or smaller than 2,000, and more preferably equal to or smaller than 1,000.

Examples of the anionic group include a carboxyl group (—COOH), a sulfo group (—SO$_3$H), a phosphonic acid group (—P(=O)(OH)$_2$), a phosphinic acid group (—PH(=O)OH), a phosphoric acid group (—OP(=O)(OH)$_2$), a nitric acid group (—NO$_3$), a carbonic acid group (—HCO$_3$), and a thiol group (—SH). Among these, a sulfo group, a phosphonic acid group, a phosphoric acid group, and a carboxyl group are preferable, and a sulfo group is more preferable.

The anionic group may form a salt or form a quaternary ammonium salt, an alkali metal salt, an alkaline earth metal salt, or the like.

It is preferable that the constitutional unit C contains a sulfo group or a salt thereof.

As the monofunctional monomer having an anionic group, a component C contained in the composition for forming a functional polymer membrane of the present invention that will be described later is preferable.

The constitutional unit C is more preferably represented by Formula IC.

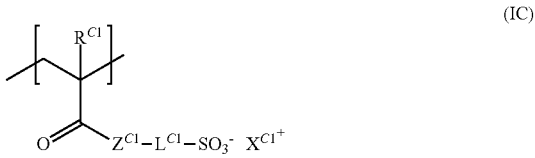

(IC)

In Formula IC, $R^{C1}$ represents a hydrogen atom or an alkyl group; $Z^{C1}$ represents —O— or —N(Ra)—; Ra represents a hydrogen atom or an alkyl group; $L^{C1}$ represents an alkylene group or an arylene group; and $X^{C1+}$ represents an inorganic cation or an organic cation.

$R^{C1}$ is preferably a hydrogen atom or a linear or branched alkyl group. The number of carbon atoms in the alkyl group is preferably 1 to 10, more preferably 1 to 6, even more preferably 1 to 4, particularly preferably 1 or 2, and most preferably 1.

$R^{C1}$ is more preferably a hydrogen atom or a methyl group, and even more preferably a hydrogen atom.

$Z^{C1}$ represents —O— or —N(Ra)—, and preferably represents —N(Ra)—. Ra represents a hydrogen atom or an alkyl group. The alkyl group is preferably an alkyl group having 1 to 4 carbon atoms, more preferably a methyl group or an ethyl group, and even more preferably a methyl group. Ra is particularly preferably a hydrogen atom or a methyl group.

The number of carbon atoms in the alkylene group represented by $L^{C1}$ is preferably 1 to 10, more preferably 2 to 8, and even more preferably 3 to 8. Examples of the alkylene group include an ethylene group, a propylene group, a 1-methyl methylene group, a 1,1-dimethyl methylene group, a 1,1-dimethyl ethylene group, a butylene group, a hexamethylene group, and an octamethylene group.

The number of carbon atoms in the arylene group represented by $L^{C1}$ is preferably 6 to 16, more preferably 6 to 12, and even more preferably 6 to 10. Examples of the arylene group include a phenylene group and a naphthylene group.

The alkylene group and the arylene group represented by $L^{C1}$ may have a substituent. The type of the substituent is not particularly limited, and examples thereof preferably include a halogen atom, an alkyl group, an alkynyl group, an alkenyl group, an alkoxy group, an alkylthio group, and an aryl group.

The inorganic cation represented by $X^{C1+}$ is preferably a proton or an alkali metal ion, and more preferably a proton, a lithium ion, a sodium ion, or a potassium ion.

Examples of the organic cation represented by $X^{C1+}$ include a quaternary ammonium cation, a cation obtained by alkylating a nitrogen atom in an aromatic nitrogen-containing heterocyclic ring, and the like.

Examples of the quaternary ammonium cation include a tetramethyl ammonium cation, a tetraethyl ammonium cation, and a dimethyl benzyl ammonium cation. Examples of the cation obtained by alkylating a nitrogen atom in an aromatic nitrogen-containing heterocyclic ring include a pyridinium cation.

Among these, as $X^{C1+}$, a proton, an alkali metal ion, a quaternary ammonium cation, or a pyridinium cation is preferable.

In Formula IC, —SO$_3^-$ and $X^{C1+}$ may form a covalent bond or an ionic bond, or $X^{C1+}$ may be liberated.

Specific examples of the constitutional unit C will be shown below, but the present invention is not limited thereto.

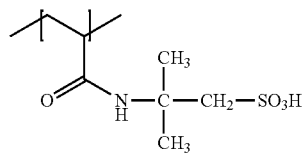

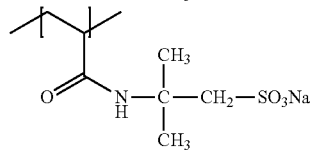

-continued

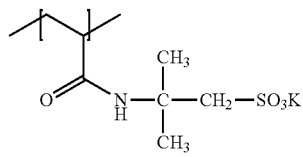

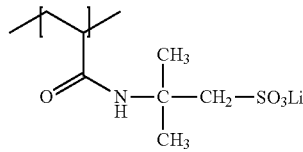

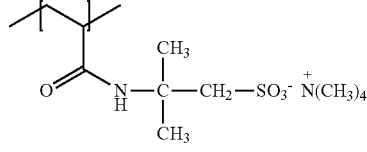

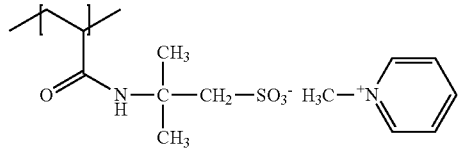

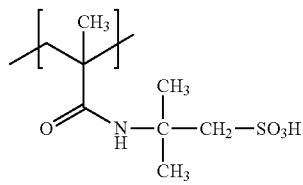

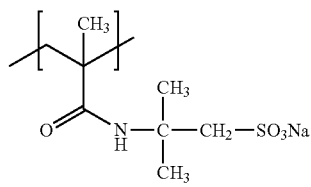

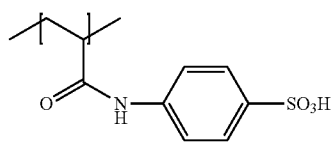

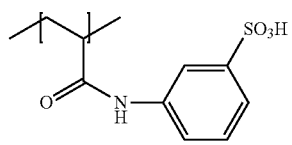

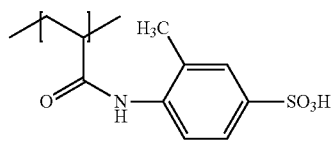

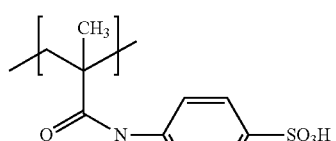

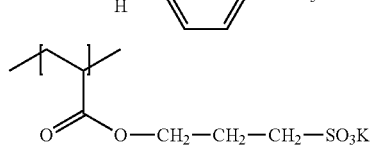

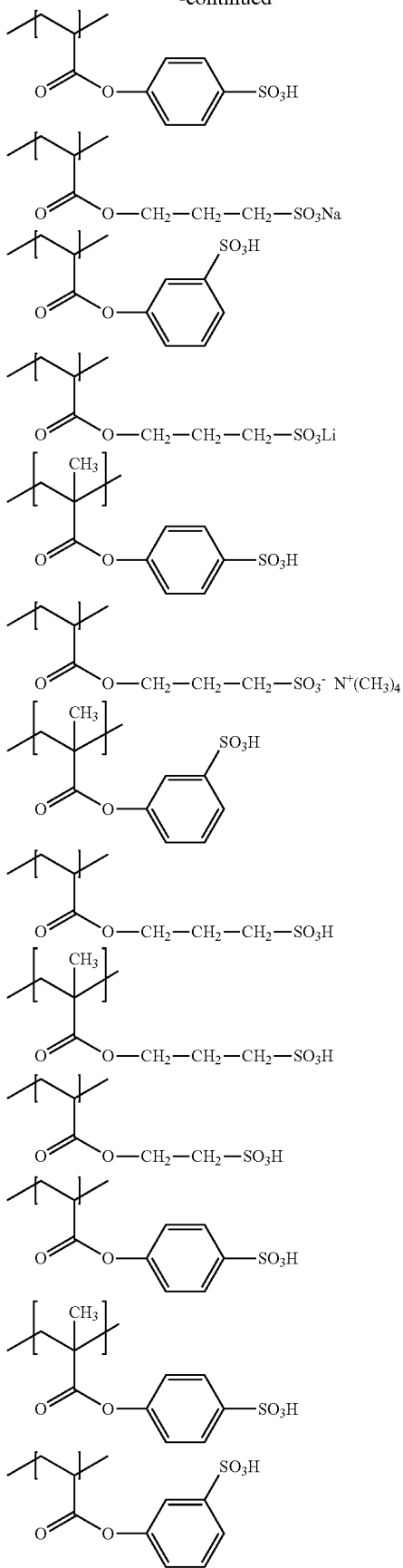

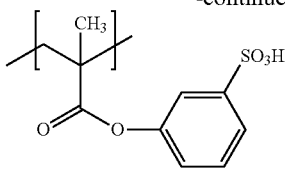

The content of the constitutional unit C with respect to the dry mass of the functional polymer membrane is preferably equal to or greater than 5% by mass to less than 40% by mass, and more preferably equal to or greater than 10% by mass to less than 36% by mass.

[Constitutional Unit D]

It is preferable that the specific polymer compound further contains, as a constitutional unit D, a constitutional unit derived from a monofunctional monomer not having an ionic group.

In a case where the specific polymer compound contains the constitutional unit D, a functional polymer membrane having low water permeability is obtained.

The constitutional unit D preferably contains a constitutional unit derived from a (meth)acrylamide compound and/or a constitutional unit derived from a (meth)acrylate compound, and more preferably contains a constitutional unit derived from a (meth)acrylate compound.

As the monofunctional monomer not having an ionic group, a component D contained in the composition for forming a functional polymer membrane of the present invention that will be described later is preferable.

The monofunctional monomer not having an ionic group is preferably water-soluble.

The water-soluble monofunctional monomer not having an ionic group refers to a monomer that dissolves 0.5% by mass or more in distilled water at 25° C. The monofunctional monomer not having an ionic group more preferably dissolves 1% by mass or more in distilled water at 25° C., and particularly preferably dissolves 3% by mass or more.

The constitutional unit D is not particularly limited, but preferably has a constitutional unit represented by Formula IH.

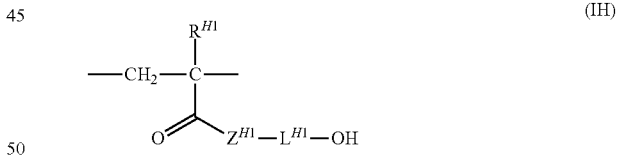

(IH)

In Formula IH, $R^{H1}$ represents a hydrogen atom or an alkyl group; $Z^{H1}$ represents —O— or —N(Ra)—; Ra represents a hydrogen atom or an alkyl group; and $L^{H1}$ represents a divalent linking group.

In Formula IH, $R^{H1}$ represents a hydrogen atom or an alkyl group. The alkyl group is preferably an alkyl group having 1 to 4 carbon atoms, more preferably a methyl group or an ethyl group, and even more preferably a methyl group. $R^{H1}$ is particularly preferably a hydrogen atom or a methyl group.

$Z^{H1}$ represents —O— or —N(Ra)—, and preferably represents —O—. Ra represents a hydrogen atom or an alkyl group. The alkyl group is preferably an alkyl group having 1 to 4 carbon atoms, more preferably a methyl group or an ethyl group, and even more preferably a methyl group. Ra is particularly preferably a hydrogen atom or a methyl group.

$L^{H1}$ represents a divalent linking group, and more preferably represents an alkylene group. The alkylene group is preferably an alkylene group having 2 to 10 carbon atoms, and more preferably an alkylene group having 2 to 4 carbon atoms. The alkylene group may be further substituted with a substituent. Examples of preferred substituents include an alkyl group having 1 to 4 carbon atoms.

[Constitutional Unit A']

It is preferable that the specific polymer compound further contains a constitutional unit represented by Formula I' as a constitutional unit A'.

The constitutional unit A' is preferably a constitutional unit derived from a component A' contained in the composition for forming a functional polymer membrane of the present invention that will be described later.

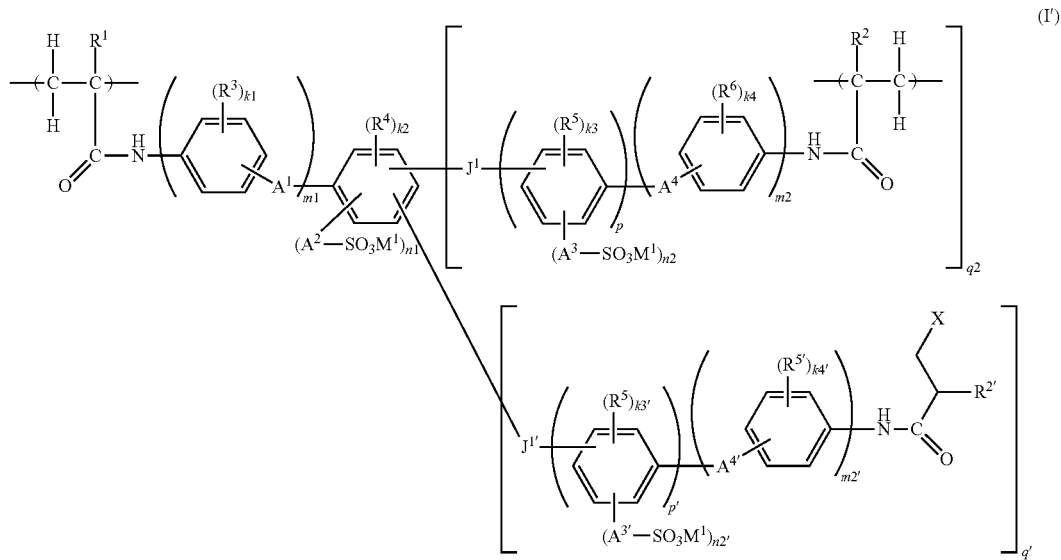

(I')

Specific examples of the constitutional unit D will be shown below, but the present invention is not limited thereto. In the specific examples, R represents a hydrogen atom or a methyl group.

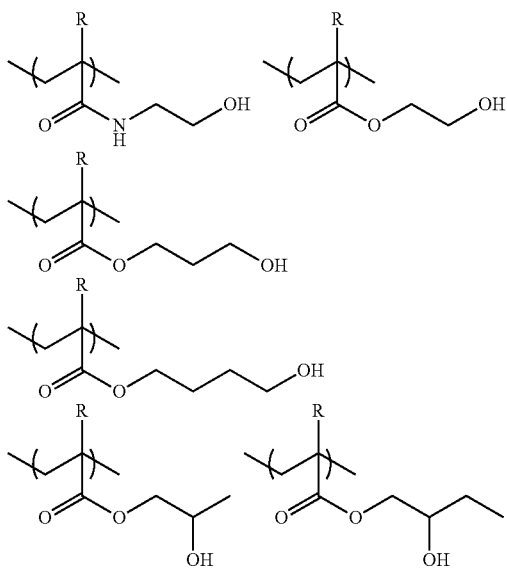

The content of the constitutional unit D with respect to the dry mass of the functional polymer membrane is preferably equal to or greater than 5% by mass to less than 25% by mass, and more preferably equal to or greater than 8% by mass to less than 20% by mass.

In Formula I', $R^1$, $R^2$, and $R^{2'}$ each independently represent a hydrogen atom or an alkyl group; $R^3$ to $R^6$, $R^{5'}$, and $R^{6'}$ each independently represent a substituent; k1, k4, and k4' each independently represent an integer of 0 to 4; k2, k3, and k3' each independently represent an integer of 0 to 3; in a case where there is a plurality of groups represented by at least any one of $R^3$, $R^4$, $R^5$, $R^6$, $R^{5'}$, or $R^{6'}$, $R^3$ to $R^6$, $R^{5'}$, and $R^{6'}$ may be the same as or different from each other and may form a ring by being bonded to each other; $A^1$ to $A^4$, $A^{3'}$, and $A^{4'}$ each independently represent a single bond or a divalent linking group; $M^1$ represents a hydrogen atom, an organic base ion, or a metal ion; n1, n2, and n2' each independently represent an integer of 1 to 4; m1, m2, and m2' each independently represent 0 or 1; $J^1$ and $J^{1'}$ each independently represent a single bond, —O—, —S—, —SO$_2$—, —CO—, —CR$^7$R$^8$—, or an alkenylene group; $R^7$ and $R^8$ each independently represent a hydrogen atom, an alkyl group, or a halogen atom; p represents an integer of equal to or greater than 1; p' represents an integer of equal to or greater than 1; q2 represents an integer of 0 to 3; q' represents an integer of 1 to 4; and X represents a halogen atom.

$R^1$ to $R^6$, k1 to k4, $A^1$ to $A^4$, $M^1$, n1, n2, m1, m2, $J^1$, and p in Formula I' have the same definition as $R^1$ to $R^6$, k1 to k4, $A^1$ to $A^4$, $M^1$, n1, n2, m1, m2, $J^1$, and p in Formula I, and the preferred aspect thereof is also the same.

In Formula I', q2 represents an integer of 0 to 3. q2 is preferably 0, 1, or 2, more preferably 0 or 1, and even more preferably 0.

R2', R5', and R6' in Formula I' have the same definition as R2, R5, and R6 in Formula I, and the preferred aspect thereof is also the same.

k3' and k4' in Formula I' have the same definition as k3 and k4 in Formula I, and the preferred aspect thereof is also the same.

A3' and A4' in Formula I' have the same definition as A3 and A4 in Formula I, and the preferred aspect thereof is also the same.

n2' in Formula I' has the same definition as n2 in Formula I, and the preferred aspect thereof is also the same.

m2' in Formula I' has the same definition as m2 in Formula I, and the preferred aspect thereof is also the same.

J1' in Formula I' has the same definition as J1 in Formula I, and the preferred aspect thereof is also the same.

p' in Formula I' has the same definition as p in Formula I, and the preferred aspect thereof is also the same.

q' in Formula I' has the same definition as q in Formula I, and the preferred aspect thereof is also the same.

In Formula I', X represents a halogen atom. X is preferably a F atom, a Cl atom, Br atom, or an I atom, more preferably a F atom or a Cl atom, and even more preferably a Cl atom.

The constitutional unit A' is preferably a constitutional unit represented by Formula I'-A.

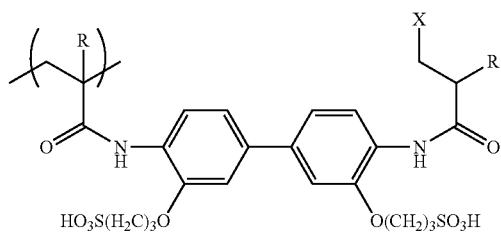

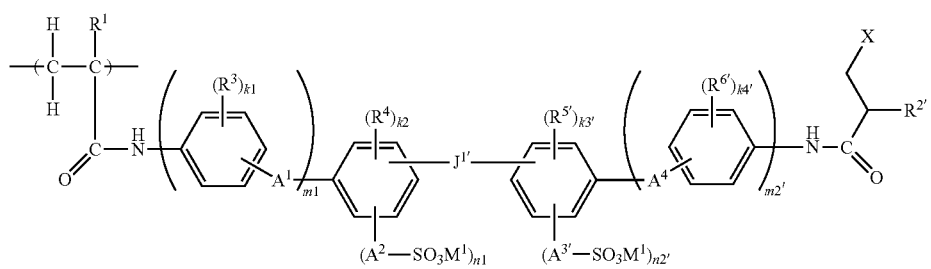

(I'-A)

R1, R2', R3, R4, R5', R6', k1, k2, k3', k4', A1, A2, A3', A4', M1, m1, m2', n1, n2', J1', and X in Formula I'-A have the same definition as R1, R2', R3, R4, R5', R6', k1, k2, k3', k4', A1, A2, A3', A4', M1, m1, m2', n1, n2', J1', and X in Formula I', and the preferred aspect thereof is also the same.

Specific examples of the constitutional unit A' will be shown below, but the present invention is not limited thereto. In the specific examples, R represents a hydrogen atom or a methyl group, and X represents a halogen atom.

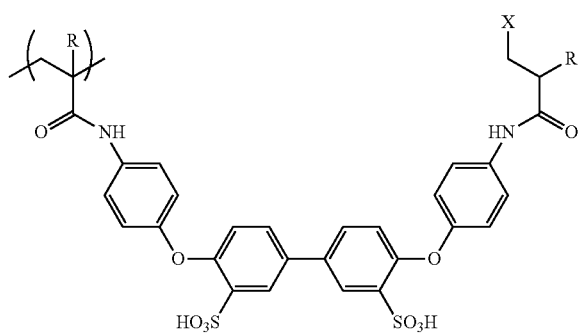

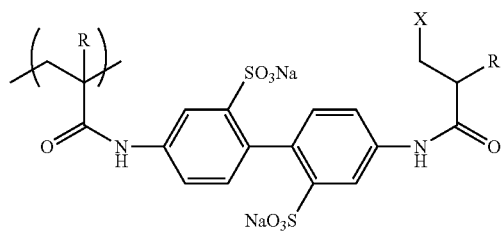

-continued

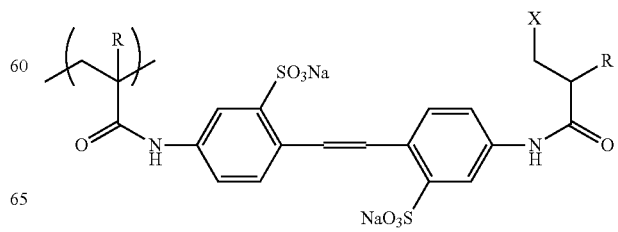

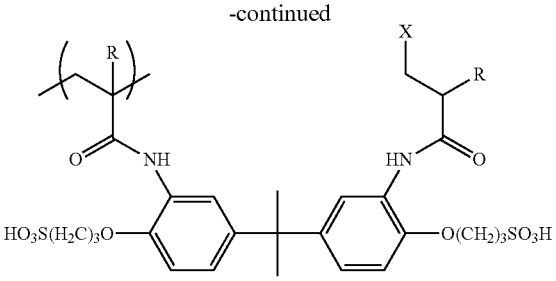

-continued

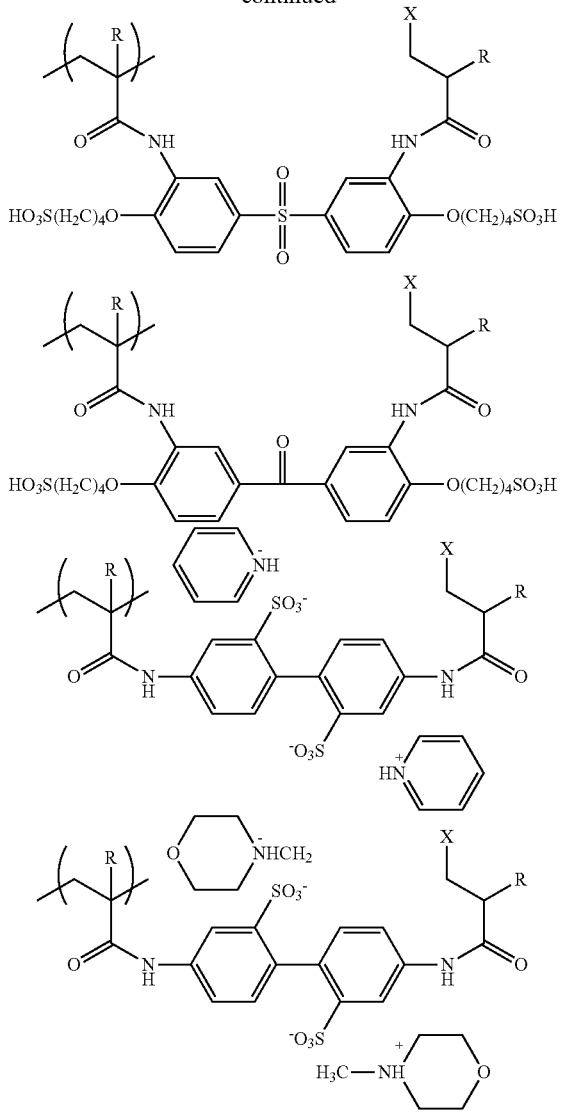

The content of the constitutional unit A' with respect to the dry mass of the functional polymer membrane is preferably equal to or greater than 0.01% by mass to less than 7% by mass, and more preferably equal to or greater than 0.1% by mass to less than 4% by mass.

The content of the constitutional unit A' with respect to the total mass of the constitutional unit A and the constitutional unit A' is preferably equal to or greater than 0.1% by mass to less than 10% by mass, more preferably equal to or greater than 1% by mass to less than 6% by mass, and even more preferably equal to or greater than 1.5% by mass to less than 4% by mass.

The content of the constitutional unit A' with respect to the total mass of the constitutional unit A and the constitutional unit A' can be calculated by the following equation.

$$P_{AA'} = \{P_{A'}/(P_A + P_{A'})\} \times 100$$

$P_{AA'}$: content of constitutional unit A' with respect to total mass of constitutional unit A and constitutional unit A' (% by mass)

$P_A$: content of constitutional unit A with respect to total mass of specific polymer compound (% by mass)

$P_{A'}$: content of constitutional unit A' with respect to total mass of specific polymer compound (% by mass)

[Other Constitutional Units]

The specific polymer compound may contain other constitutional units in addition to the constitutional units A to D and A'.

The content of other constitutional units with respect to the total mass of the specific polymer compound is preferably equal to or smaller than 3% by mass, more preferably equal to or smaller than 2% by mass, and even more preferably equal to or smaller than 1% by mass.

<Support>

The functional polymer membrane of the present invention preferably has a support, and more preferably has a porous support.

It is preferable that the functional polymer membrane of the present invention has the support as a reinforcing material.

Examples of the support include a resin film, woven cloth, non-woven cloth, sponge, and the like. Among these, non-woven cloth is preferable.

Examples of the porous support include woven cloth, non-woven cloth, a sponge-like film, a film having fine through holes, and the like.

Examples of materials forming the support include polyolefin (polyethylene, polypropylene, or the like), polyacrylonitrile, polyvinyl chloride, polyester, polyamide, polysulfone, polyether sulfone, polyphenylene sulfone, polyphenylene sulfide, polyimide, polyethermide, polyamide imide, polycarbonate, an acryl resin, cellulose acetate, polyvinylidene fluoride, polytetrafluoroethylene, polyhexafluoropropylene, polychlorotrifluoroethylene, and a copolymer of these.

As commercially available porous supports, those marketed by Japan Vilene Company, Ltd, Freudenberg & Co. KG Filtration Technologies, LLC, and Sefar AG are exemplified.

It is preferable that the support is hydrophilic. As a technique for making the support hydrophilic, it is possible to use general treatment methods such as a corona treatment, an ozone treatment, a sulfuric acid treatment, and a silane coupling agent treatment.

The thickness of the support is preferably 10 to 500 μm, more preferably 20 to 400 μm, even more preferably 50 to 300 μm, and particularly preferably 80 to 300 μm.

The functional polymer membrane of the present invention is preferably a membrane having the specific polymer compound on the surface and/or on the inside of a porous support.

Furthermore, the functional polymer membrane of the present invention is preferably membrane containing water, and more preferably a membrane in which the specific polymer compound contains water and is in the form of gel.

(Separation Membrane Module•Ion-Exchange Device)

The functional polymer membrane of the present invention is preferably made into a composite membrane combined with a porous support. Furthermore, the functional polymer membrane is preferably made into a separation membrane module using the functional polymer membrane. In addition, by using the functional polymer membrane, the composite membrane, or the functional polymer membrane module of the present invention, it is possible to prepare an ion-exchange device having means for ion exchange, deionization, or purification. The functional polymer membrane can also be suitably used as a fuel cell.

The functional polymer membrane of the present invention can be suitably used by being made into a module. Examples of the module include a spiral type, a hollow fiber type, a pleats type, a tubular type, a plate-and-frame type, a stack type, and the like.

The use of the functional polymer membrane of the present invention is mainly aimed at ion exchange in particular. However, the use of the functional polymer membrane of the present invention is not limited to ion exchange, and the functional polymer membrane is considered to be able to be suitably used as a proton conducting membrane for a fuel cell and for removing a protein and a virus.

(Composition for Forming a Functional Polymer Membrane)

The composition for forming a functional polymer membrane (hereinafter, simply referred to as "composition" as well) of the present invention contains a monomer represented by Formula II as a component A and a polyfunctional monomer having a C log P value of equal to or greater than −0.3 to less than 3.0 as a component B.

<Component A>

The composition for forming a functional polymer membrane of the present invention contains a monomer represented by Formula II as a component A.

The component A does not contain a monomer corresponding to a component A' which will be described later.

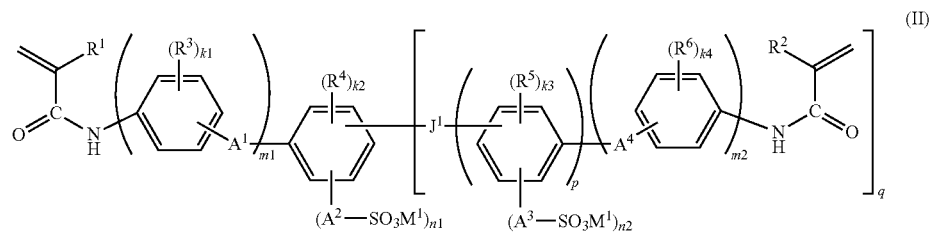

(II)

In Formula II, $R^1$ and $R^2$ each independently represent a hydrogen atom or an alkyl group; $R^3$ to $R^6$ each independently represent a substituent; k1 and k4 each independently represent an integer of 0 to 4; k2 and k3 each independently represent an integer of 0 to 3; in a case where there is a plurality of groups represented by at least any one of $R^3$, $R^4$, $R^5$, or $R^6$, $R^3$ to $R^6$ may be the same as or different from each other and may form a ring by being bonded to each other; $A^1$ to $A^4$ each independently represent a single bond or a divalent linking group; $M^1$ represents a hydrogen atom, an organic base ion, or a metal ion; n1 and n2 each independently represent an integer of 1 to 4; m1 and m2 each independently represent 0 or 1; $J^1$ represents a single bond, —O—, —S—, —SO$_2$—, —CO—, —CR$^7$R$^8$—, or an alkenylene group; $R^7$ and $R^8$ each independently represent a hydrogen atom, an alkyl group, or a halogen atom; p represents an integer of equal to or greater than 1; and q represents an integer of 1 to 4.

$R^1$ to $R^6$, k1 to k4, $A^1$ to $A^4$, $M^1$, n1, n2, m1, m2, $J^1$, p, and q in Formula II have the same definition as $R^1$ to $R^6$, k1 to k4, $A^1$ to $A^4$, $M^1$, n1, n2, m1, m2, $J^1$, p, and q in Formula I, and the preferred aspect thereof is also the same.

The component A is preferably a compound represented by Formula II-A.

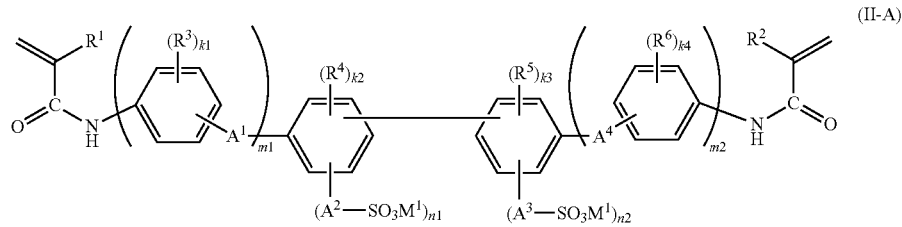

(II-A)

R¹ to R⁶, k1 to k4, A¹ to A⁴, M¹, n1, n2, m1, and m2 in Formula II-A have the same definition as R¹ to R⁶, k1 to k4, A¹ to A⁴, M¹, n1, n2, m1, and m2 in Formula I, and the preferred aspect thereof is also the same.

Specific examples of the component A will be shown below, but the present invention is not limited thereto.

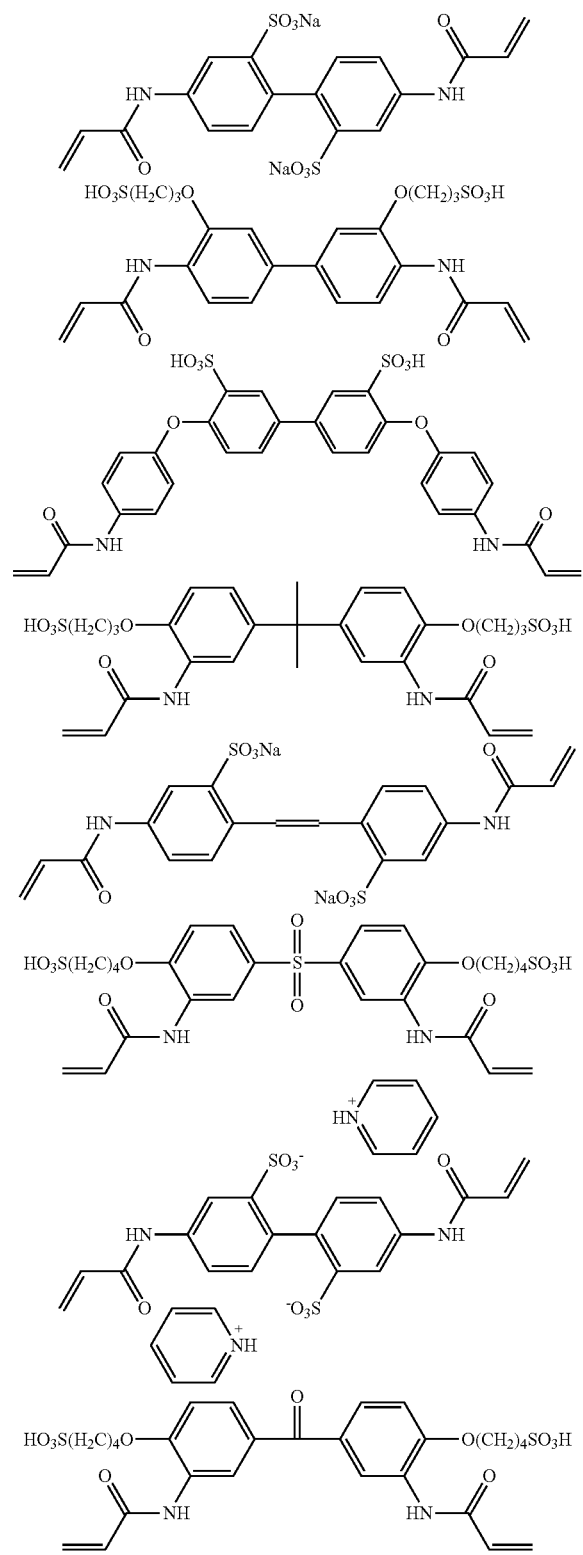

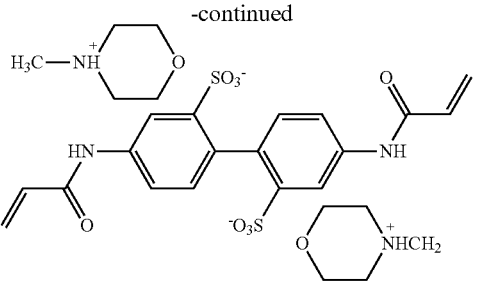

-continued

In the present invention, one kind of component A may be used singly, or two or more kinds thereof may be used in combination.

The content of the component A with respect to the total mass of the composition is preferably equal to or greater than 10% by mass to less than 60% by mass, and more preferably equal to or greater than 15% by mass to less than 40% by mass.

The content of the component A with respect to the total mass of the polymerizable compound is preferably equal to or greater than 15% by mass to less than 90% by mass, and more preferably equal to or greater than 20% by mass to less than 75% by mass.

In the present specification, "polymerizable compound" means a compound having at least one polymerizable group.

<Component B>

The composition for forming a functional polymer membrane of the present invention contains, as a component B, a polyfunctional monomer having a C log P value of equal to or greater than −0.3 to less than 3.0.

The C log P value of the polyfunctional monomer is equal to or greater than −0.3 to less than 3.0, preferably equal to or greater than 0 to less than 3.0, and more preferably equal to or greater than 0.5 to less than 3.0. In a case where the C log P value is within the above range, a functional polymer membrane having excellent pH resistance and low electric resistance is obtained.

The component B is preferably a radically polymerizable monomer, and more preferably a monomer having an ethylenically unsaturated group (ethylenically unsaturated double bond). The molecular weight (in a case where the component B has a molecular weight distribution, the weight-average molecular weight) of the component B is preferably equal to or smaller than 3,000, more preferably equal to or smaller than 2,000, and even more preferably equal to or smaller than 1,000.

The component B preferably contains a (meth)acrylate compound and/or a (meth)acrylamide compound, and more preferably contains a (meth)acrylate compound.

The component B preferably contains a compound represented by Formula M-1 or M-2, and more preferably contains a compound represented by Formula M-1 from the viewpoint of reducing water permeability.

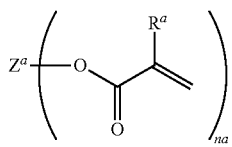

(M-1)

-continued

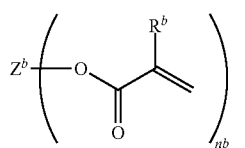
(M-2)

In Formula M-1, na represents an integer of equal to or greater than 2, $Z^a$ represents an na-valent organic group, and $R^a$ each independently represents a hydrogen atom or a methyl group. In Formula M-2, nb represents an integer of equal to or greater than 2, $Z^b$ represents an nb-valent organic group, and $R^b$ each independently represents a hydrogen atom or a methyl group.

na, $Z^a$, $R^a$, nb, $Z^b$, and $R^b$ in Formulae M-1 and M-2 have the same definition as na, $Z^a$, $R^a$, nb, $Z^b$, and $R^b$ in Formulae CR-1 and CR-2, and the preferred aspect thereof is also the same.

Specific examples of the component B and the C log P values thereof will be shown below, but the present invention is not limited thereto.

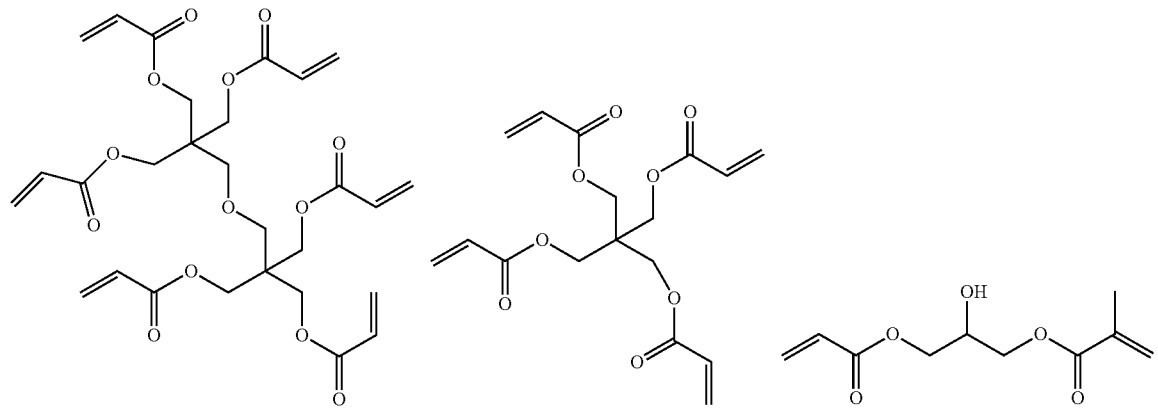

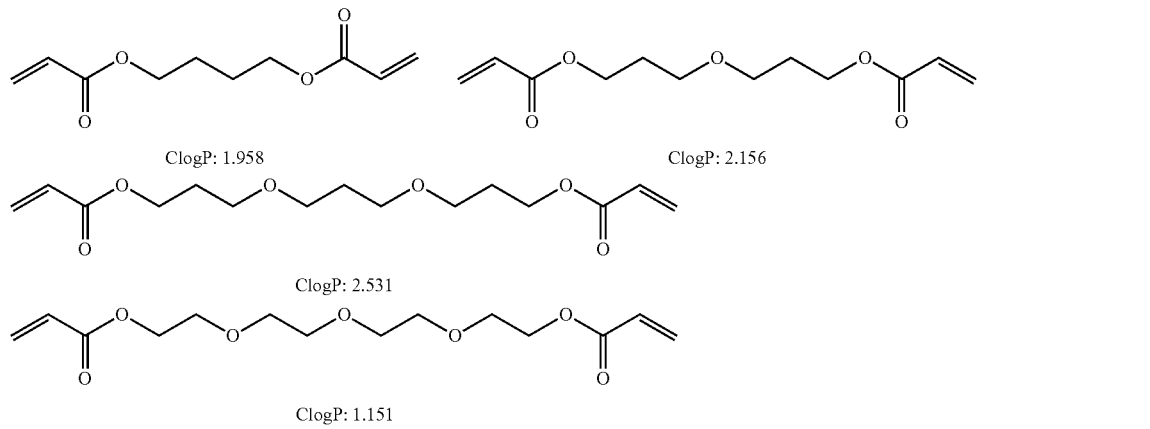

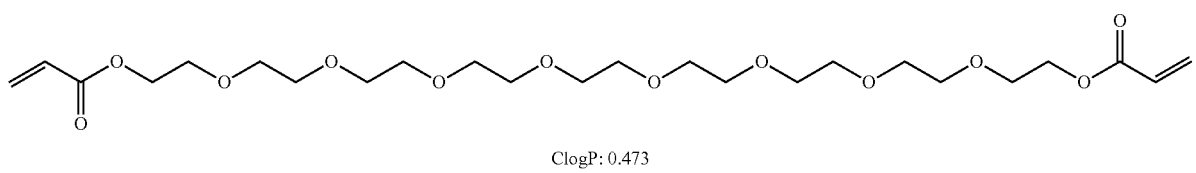

ClogP: 0.473

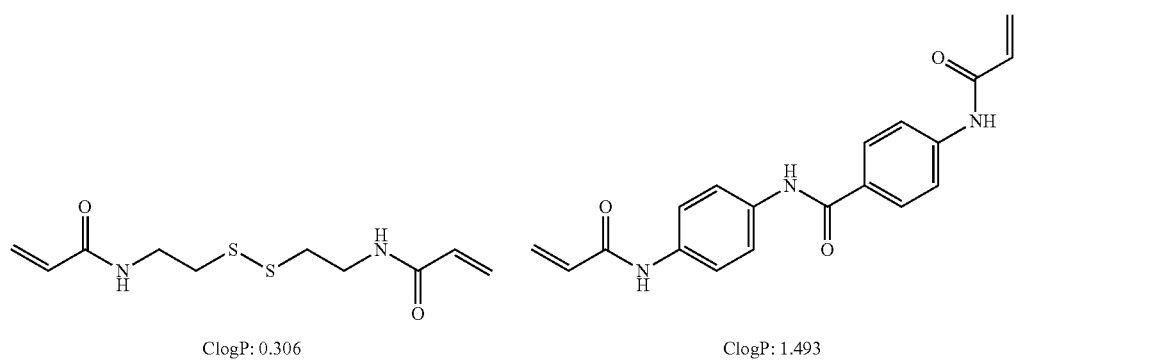

ClogP: 0.306        ClogP: 1.493

-continued

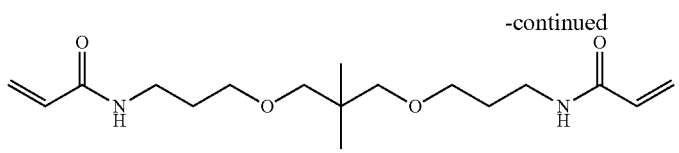

ClogP: 1.121

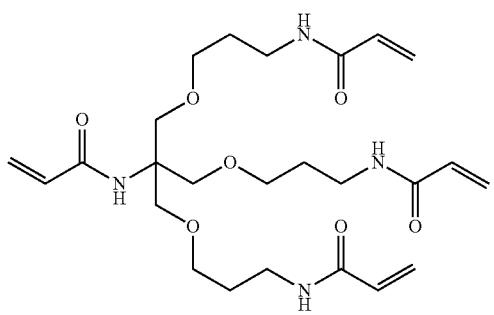

ClogP: 0.193

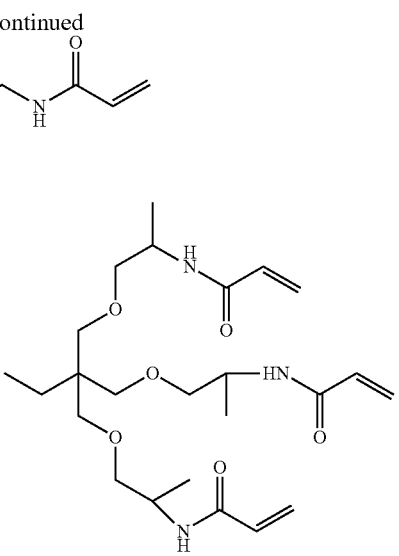

ClogP: 1.837

In the present invention, one kind of component B may be used singly, or two or more kinds thereof may be used in combination.

The content of the component B with respect to the total mass of the composition is preferably equal to or greater than 1% by mass to less than 20% by mass, and more preferably equal to or greater than 2% by mass to less than 16% by mass.

The content of the component B with respect to the total mass of the polymerizable compound is preferably equal to or greater than 1% by mass to less than 30% by mass, and more preferably equal to or greater than 3% by mass to less than 30% by mass.

The content of the component B with respect to 1 mol of the component A in the composition is preferably 0.15 to 1.25 mol, and more preferably 0.15 to 0.75 mol.

<Component C>

It is preferable that the composition for forming a functional polymer membrane of the present invention contains, as a component C, a monofunctional monomer having an anionic group.

The component C does not contain a monomer corresponding to a component A' which will be described later.

In a case where the composition contains the component C, a composition can be obtained from which a functional polymer membrane having low electric resistance is obtained.

The monofunctional monomer having an anionic group is preferably a radically polymerizable monomer, and more preferably a monomer having an ethylenically unsaturated group (ethylenically unsaturated double bond). The molecular weight (in a case where the monomer has a molecular weight distribution, the weight-average molecular weight) of the monofunctional monomer having an anionic group is preferably equal to or smaller than 2,000, and more preferably equal to or smaller than 1,000.

It is preferable that the component C contains a (meth)acrylate compound or a (meth)acrylamide compound.

Examples of the anionic group include a carboxyl group (—COOH), a sulfo group (—SO$_3$H), a phosphonic acid group (—P(=O)(OH)$_2$), a phosphinic acid group (—PH(=O)OH), a phosphoric acid group (—OP(=O)(OH)$_2$), a nitric acid group (—NO$_3$), a carbonic acid group (—HCO$_3$), and a thiol group (—SH). Among these, a sulfo group, a phosphonic acid group, a phosphoric acid group, and a carboxyl group are preferable, and a sulfo group is more preferable.

The anionic group may form a salt or form a quaternary ammonium salt, an alkali metal salt, an alkaline earth metal salt, or the like.

It is preferable that the component C contains a sulfo group or a salt thereof.

It is preferable that the component C contains a monomer represented by Formula IC'.

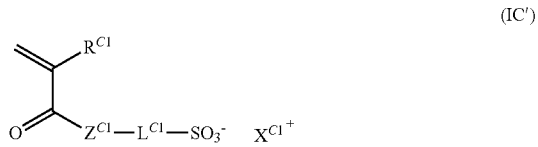

(IC')

$R^{C1}$, $Z^{C1}$, $L^{C1}$, and $X^{C1+}$ in formula IC' have the same definition as $R^{C1}$, $Z^{C1}$, $L^{C1}$, and $X^{C1+}$ in Formula IC, and the preferred aspect thereof is also the same.

Specific examples of the component C will be shown below, but the present invention is not limited thereto.

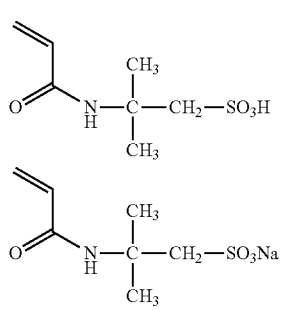

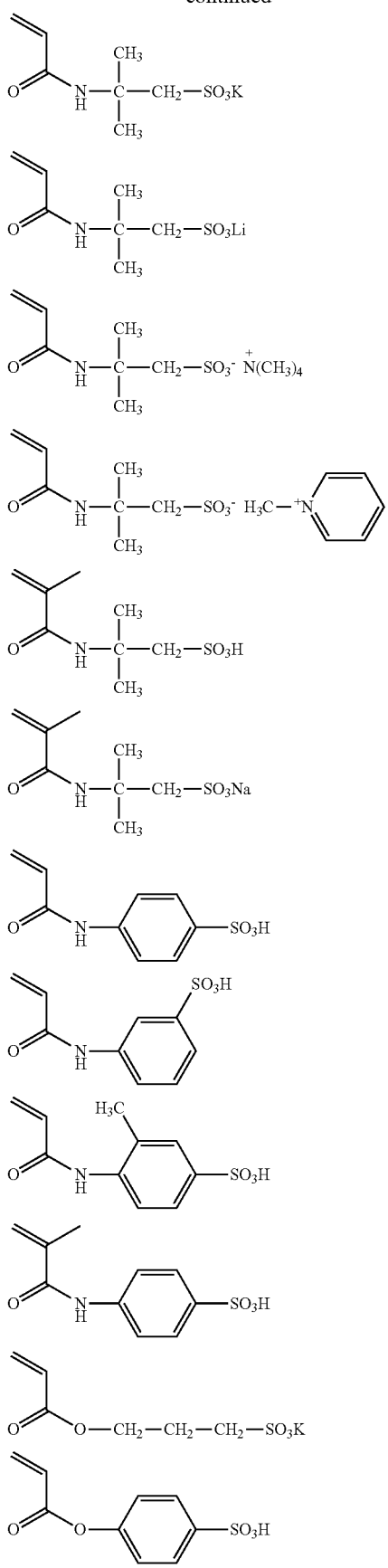
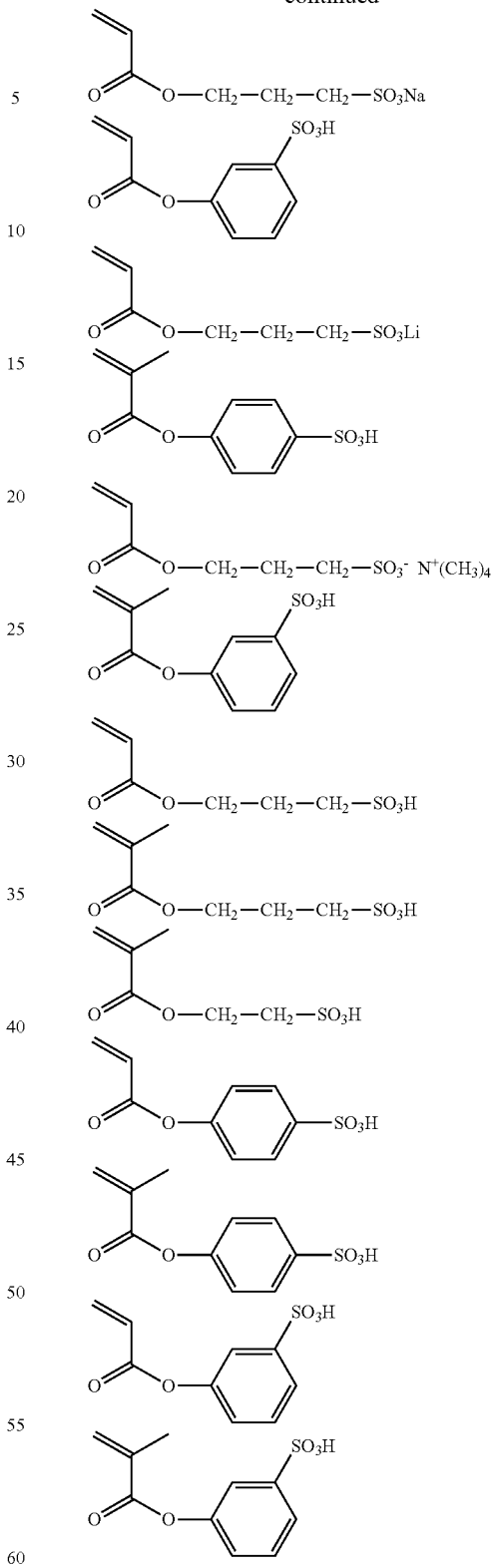
In the present invention, one kind of component C may be used singly, or two or more kinds thereof may be used in combination.
The content of the component C with respect to the total mass of the composition is preferably equal to or greater than 5% by mass to less than 35% by mass, and more preferably equal to or greater than 10% by mass to less than 32% by mass.

The content of the component C with respect to the total mass of the polymerizable compound is preferably equal to or greater than 5% by mass to less than 60% by mass, and more preferably equal to or greater than 12% by mass to less than 35% by mass.

<Component D>

It is preferable that the composition for forming a functional polymer membrane of the present invention contains, as a component D, a monofunctional monomer not having an ionic group.

In a case where the composition contains the component D, it is possible to obtain a composition from which a functional polymer membrane having low water permeability is obtained.

The monofunctional monomer not having an ionic group is preferably a radically polymerizable monomer, and more preferably a monomer having an ethylenically unsaturated group (ethylenically unsaturated double bond). The molecular weight (in a case where the monomer has a molecular weight distribution, the weight-average molecular weight) of the monofunctional monomer not having an ionic group is preferably equal to or smaller than 2,000, and more preferably equal to or smaller than 1,000.

$R^{H1}$, $Z^{H1}$, and $L^{H1}$ in Formula MH have the same definition as $R^{H1}$, $Z^{H1}$, $L^{H1}$ in Formula IH, and the preferred range thereof is also the same.

Specific examples of the compound represented by Formula MH include hydroxyethyl (meth)acrylamide, hydroxypropyl (meth)acrylamide, hydroxybutyl (meth)acrylamide, hydroxyethyl (meth)acrylate, hydroxypropyl (meth)acrylate, hydroxybutyl (meth)acrylate, and the like, but the present invention is not limited thereto.

In the present invention, one kind of component D may be used singly, or two or more kinds thereof may be used in combination.

The content of the component D with respect to the total mass of the composition is preferably equal to or greater than 5% by mass to less than 20% by mass, and more preferably equal to or greater than 5% by mass to less than 15% by mass.

The content of the component D with respect to the total mass of the polymerizable compound is preferably equal to or greater than 10% by mass to less than 35% by mass, and more preferably equal to or greater than 10% by mass to less than 30% by mass.

<Component A'>

It is preferable that the composition for forming a functional polymer membrane of the present invention contains a monomer represented by Formula II' as a component A'.

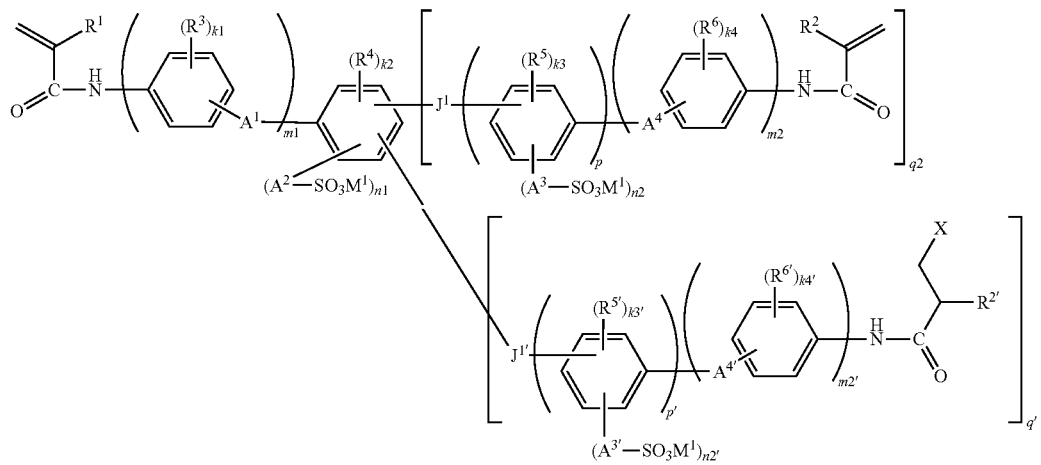

(II')

The component D preferably contains a (meth)acrylamide compound and/or a (meth)acrylate compound, and more preferably contains a (meth)acrylate compound.

The monofunctional monomer not having an ionic group is preferably water-soluble.

The component D preferably contains a compound represented by Formula MH.

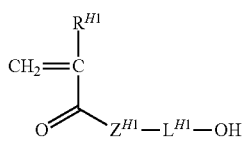

(MH)

In Formula II', $R^1$, $R^2$, and $R^{2'}$ each independently represent a hydrogen atom or an alkyl group; $R^3$ to $R^6$, $R^{5'}$, and $R^{6'}$ each independently represent a substituent; k1, k4, and k4' each independently represent an integer of 0 to 4; k2, k3, and k3' each independently represent an integer of 0 to 3; in a case where there is a plurality of groups represented by at least any one of $R^3$, $R^4$, $R^5$, $R^6$, $R^{5'}$, or $R^{6'}$, $R^3$ to $R^6$, $R^{5'}$, and $R^{6'}$ may be the same as or different from each other and may form a ring by being bonded to each other; $A^1$ to $A^4$, $A^{3'}$, and $A^{4'}$ each independently represent a single bond or a divalent linking group; $M^1$ represents a hydrogen atom, an organic base ion, or a metal ion; n1, n2, and n2' each independently represent an integer of 1 to 4; m1, m2, and m2' each independently represent 0 or 1; $J^1$ and $J^{1'}$ each independently represent a single bond, —O—, —S—, —SO$_2$—, —CO—, —CR$^7$R$^8$—, or an alkenylene group; $R^7$ and $R^8$ each independently represent a hydrogen atom, an alkyl group, or a halogen atom; p represents an integer of equal to or greater than 1; q represents an integer of equal to or greater than 1; q2 represents an integer of 0 to 3; q' represents an integer of 1 to 4; and X represents a halogen atom.

$R^1$ to $R^6$, k1 to k4, $A^1$ to $A^4$, $M^1$, n1, n2, m1, m2, $J^1$, and p in Formula II' have the same definition as $R^1$ to $R^6$, k1 to k4, $A^1$ to $A^4$, $M^1$, n1, n2, m1, m2, $J^1$, and p in Formula II, and the preferred aspect thereof is also the same.

In Formula II', q2 represents an integer of 0 to 3. q is preferably 0, 1, or 2, more preferably 0 or 1, and even more preferably 0.

$R^{2'}$, $R^{5'}$, and $R^{6'}$ in Formula II' have the same definition as $R^2$, $R^5$, and $R^6$ in Formula II, and the preferred aspect thereof is also the same.

k3' and k4' in Formula II' have the same definition as k3 and k4 in Formula II, and the preferred aspect thereof is also the same.

$A^{3'}$ and $A^{4'}$ in Formula II' have the same definition as $A^3$ and $A^4$ in Formula II, and the preferred aspect thereof is also the same.

n2' in Formula II' has the same definition as n2 in Formula II, and the preferred aspect thereof is also the same.

m2' in Formula II' has the same definition as m2 in Formula II, and the preferred aspect thereof is also the same.

$J^{1'}$ in Formula II' has the same definition as $J^1$ in Formula II, and the preferred aspect thereof is also the same.

p' in Formula II' has the same definition as p in Formula II, and the preferred aspect thereof is also the same.

q' in Formula II' has the same definition as q in Formula II, and the preferred aspect thereof is also the same.

In Formula II', X represents a halogen atom. X is preferably a F atom, a Cl atom, a Br atom, or an I atom, more preferably a F atom or a Cl atom, and even more preferably a Cl atom.

The component A' is preferably a monomer represented by Formula II'-A.

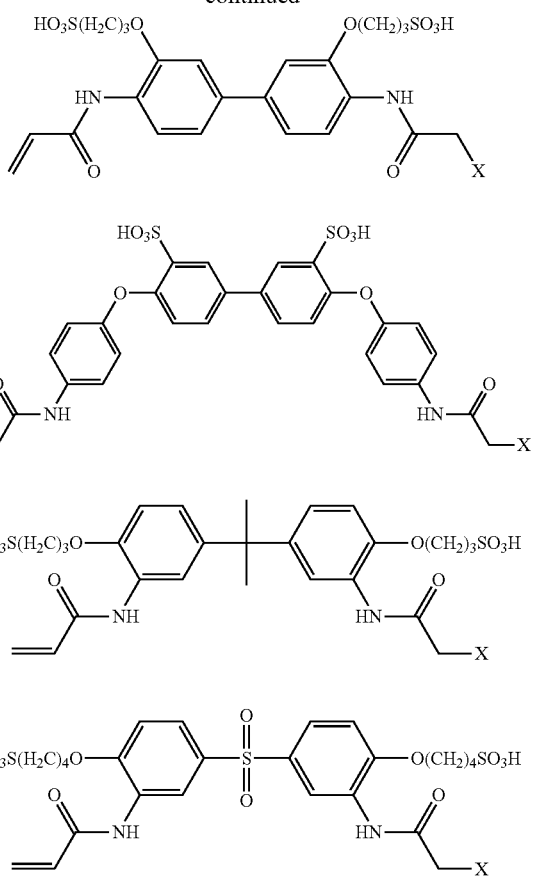

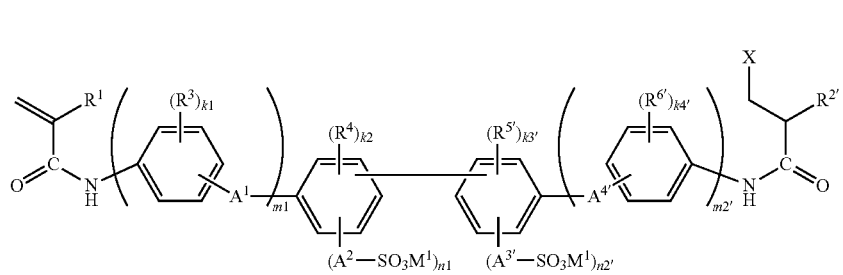

$R^1$, $R^{2'}$, $R^3$, $R^4$, $R^{5'}$, $R^{6'}$, k1, k2, k3', k4', $A^1$, $A^2$, $A^{3'}$, $A^{4'}$, $M^1$, m1, m2', n1, n2', and X in Formula II'-A have the same definition as $R^1$, $R^{2'}$, $R^3$, $R^4$, $R^{5'}$, $R^{6'}$, k1, k2, k3', k4', $A^1$, $A^2$, $A^{3'}$, $A^{4'}$, $M^1$, m1, m2', n1, n2', and X in Formula II', and the preferred aspect thereof is also the same.

Specific examples of the component A' will be shown below, but the present invention is not limited thereto. In the specific examples, X represents a halogen atom.

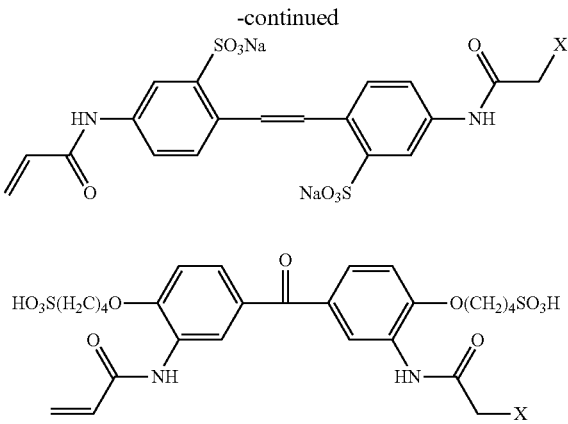

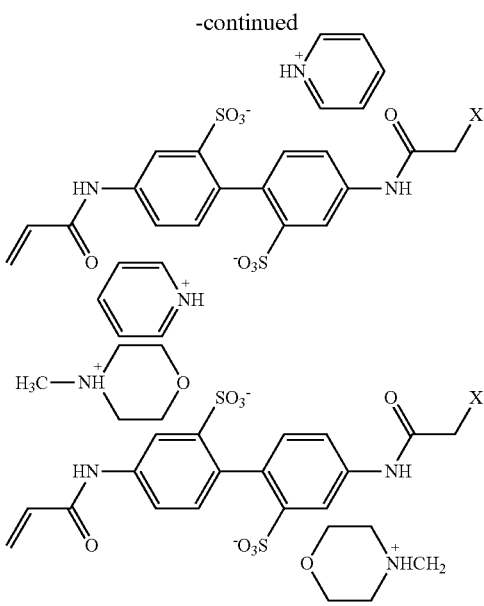

$R^{2'}$ and X in Formula IIb have the same definition as $R^{2'}$ and X in Formula II', and the preferred aspect thereof is also the same.

As a reaction solvent used in the reaction between the compound represented by Formula IIa and the compound represented by Formula IIb, water or a water-soluble solvent is preferable. The water-soluble solvent is a solvent that is not hydrolyzed or decomposed under acid or alkaline conditions, and is preferably a nitrile solvent or a ketone solvent.

Specifically, the reaction solvent is preferably water, acetonitrile, acetone, or a solvent obtained by mixing these, and more preferably water.

Examples of the base include an organic base or an inorganic base. As the organic base, alkylamine (particularly preferably tertiary amine) and heterocyclic amine (5- or 6-membered amine, for example, a pyrrolidine compound, a piperazine compound, and a pyridine compound) are preferable. As the inorganic base, a hydroxide, a carbonate, or a hydrogen carbonate of an alkali metal is preferable.

Examples of compounds preferable as the base include triethylamine, diisopropylethylamine, pyridine, dimethylaminopyridine, sodium hydroxide, potassium hydroxide, potassium carbonate, sodium hydrogen carbonate, and the like. Among these, potassium carbonate and sodium hydrogen carbonate are more preferable.

As the reaction temperature, a temperature is appropriate at which the reaction sufficiently proceeds but the polymerization of the generated polymerizable compounds such as the component A and the component A' does not proceed. The reaction temperature is preferably −10° C. to 100° C., more preferably 0° C. to 60° C., and particularly preferably 0° C. to 30° C.

It is preferable that the halogen elimination reaction, which is performed by using a base after the reaction between the compound represented by Formula IIa and the compound represented by Formula IIb, is continuously performed by the step of causing the aforementioned reaction without taking out the polymerizable compounds.

In the present invention, one kind of component A' may be used singly, or two or more kinds thereof may be used in combination.

The content of the component A' with respect to the total mass of the composition is preferably equal to or greater than 0.01% by mass to less than 6% by mass, and more preferably equal to or greater than 0.1% by mass to less than 4% by mass.

The content of the component A' with respect to the total mass of the component A and the component A' is preferably equal to or greater than 0.1% by mass to less than 10% by mass, more preferably equal to or greater than 1% by mass to less than 6% by mass, and even more preferably equal to or greater than 1.5% by mass to less than 4% by mass.

The component A' (monomer represented by Formula II') may be an intermediate at the time of manufacturing the component A (monomer represented by Formula II). Hereinafter, a preferred method for manufacturing the component A will be described.

The method for manufacturing the component A preferably includes a step of introducing a polymerizable group into a compound represented by Formula IIa.

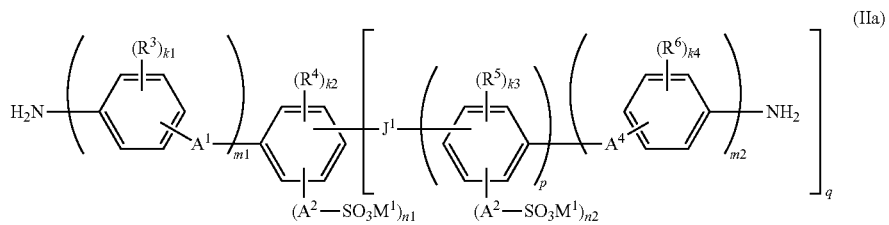

$R^3$ to $R^6$, k1 to k4, $A^1$ to $A^4$, $M^1$, n1, n2, m1, m2, $J^1$, p, and q in Formula IIa have the same definition as $R^3$ to $R^6$, k1 to k4, $A^1$ to $A^4$, $M^1$, n1, n2, m1, m2, $J^1$, p, and q in Formula II, and the preferred aspect thereof is also the same.

As a method for introducing a polymerizable group in the step of introducing a polymerizable group, for example, a method is used in which the compound represented by Formula IIa is reacted with a compound represented by Formula IIb and then halogen is eliminated by using a base.

Accordingly, the solvent is preferably the same as the aforementioned reaction solvent.

Examples of the base used in the halogen elimination reaction performed using a base include an organic base and an inorganic base. As the organic base, alkylamine (particularly preferably tertiarylamine) and heterocyclic amine (5- or 6-membered amine, for example, a pyrrolidine compound, a piperazine compound, and a pyridine compound)

are preferable. As the inorganic base, a hydroxide, a carbonate, or a hydrogen carbonate of an alkali metal is preferable.

Specifically, as the base, the compounds such as triethylamine, diisopropylethylamine, pyridine, dimethylaminopyridine, sodium hydroxide, potassium hydroxide, potassium carbonate, and sodium hydrogen carbonate are preferable. Among these, sodium hydroxide, potassium hydroxide, and potassium carbonate are more preferable.

As the reaction temperature, a temperature is appropriate at which the reaction sufficiently proceeds but the polymerization of the generated polymerizable compounds such as the component A and the component A' does not proceed. The reaction temperature is preferably −10° C. to 100° C., more preferably 0° C. to 60° C., and particularly preferably 0° C. to 30° C.

In a case where the halogen elimination reaction performed using a base is insufficient, the monomer represented by Formula II contains the monomer represented by Formula II'.

In a case where the content of the monomer represented by Formula II' is less than 10% by mass with respect to the monomer represented by Formula II, a functional polymer membrane having excellent crosslink density of a resin is obtained. In contrast, in a case where the content of the monomer represented by Formula II' is equal to or greater than 0.1% by mass with respect to the monomer represented by Formula II, the occurrence of a polymer (water-insoluble) resulting from deliquescing is inhibited, and storage stability is improved. Accordingly, the ratio of the monomer represented by Formula II' to the monomer represented by Formula II is preferably equal to or greater than 0.1% by mass to less than 10% by mass.

<Other Polymerizable Compounds>

The composition for forming a functional polymer membrane of the present invention may contain other polymerizable compounds in addition to the components A to D and A'.

Other polymerizable compounds described above are preferably monomers having a molecular weight of equal to or smaller than 3,000.

The content of other polymerizable compounds with respect to the total mass of the composition is preferably equal to or smaller than 5% by mass, more preferably equal to or smaller than 2% by mass, and even more preferably equal to or smaller than 1% by mass.

The content of other polymerizable compounds with respect to the total mass of polymerizable compounds is preferably equal to or smaller than 5% by mass, more preferably equal to or smaller than 2% by mass, and even more preferably equal to or smaller than 1% by mass.

<Component E>

It is preferable that the composition for forming a functional polymer membrane of the present invention contains a nonionic surfactant as a component E.

In a case where the composition contains the component E, the physical properties of the composition as a liquid can be adjusted, and the functional polymer membrane formed of the composition becomes uniform.

Specific examples of the nonionic surfactant are not particularly limited, and known surfactants can be used. Examples thereof include polyoxyethylene higher alkyl ethers, polyoxyethylene higher alkyl phenyl ethers, higher fatty acid diesters of polyoxyethylene glycol, silicone-based surfactants, and fluorine-based surfactants. Among these, silicone-based surfactants are preferable.

In the present invention, one kind of component E may be used singly, or two or more kinds thereof may be used in combination.

The content of the component E with respect to the total mass of the composition is preferably 0.01% to 5% by mass, and more preferably 0.05% to 2% by mass.

<Component F>

In order to perform polymerization (curing), it is preferable that the composition for forming a functional polymer membrane of the present invention further contains a polymerization initiator as a component F.

As the polymerization initiator, a water-soluble polymerization initiator is preferable.

The water-soluble polymerization initiator means a polymerization initiator dissolves 0.5% by mass or more in distilled water at 25° C. The water-soluble polymerization initiator even more preferably dissolves 1% by mass or more in distilled water at 25° C., and particularly preferably dissolves 3% or more.

The polymerization initiator used in the present invention may be a thermal polymerization initiator or a photopolymerization initiator. Among these, a photopolymerization initiator is preferable, and a photopolymerization initiator which can be polymerized by ultraviolet irradiation is more preferable.

As the polymerization initiator, it is possible to use known compounds without particular limitation.

Examples of the photopolymerization initiator include aromatic ketons, an acylphosphine compound, an aromatic onium salt compound, an organic peroxide, a thio compound, a hexaarylbiimidazole compound, a ketoxime ester compound, a borate compound, an azinium compound, a metallocene compound, an active ester compound, a compound having a carbon-halogen bond, an alkylamine compound, and the like.

Examples of the thermal polymerization initiator include an oil-soluble peroxide-based thermal polymerization initiator such as benzoyl peroxide (BPO), an oil-soluble azo-based thermal polymerization initiator such as azobisisobutyronitrile (AIBN), a water-soluble azo-based thermal polymerization initiator such as azobiscyanovaleric acid (ACVA), and the like.

In a case where the proportion of water in the solvent of the solution polymerization is high, it is also possible to use a water-soluble peroxide-based thermal polymerization initiator such as ammonium persulfate or potassium persulfate, aqueous hydrogen peroxide, and the like. Furthermore, the polymerization initiator can be combined with a redox reagent such as ferrocene or amines.

It is preferable that the polymerization initiator used in the present invention contains a compound represented by Formula PI-1 or PI-2.

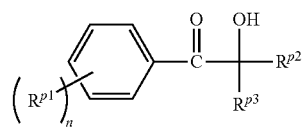

PI-1

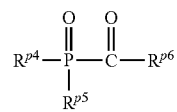

PI-2

In Formula PI-1, $R^{p1}$ represents an alkyl group, an alkenyl group, an alkoxy group, or an aryloxy group, $R^{p2}$ and $R^{p3}$ each independently represent a hydrogen atom, an alkyl group, an alkenyl group, an alkoxy group, or an aryloxy group, $R^{p2}$ and $R^{p3}$ may form a ring by being bonded to each other, and n represents an integer of 0 to 5.

In Formula PI-2, $R^{p4}$ represents an alkyl group, an aryl group, an alkylthio group, or an arylthio group, $R^{p5}$ represents an alkyl group, an aryl group, an alkylthio group, an arylthio group, or an acyl group, and $R^{p6}$ represents an alkyl group or an aryl group.

$R^{p1}$ is preferably an alkyl group having 1 to 18 carbon atoms, an alkenyl group having 2 to 10 carbon atoms, an alkoxy group having 1 to 10 carbon atoms, or an aryloxy group having 6 to 12 carbon atoms. The alkyl group, alkenyl group, alkoxy group, and aryloxy group may have a substituent. The substituent is not particularly limited, and examples thereof include an alkyl group, an aryl group, an alkoxy group, an aryloxy group, an acyl group, an acyloxy group, a hydroxy group, and the like.

The aryl group of the aryloxy group is preferably a phenyl group.

$R^{p1}$ is more preferably an alkyl group having 1 to 4 carbon atoms or an alkoxy group having 1 to 4 carbon atoms. In a case where $R^{p1}$ is an alkoxy group, a methoxy group and a 2-hydroxyethoxy group are preferable. In a case where $R^{p1}$ is an alkyl group, a methyl group substituted with a phenyl group is preferable, and the molecule of the phenyl group preferably forms a methylenebis substance as a whole by the substitution of $-C(=O)-C(R^{p2})(R^{p3})(OH)$.

$R^{p2}$ and $R^{p3}$ each independently preferably represent an alkyl group, an alkenyl group, an alkoxy group, or an aryloxy group, more preferably represent an alkyl group having 1 to 8 carbon atoms, an alkenyl group having 2 to 8 carbon atoms, an alkoxy group having 1 to 8 carbon atoms, or an aryloxy group having 6 to 10 carbon atoms, even more preferably represent an alkyl group having 1 to 4 carbon atoms, and particularly preferably represent a methyl group. The alkyl group, the alkenyl group, the alkoxy group, and the aryloxy group may have a substituent. The substituent is not particularly limited, and examples thereof include an alkyl group, an aryl group, an alkoxy group, an aryloxy group, an acyl group, an acyloxy group, a hydroxyl group, and the like.

The ring formed by the bonding between $R^{p2}$ and $R^{p3}$ is preferably a 5- or 6-membered ring, and more preferably a cyclopentane ring or a cyclohexane ring.

In Formula PI-2, the alkyl group represented by $R^{p4}$ to $R^{p6}$ is preferably an alkyl group having 1 to 8 carbon atoms, and the aryl group represented by $R^{p4}$ to $R^{p6}$ is preferably an aryl group having 6 to 16 carbon atoms. The aryl group may have a substituent, and the substituent is not particularly limited. Examples of the substituent include an alkyl group, an aryl group, an alkoxy group, an aryloxy group, an acyl group, an acyloxy group, a hydroxy group, and the like, and among these, an alkyl group or an alkoxy group is preferable.

The alkylthio group represented by $R^{p4}$ and $R^{p5}$ is preferably an alkylthio group having 1 to 12 carbon atoms. The arylthio group represented by $R^{p4}$ and $R^{p5}$ is preferably an arylthio group having 6 to 12 carbon atoms. The acyl group represented by $R^{p5}$ is preferably an alkylcarbonyl group or an arylcarbonyl group, and more preferably an alkylcarbonyl group having 2 to 12 carbon atoms or an arylcarbonyl group having 7 to 17 carbon atoms. Among these, an arylcarbonyl group is preferable as $R^{p5}$, and a phenylcarbonyl group which may have a substituent is particularly preferable. The acyl group may have a substituent.

In the present invention, as the component F, from the viewpoint of curing properties, the polymerization initiator represented by Formula PI-1 is more preferable than the polymerization initiator represented by Formula PI-2.

Specific examples of the polymerization initiator represented by Formula PI-1 or PI-2 will be shown below, but the present invention is not limited thereto.

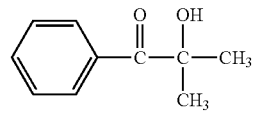
(PI-1-1)

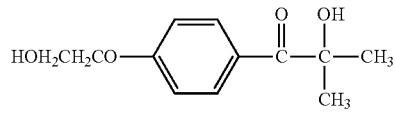
(PI-1-2)

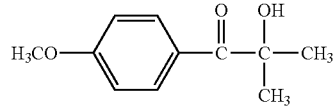
(PI-1-3)

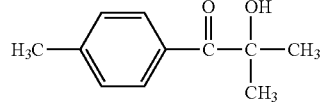
(PI-1-4)

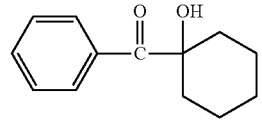
(PI-1-5)

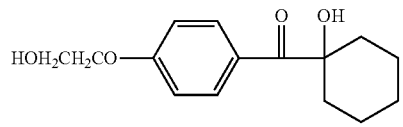
(PI-1-6)

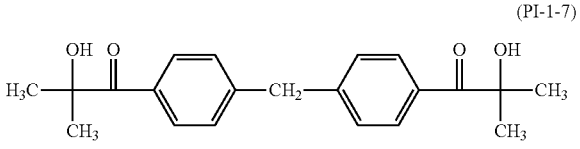
(PI-1-7)

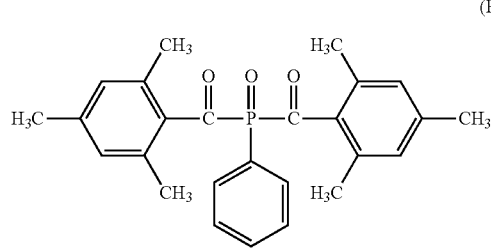
(PI-2-1)

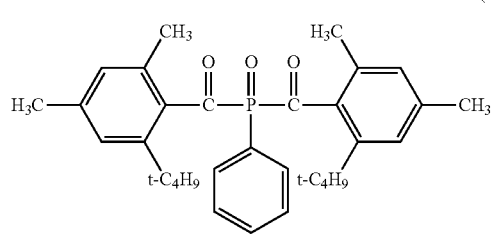
(PI-2-2)

-continued (PI-2-3)
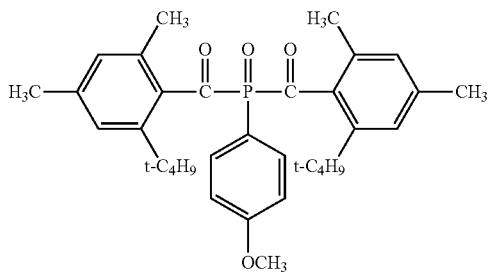

(PI-2-4)
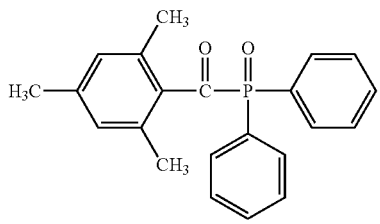

(PI-2-5)
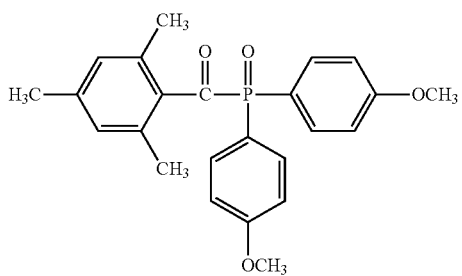

(PI-2-6)
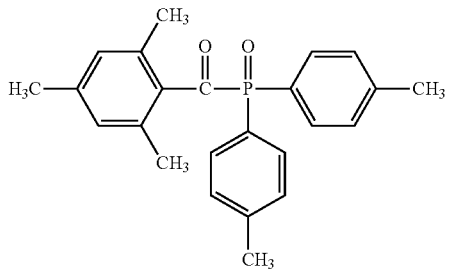

(PI-2-7)
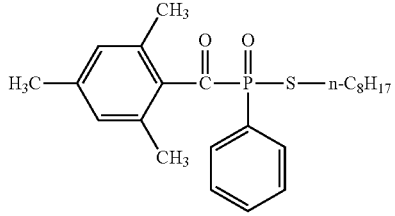

(PI-2-8)
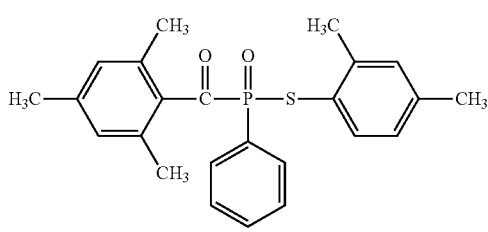

The polymerization initiator represented by Formula PI-1 and the polymerization initiator represented by Formula P1-2 are available from BASF Japan Ltd and the like.

It is preferable that the polymerization initiator used in the present invention contains a compound represented by Formula AI as another aspect.

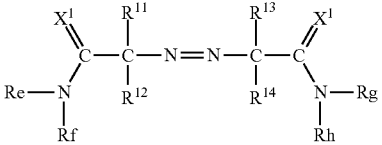

(AI)

In Formula AI, $R^{11}$ to $R^{14}$ each independently represent an alkyl group, and $X^1$ represents =O or =N-Ri. Re to Ri each independently represent a hydrogen atom or an alkyl group, and Re and Rf, Rg and Rh, Re and Ri, and Rg and Ri may form a ring by being bonded to each other respectively.

In Formula AI, the alkyl group represented by $R^{11}$ to $R^{14}$ and Re to Ri may have a substituent. As the substituent, a hydroxyl group and a carboxyl group are preferable.

The number of carbon atoms in the alkyl group represented by $R^{11}$ to $R^{14}$ is preferably 1 to 8, more preferably 1 to 4, and particularly preferably 1.

Re to Ri each preferably represent a hydrogen atom or an alkyl group having 1 to 8 carbon atoms.

In a case where Re and Rf, Rg and Rh, Re and Ri, and Rg and Ri form a ring by being bonded to each other, the formed ring is preferably a 5- or 6-membered ring.

The ring formed by the bonding between Re and Ri and the bonding between Rg and Ri is particularly preferably an imidazoline ring. The ring formed by the bonding between Re and Rf and the bonding between Rg and Rh is particularly preferably a pyrrolidine ring, a piperidine ring, a piperazine ring, a morpholine ring, or a thiomorpholine ring.

$X^1$ is preferably =N-Ri.

Specific examples of the polymerization initiator represented by Formula AI will be shown below, but the present invention is not limited thereto.

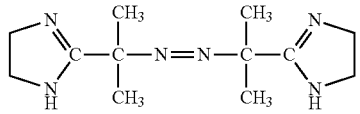

AI-1

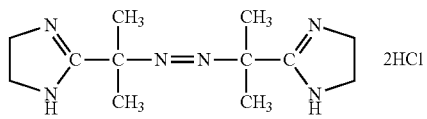

AI-2

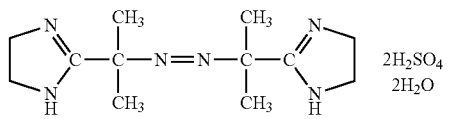

AI-3

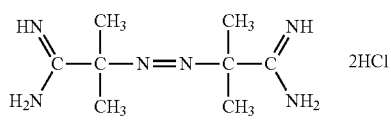

AI-4

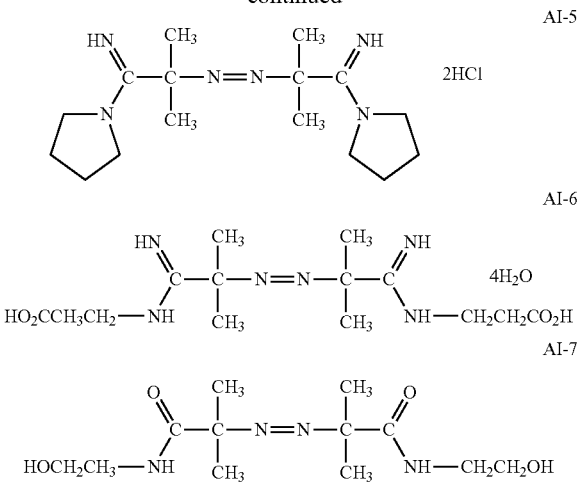

The polymerization initiator represented by Formula AI is available from Wako Pure Chemical Industries, Ltd. The Example Compound AI-1 is marketed as VA-061. The Example Compound AI-2 is marketed as VA-044. The Example Compound AI-3 is marketed as VA-046B. The Example Compound AI-4 is marketed as V-50. The Example Compound AI-5 is marketed as VA-067. The Example Compound AI-6 is marketed as VA-057. The Example Compound AI-7 is marketed as VA086 (all trade names).

In the present invention, one kind of component F may be used singly, or two or more kinds thereof may be used in combination.

The content of the component F with respect to the total mass of the composition is preferably 0.05% to 10% by mass, and more preferably 0.5% to 5% by mass.

<Component G: Co-Sensitizer>

A known compound, which further improves sensitivity or functions to prevent polymerization from being hindered due to oxygen, may be added as a co-sensitizer to the composition for forming a functional polymer membrane of the present invention.

Examples of the co-sensitizer include amines such as the compounds described in M. R. Sander et al., "Journal of Polymer Society", Vol. 10, p. 3173 (1972), JP1969-20189B (JP-S44-20189B), JP1976-82102A (JP-S51-82102A), JP1977-134692A (JP-S52-134692A), JP1984-138205A (JP-S59-138205A), JP1985-84305A (JP-S60-84305A), JP1987-18537A (JP-S62-18537A), JP1989-33104A (JP-S64-33104A), and Research Disclosure, No. 33825. Specific examples thereof include triethanolamine, p-dimethylaminobenzoic acid ethyl ester, p-formyldimethylaniline, p-methylthiodimethylaniline, and the like.

The examples also include thiol compounds and sulfide compounds such as the thiol compounds described in JP1978-702A (JP-S53-702A), JP1980-500806B (JP-S55-500806B), and JP1993-142772A (JP-H05-142772A) and the disulfide compounds described in JP1981-75643A (JP-S56-75643A). Specific examples thereof include 2-mercaptobenzothiazole, 2-mercaptobenzoxazole, 2-mercaptobenzimidazole, 2-mercapto-4(3H)-quinazoline, βmercaptonaphthalene, and the like.

The examples also include an amino acid compound (for example, N-phenylglycine), the organic metal compound described in JP1973-42965B (JP-S48-42965B) (for example, tributyl tin acetate), the hydrogen donor described in JP1980-34414B (JP-S55-34414B), the sulfur compound described in JP1994-308727A (JP-H06-308727A) (for example, trithiane), the phosphorus compound described in JP1994-250387A (JP-H06-250387A) (diethyl phosphite or the like), the Si—H and Ge—H compounds described in JP1996-65779A (JP-H08-65779A), and the like.

<Component H: Polymerization Inhibitor>

In the present invention, in order to impart stability to a coating solution, the composition for forming a functional polymer membrane preferably contains a polymerization inhibitor.

As the polymerization inhibitor, known polymerization inhibitors can be used, and examples thereof include a phenol compound, a hydroquinone compound, an amine compound, a mercapto compound, a 2,2,6,6-tetramethylpiperidine 1-oxyl (TEMPO) derivative, and the like.

Specific examples of the phenol compound include hindered phenol (phenol having a t-butyl group on the ortho-position, and typical examples thereof include 2,6-di-t-butyl-4-methyl phenol) and bisphenol. Specific examples of the hydroquinone compound include monomethyl ether hydroquinone. Specific examples of the TEMPO derivative include 4-hydroxy-2,2,6,6-tetramethylpiperidine 1-oxyl.

One kind of these polymerization inhibitors may be used singly, and two or more kinds thereof may be used in combination.

The content of the polymerization inhibitor with respect to the total mass of the composition for forming a functional polymer membrane is preferably 0.001% to 3% by mass, more preferably 0.005% to 0.5% by mass, and even more preferably 0.01% to 0.1% by mass.

<Component I: Solvent>

The composition for forming a functional polymer membrane of the present invention may contain a solvent as a component I. The content of the solvent in the composition for forming a functional polymer membrane with respect to the total mass of the composition for forming a functional polymer membrane is preferably 5% to 50% by mass, more preferably 10% to 50% by mass, and even more preferably 10% to 40% by mass.

In a case where the composition contains the solvent, the polymerization and curing reaction proceeds uniformly and smoothly. Furthermore, in a case where a porous support is impregnated with the composition for forming a functional polymer membrane, the impregnation smoothly proceeds.

As the solvent, either or both of water and a solvent having a solubility of equal to or higher than 5% by mass in water are preferable, and either or both of water and a solvent readily mixed with water are more preferable. Therefore, water and a solvent selected from water-soluble solvents are preferable, and it is preferable to use water or a water-soluble solvent alone or use a mixture thereof.

As the water-soluble solvent, particularly, an alcohol-based solvent; and an aprotic polar solvent such as ether-based solvent an amide-based solvent, a ketone-based solvent, a sulfoxide-based solvent, a sulfone-based solvent, a nitrile-based solvent, or an organic phosphorus-based solvent are particularly preferable.

Examples of the alcohol-based solvent include methanol, ethanol, isopropanol, n-butanol, ethylene glycol, propylene glycol, diethylene glycol, dipropylene glycol, and the like. One kind of these can be used singly, or two or more kinds thereof can be used in combination.

As the aprotic polar solvent, dimethyl sulfoxide, dimethyl imidazolidinone, sulfolane, N-methylpyrrolidone, dimethylformamide, acetonitrile, acetone, dioxane, tetramethylurea, hexamethylphosphoramide, hexamethylphosphortriamide, pyridine, propionitrile, butanone, cyclohexanone, tetrahydrofuran, tetrahydropyran, ethylene glycol diacetate, γ-butyrolactone, and the like are exemplified as preferred solvents. Among these, dimethyl sulfoxide, N-methylpyrrolidone, dimethylformamide, dimethyl imidazolidinone, sulfolane, acetone, acetonitrile, or tetrahydrofuran is more preferable. One kind of these can be used singly, or two or more kinds thereof can be used in combination.

<Component J: Alkali Metal Compound>

The composition for forming a functional polymer membrane of the present invention may contain an alkali metal compound, which is a monomer having an anionic functional group, such that the solubility of the component A and B is improved. As the alkali metal compound, a hydroxide salt, a chloride salt, a nitric acid salt, and the like of lithium, sodium, and potassium are preferable. Among these, a lithium compound is more preferable, and specific examples thereof include lithium hydroxide, lithium chloride, lithium bromide, lithium nitrate, lithium iodide, lithium chlorate, lithium thiocyanate, lithium perchlorate, lithium tetrafluoroborate, lithium hexafluorophosphate, and lithium hexafluoroarsetate.

Herein, it is also preferable to use the alkali metal compound such that the composition for forming a functional polymer membrane and a mixture of solutions of compositions for forming a functional polymer membrane are neutralized.

The alkali metal compound may be a hydrate. One kind of alkali metal compound may be used singly, or two or more kinds thereof may be used in combination.

In a case where the alkali metal compound is added, an amount thereof added with respect to 100 parts by mass as a mass of a total solid content of the composition for forming a functional polymer membrane is preferably 0.1 to 20 parts by mass, more preferably 1 to 20 parts by mass, and even more preferably 5 to 20 parts by mass.

<Component K: Other Components>

For adjusting physical properties of the membrane, various polymer compounds can be added to the composition for forming a functional polymer membrane of the present invention. As the polymer compounds, it is possible to use a polyurethane resin, a polyamide resin, a polyester resin, an epoxy resin, a phenol resin, a polycarbonate resin, a polyvinyl butyral resin, a polyvinyl formal resin, shellac, a vinyl-based resin, an acrylic resin, a rubber-based resin, waxes, other natural resins, and the like. Two or more kinds of these may be used in combination.

Furthermore, for adjusting physical properties of the solution, a surfactant other than the component E, an organic fluoro compound, and the like can also be added.

If necessary, the composition may further contain, for example, a surfactant, a viscosity enhancer, a surface tension adjuster, and a preservative.

(Method for Manufacturing Functional Polymer Membrane)

The method for manufacturing a functional polymer membrane of the present invention includes a step (curing step) of polymerizing the composition for forming a functional polymer membrane of the present invention by heating and/or energy ray irradiation.

Although the condition for forming the functional polymer membrane of the present invention is not particularly limited, the temperature is preferably −30° C. to 100° C., more preferably −10° C. to 80° C., and particularly preferably 5° C. to 60° C.

In the present invention, a gas such as air or oxygen may be allowed to coexist at the time of forming the functional polymer membrane. It is preferable that the functional polymer membrane is formed in an inert gas atmosphere.

<Coating Step>

It is preferable that the method for manufacturing a functional polymer membrane of the present invention includes a coating step of coating and/or impregnating a support with the aforementioned composition.

The functional polymer membrane of the present invention can be prepared by a batch process (batch method) by using a fixed support. The functional polymer membrane may also be prepared by a continuous process (continuous method) by using a moving support. The support may be in the form of a roll that is continuously rewound. In a case where a continuous method is used, by loading a support on a belt that is being continuously moved, it is possible to continuously perform a step of continuously coating the support with a coating solution as a composition for forming a functional polymer membrane and a step of forming a membrane by polymerizing the composition. Here, only one of the coating step and the membrane forming step may be continuously performed.

Until the polymerization is finished after the support is impregnated with the composition for forming a functional polymer membrane, a temporary support may also be used in addition to the support (after the polymerization is finished, the membrane is peeled off from the temporary support).

For the temporary support, the permeation of a substance does not need to be considered, and for example, any material including a metal plate such as an aluminum plate can be used as long as the material can be fixed for forming a membrane.

Furthermore, after a porous support is impregnated with the composition, polymerization can be performed without using a support other than the porous support.

The porous support can be coated or impregnated with the composition for forming a functional polymer membrane by various methods such as curtain coating, extrusion coating, air knife coating, slide coating, nip roll coating, forward roll coating, reverse roll coating, dip coating, kiss coating, rod bar coating, or spray coating. A plurality of layers can be simultaneously or continuously coated. For simultaneously coating multiple layers, curtain coating, slide coating, slot die coating, and extrusion coating are preferable.

In the continuous method, the functional polymer membrane is preferably manufactured by continuously coating a moving support with the composition for forming a functional polymer membrane and performing the polymerization and curing reaction, more preferably by using manufacturing unit which includes a coating portion of the composition for forming a functional polymer membrane, an irradiation source for polymerizing the composition for forming a functional polymer membrane, a membrane winding-up portion, and means for moving the support to the irradiation source and the membrane winding-up portion from the coating portion of the composition for forming a functional polymer membrane.

In the present invention, it is preferable that the functional polymer membrane of the present invention is prepared through steps of (i) coating and impregnating a support with a coating solution as the composition for forming a functional polymer membrane or performing at least one of the coating and impregnating, (ii) polymerizing the composition for forming a functional polymer membrane by light irradiation, and (iii) peeling off the membrane from the support as desired.

In the aforementioned manufacturing unit, the coating portion of the composition for forming a functional polymer membrane can be placed in a position in the upstream of the irradiation source of energy rays (referred to as "actinic radiation" as well), and the irradiation source is placed in a position in the upstream of a composite membrane winding-up portion. In order for the composition to have fluidity sufficient for coating performed using a high-speed coating machine, a viscosity at 35° C. of the composition for forming a functional polymer membrane is preferably less than 4,000 mPa·s, more preferably 1 to 1,000 mPa·s, and most preferably 1 to 500 mPa·s. In a case where a coating method such as slide bead coating is used, the viscosity at 35° C. is preferably 1 to 100 mPa·s.

In a high-speed coating machine, coating of the moving support with the composition for forming a functional polymer membrane can be performed at a rate of higher than 15 m/sec and at up to a rate of higher than 400 m/min.

Particularly, in a case where the support is used for improving the mechanical strength of the membrane, before the surface of the support is coated with the composition for forming a functional polymer membrane, for example, in order to improve wettability and adhesion of the support, the support may be subjected to a corona discharge treatment, a glow discharge treatment, a flame treatment, an ultraviolet irradiation treatment, and the like.

<Curing Step>

The method for manufacturing a functional polymer membrane of the present invention includes a step (curing step) of polymerizing the composition for forming a functional polymer membrane of the present invention by heating and/or energy ray irradiation, and preferably includes a step of polymerizing the composition for forming a functional polymer membrane of the present invention by energy ray irradiation.

[Energy Ray Irradiation]

During the polymerization, the polymerizable compounds such as the components A and D are polymerized. It is preferable that the polymerization is performed by light irradiation under the condition in which the polymerization occurs with rapidity sufficient for forming a membrane within 30 seconds.

The polymerization of the composition for forming a functional polymer membrane is preferably initiated within 60 seconds, more preferably within 15 seconds, particularly preferably within 5 seconds, and most preferably within 3 seconds, after the support is coated with the composition for forming a functional polymer membrane.

During the polymerization, the composition for forming a functional polymer membrane is irradiated with energy rays preferably for less than 10 seconds, more preferably for less than 5 seconds, particularly preferably for less than 3 seconds, and most preferably for less than 2 seconds. In the continuous method, by the speed at which the composition for forming a functional polymer membrane is continuously irradiated with the energy rays, passes through the irradiation beam, and moves, the polymerization time is determined.

In a case where high-intensity ultraviolet rays (UV light) is used in the polymerization, a significant amount of heat is likely to be generated. Therefore, in order to prevent overheating, a lamp as a light source and the support coated with the composition for forming a functional polymer membrane or at least one of the lamp as a light source and the support coated with the composition for forming a functional polymer membrane is preferably cooled using cooling air. In a case where infrared light (IR light) at a significant dose is radiated together with UV beams, it is preferable to radiate UV light by using an IR reflective quartz plate as a filter.

The energy rays are preferably ultraviolet rays. It is preferable that the irradiation wavelength is matched with an absorption wavelength of any photopolymerization initiator contained in the composition for forming a functional polymer membrane. For example, the irradiation wavelength is 400 to 320 nm for UV-A, 320 to 280 nm for UV-B, and 280 to 200 nm for UV-C.

The source of ultraviolet rays include a mercury arc lamp, a carbon arc lamp, a low-pressure mercury lamp, a medium-pressure mercury lamp, a high-pressure mercury lamp, a swirl-flow plasma arc lamp, a metal halide lamp, a xenon lamp, a tungsten lamp, a halogen lamp, a laser, and an ultraviolet light emitting diode. As the source of ultraviolet rays, a medium-pressure or high-pressure mercury vapor type ultraviolet light emitting diode is particularly preferable. In addition, in order to change an emission spectrum of the lamp, an additive such as a metal halide may be present. In many cases, a lamp having emission maximum at 200 to 450 nm is particularly suitable.

The energy output of the irradiation source of the energy rays is preferably 20 to 1,000 W/cm, and more preferably 40 to 500 W/cm. However, the energy output may be higher or lower than the above as long as a desired exposure dose is established. By changing an exposure intensity, a curing degree of the membrane can be adjusted. The exposure dose which is measured in a range of UV-B indicated in the aforementioned device by using High Energy UV Radiometer (UV Power Puck™ manufactured by EIT-Instrument Markets, Inc.) and is preferably at least equal to or greater than 40 mJ/cm$^2$, more preferably 100 to 2,000 mJ/cm$^2$, and even more preferably 150 to 1,500 mJ/cm$^2$. The exposure time can be freely selected, but is preferably short and most preferably less than 2 seconds.

In a case where the coating rate is high, in order to obtain a necessary exposure dose, a plurality of light sources may be used. In this case, the exposure intensities of the plurality of light sources may be the same as or different from each other.

[Heating]

In the heating step, the heating condition is not particularly limited. The heating temperature is preferably 40° C. to 120° C., more preferably 60° C. to 100° C., and even more preferably 75° C. to 90° C. The heating time is preferably 1 minute to 12 hours, more preferably 10 minutes to 8 hours, and even more preferably 30 minutes to 6 hours.

The heating means is not particularly limited, and it is possible to use a heating drum, hot air, an infrared lamp, a heating oven, a heating plate, and the like.

EXAMPLES

Hereinafter, the present invention will be more specifically described using examples. The materials and an amount and proportion thereof used, a treatment content, a treatment procedure, and the like shown in the following examples can be appropriately changed within a scope that does not depart from the gist of the present invention. Therefore, the scope of the present invention is not limited to the following specific examples. Herein, unless otherwise specified, "part" and "%" are based on mass.

Examples 1 to 35 and Comparative Examples 1 to 4

(Calculation of C log P Value)

As the C log P value of the component B, the value calculated using ChemBioDraw Ultra 12.0 was used.

(Preparation of Functional Polymer Membrane (Cation-Exchange Membrane))

By using a 150 μm wire-wound rod, an aluminum plate was manually coated with each composition (composition for forming a functional polymer membrane) composed as shown in the following Tables 1 to 4 at a speed of about 5 m/min. Then, the composition for forming a functional polymer membrane (coating solution) with which the aluminum was coated was brought into contact with non-woven cloth (FO-2223-10 manufactured by Freudenberg & Co. KG, thickness: 100 μm) as a support, thereby impregnating the support with the coating solution. Thereafter, by using a rod around which a wire was not wound, the surplus coating solution was removed. The temperature of the coating solution at the time of coating was about 25° C. (room temperature). Thereafter, by using a UV exposure machine (manufactured by Fusion UV Systems Inc, Light Hammer 10 model, D-bulb, conveyer speed: 1.0 to 8.0 m/min, 100% intensity), a curing reaction was caused on the support impregnated with the coating solution, thereby preparing a cation-exchange membrane. The exposure amount was 1,000 to 5,000 mJ/cm$^2$ in the UV-A region. The obtained membrane was peeled off from the aluminum plate and stored for at least 12 hours in a 0.1 mol/L NaCl solution.

In a case where the membrane was prepared by heating (Examples 18 to 20), the same process as described above was conducted until the step of removing the coating solution was performed, and then the support was thermally cured for 3 hours by being put into an oven with a temperature of 80° C. The obtained membrane was peeled off from the aluminum plate and stored for at least 12 hours in a 0.1 mol/L NaCl solution.

<Time Required for Curing (Exposure Time)>

The time required for the quantity of a component, which was eluted when the prepared membrane was immersed in water, to become equal to or less than a detection limit in liquid chromatography was set as an exposure time.

Evaluation

<Electric Resistance of Membrane (Membrane Resistance) (Ω·cm$^2$)>

Both surfaces of the membrane impregnated with a 0.5 mol/L aqueous NaCl solution for about 2 hours was wiped with dry filter paper, and the obtained membrane was inserted into a double-chamber cell (effective membrane area: 1 cm$^2$, a Ag/AgCl reference electrode (manufactured by Metrohm AG) was used as an electrode). Both chambers of the double-chamber cell were filled with 100 mL of an aqueous NaCl solution at the same concentration, and the double-chamber cell was left in a constant-temperature water tank with a temperature of 25° C. until equilibrium was established. After the temperature of the solution in the double-chamber cell exactly became 25° C., an electric resistance r1 was measured using an alternating current bridge (frequency: 1,000 Hz). The concentration of the aqueous NaCl solution used for measurement was set to be 0.5 mol/L, 0.7 mol/L, 1.5 mol/L, 3.5 mol/L, and 4.5 mol/L, and the electric resistance was measured in order from the aqueous NaCl solution of a low concentration. Then, the membrane was removed from the double-chamber cell, and an electric resistance r2 was measured in a state where only the aqueous NaCl solution was in the double-chamber cell. An electric resistance r of the membrane was determined by r1-r2. In a case where the description of "membrane resistance" is shown in an example, it means the electric resistance of a membrane measured in a 0.5 mol/L aqueous NaCl solution.

<Water Permeability (mL/(Pa·m$^2$·h))>

The water permeability of the membrane was measured using a device having a flow channel 10 shown in FIG. 1. In FIG. 1, the reference 1 represents a membrane, and the references 3 and 4 represent a flow channel of a feed solution (pure water) and a flow channel of a draw solution (4 mol/L aqueous NaCl solution) respectively. The arrow indicated by the reference 2 represents the flow of water separated from the feed solution.

400 mL of the feed solution and 400 mL of the draw solution were brought into contact with each other through the membrane (membrane contact area: 18 cm$^2$). Each of the solutions was caused to flow at a flow rate of 0.11 cm/sec by using a peristaltic pump in a direction of the arrow indicated by the reference 5. The speed at which water in the feed solution permeated the draw solution through the membrane was analyzed by measuring a mass of the feed solution and the draw solution in real time, thereby determining a water permeability.

The smaller the value of water permeability, the more the membrane is preferable as an ion-exchange membrane. The values shown in the tables are values multiplied by 10$^5$. For example, the measurement value of Example 1 is 6.0×10$^{-5}$ (mL/(m$^2$·Pa·h)).

The smaller the value of the product of the electric resistance and the water permeability, the higher the performance of the membrane as an ion-exchange membrane. The product of the value of the electric resistance and the value of the water permeability (multiplied by 10$^5$) was calculated.

<Selective Permeability (%)>

The selective permeability was calculated by measuring a membrane potential (V) by static membrane potential measurement. Two electrolytic cells were separated from each other by a membrane to be measured. Before the measurement, the membrane was equilibrated for about 16 hours in a 0.05 mol/L aqueous NaCl solution. Then, one of the cells separated from each other by the membrane was filled with 100 mL of a 0.05 mol/L aqueous NaCl solution. The other of the cells separated from each other by the membrane was filled with 100 mL of a 0.5 mol/L aqueous NaCl solution. By using a constant-temperature water tank, the temperature of the aqueous NaCl solution in the cells was stabilized at 25° C. Thereafter, in a state where both the solutions were being caused to flow toward the membrane surface, both the electrolytic cells were brought into contact with the Ag/AgCl reference electrode (manufactured by Metrohm AG) by using a salt bridge, and the membrane potential (V) was measured. By the following Equation (A), a selective permeability t was calculated.

The effective area of the membrane was 1 cm$^2$.

$$t=(a+b)/2b \qquad \text{Equation (A)}$$

Specifically, each reference in Equation (A) means the following.

a: membrane potential (V)
B: 0.5915 log (f1c1/f2c2) (V)
f1, f2: activity coefficient of NaCl in both cells
c1, c2: concentration of NaCl in both cells (mol/L)

<pH Resistance Test>

The membrane was immersed in 500 mL of a 0.1 mol/L aqueous HCl solution (pH=1) and kept for 5 days in a constant-temperature tank with a temperature of 50° C. Then, the membrane was taken out of the aqueous HCl solution, and the selective permeability thereof (selective permeability after immersion) was measured. Furthermore, the selective permeability of the membrane before being immersed in the aqueous HCl solution (selective permeability before immersion) was measured. The difference of (selective permeability before immersion (%))—(selective permeability after immersion (%)) was calculated, and the pH resistance was evaluated based on the following standards. In a case where the difference was less than 3%, the pH resistance was evaluated to be A. In a case where the difference was equal to or greater than 3% to less than 5%, the pH resistance was evaluated to be B. In a case where the difference was equal to or greater than 5% to less than 10%, the pH resistance was evaluated to be C. In a case where the difference was equal to or greater than 10%, the pH resistance was evaluated to be D.

<Dimensional Stability>

The membrane was immersed in pure water overnight, and then kept in a constant-temperature water tank with a temperature of 40° C. for 30 days. Thereafter, the membrane was taken out, the dimensions of the length and width of the membrane after immersion were measured, and the area of the membrane after immersion was calculated. In addition, before the membrane was immersed in pure water, the dimensions of the length and width of the membrane were measured, and the area of the membrane before immersion was calculated. For the dimensions of the length and width of the membrane, a distance between marks that were made in advance on the membrane was measured at 5 sites by using a digital caliper, and the average thereof was adopted. An equation of rate of change in membrane area=((area of membrane after immersion ($cm^2$))−(area of membrane before immersion ($cm^2$))/(area of membrane before immersion ($cm^2$)) was calculated, and the dimensional stability was evaluated based on the following standards. In a case where the rate of change in membrane area was less than 0.5%, the dimensional stability was evaluated to be A. In a case where the rate of change in membrane area was equal to or greater than 0.5% to less than 2%, the dimensional stability was evaluated to be B. In a case where the rate of change in membrane area was equal to or greater than 2%, the dimensional stability was evaluated to be C.

TABLE 1

| | | Example | | | | | | | | |
|---|---|---|---|---|---|---|---|---|---|---|
| | Compound | 1 | 2 | 3 | 4 | 5 | 6 | 7 | 8 | 9 |
| Component A | A-1 | 25.0 | 25.0 | 25.0 | 25.0 | 25.0 | 25.0 | 25.0 | 25.0 | 25.0 |
| | A-2 | — | — | — | — | — | — | — | — | — |
| | A-3 | — | — | — | — | — | — | — | — | — |
| Component B | B-1 | 5.0 | — | — | — | — | — | — | — | — |
| | B-2 | — | 5.0 | — | — | — | — | — | — | — |
| | B-3 | — | — | 5.0 | — | — | — | — | — | — |
| | B-4 | — | — | — | 5.0 | — | — | — | — | — |
| | B-5 | — | — | — | — | 5.0 | — | — | — | — |
| | B-6 | — | — | — | — | — | 5.0 | — | — | — |
| | B-7 | — | — | — | — | — | — | 5.0 | — | — |
| | B-8 | — | — | — | — | — | — | — | 5.0 | — |
| | B-9 | — | — | — | — | — | — | — | — | 5.0 |
| | B-10 | — | — | — | — | — | — | — | — | — |
| | B-11 | — | — | — | — | — | — | — | — | — |
| | B-12 | — | — | — | — | — | — | — | — | — |
| Component C | C-1 | 20.0 | 20.0 | 20.0 | 20.0 | 20.0 | 20.0 | 20.0 | 20.0 | 20.0 |
| | C-2 | — | — | — | — | — | — | — | — | — |
| | C-3 | — | — | — | — | — | — | — | — | — |
| Component D | D-1 | — | — | — | — | — | — | — | — | — |
| | D-2 | — | — | — | — | — | — | — | — | — |
| | D-3 | — | — | — | — | — | — | — | — | — |
| | D-4 | 10.0 | 10.0 | 10.0 | 10.0 | 10.0 | 10.0 | 10.0 | 10.0 | 10.0 |
| Component E | Tego glide 100 | 0.1 | 0.1 | 0.1 | 0.1 | 0.1 | 0.1 | 0.1 | 0.1 | 0.1 |
| | Tego airex 901W | — | — | — | — | — | — | — | — | — |
| Component F | Darocur 1173 | 0.5 | 0.5 | 0.5 | 0.5 | 0.5 | 0.5 | 0.5 | 0.5 | 0.5 |
| | VA-67 | — | — | — | — | — | — | — | — | — |
| Neutralizer | NaOH | 5.0 | 5.0 | 5.0 | 5.0 | 5.0 | 5.0 | 5.0 | 5.0 | 5.0 |
| Polymerization inhibitor | MEHQ | 0.1 | 0.1 | 0.1 | 0.1 | 0.1 | 0.1 | 0.1 | 0.1 | 0.1 |
| Solvent | Pure water | 34.3 | 34.3 | 34.3 | 34.3 | 34.3 | 34.3 | 34.3 | 34.3 | 34.3 |
| | IPA | — | — | — | — | — | — | — | — | — |
| | Total mass | 100 | 100 | 100 | 100 | 100 | 100 | 100 | 100 | 100 |
| Measurement result | Membrane resistance ($\Omega \cdot m^2$) | 2.0 | 2.0 | 1.9 | 3.2 | 2.8 | 2.4 | 2.5 | 2.1 | 1.9 |
| | Water permeability × $10^{-5}$ (mL/(Pa·$m^2$·h)) | 6.0 | 6.2 | 7.7 | 4.9 | 5.0 | 6.6 | 5.0 | 5.3 | 8.0 |
| | Membrane resistance × water permeability | 12.0 | 12.4 | 14.6 | 15.7 | 14.0 | 15.8 | 12.5 | 11.1 | 15.2 |
| | Selective permeability (%) | 98.7 | 99.0 | 98.7 | 99.2 | 98.5 | 98.4 | 99.5 | 99.0 | 99.2 |
| | pH resistance | A | A | A | A | A | A | A | A | A |
| | Dimensional stability | A | A | A | A | A | A | A | A | A |

TABLE 2

|  | Compound | Example | | | | | | | | |
|---|---|---|---|---|---|---|---|---|---|---|
|  |  | 10 | 11 | 12 | 13 | 14 | 15 | 16 | 17 | 18 |
| Component A | A-1 | 25.0 | 25.0 | 25.0 | 25.0 | 25.0 | 25.0 | 25.0 | 25.0 | 25.0 |
|  | A-2 | — | — | — | — | — | — | — | — | — |
|  | A-3 | — | — | — | — | — | — | — | — | — |
| Component B | B-1 | — | 2.5 | 15.0 | — | — | — | — | — | 5.0 |
|  | B-2 | — | — | — | 2.5 | 15.0 | — | — | 5.0 | — |
|  | B-3 | — | — | — | — | — | — | — | — | — |
|  | B-4 | — | — | — | — | — | — | — | — | — |
|  | B-5 | — | — | — | — | — | — | — | — | — |
|  | B-6 | — | — | — | — | — | — | — | — | — |
|  | B-7 | — | — | — | — | — | — | — | — | — |
|  | B-8 | — | — | — | — | — | 2.5 | 10.0 | — | — |
|  | B-9 | — | — | — | — | — | — | — | — | — |
|  | B-10 | 5.0 | — | — | — | — | — | — | — | — |
|  | B-11 | — | — | — | — | — | — | — | — | — |
|  | B-12 | — | — | — | — | — | — | — | — | — |
| Component C | C-1 | 20.0 | 20.0 | 10.0 | 20.0 | 10.0 | 20.0 | 15.0 | 20.0 | 20.0 |
|  | C-2 | — | — | — | — | — | — | — | — | — |
|  | C-3 | — | — | — | — | — | — | — | — | — |
| Component D | D-1 | — | — | — | — | — | — | — | — | — |
|  | D-2 | — | — | — | — | — | — | — | — | — |
|  | D-3 | — | — | — | — | — | — | — | — | — |
|  | D-4 | 10.0 | 10.0 | 10.0 | 10.0 | 10.0 | 10.0 | 10.0 | 10.0 | 10.0 |
| Component E | Tego glide 100 | 0.1 | 0.1 | 0.1 | 0.1 | 0.1 | 0.1 | 0.1 | — | 0.1 |
|  | Tego airex 901W | — | — | — | — | — | — | — | 0.1 | — |
| Component F | Darocur 1173 | 0.5 | 0.5 | 0.5 | 0.5 | 0.5 | 0.5 | 0.5 | 0.5 | — |
|  | VA-67 | — | — | — | — | — | — | — | — | 0.5 |
| Neutralizer | NaOH | 5.0 | 5.0 | 5.0 | 5.0 | 5.0 | 5.0 | 5.0 | 5.0 | 5.0 |
| Polymerization inhibitor | MEHQ | 0.1 | 0.1 | 0.1 | 0.1 | 0.1 | 0.1 | 0.1 | 0.1 | 0.1 |
| Solvent | Pure water | 34.3 | 36.8 | 34.3 | 36.8 | 34.3 | 36.8 | 34.3 | 34.3 | 34.3 |
|  | IPA | — | — | — | — | — | — | — | — | — |
|  | Total mass | 100 | 100 | 100 | 100 | 100 | 100 | 100 | 100 | 100 |
| Measurement result | Membrane resistance ($\Omega \cdot cm^2$) | 1.6 | 1.9 | 3.3 | 1.7 | 4.2 | 2.0 | 4.2 | 2.1 | 2.3 |
|  | Water permeability $\times 10^{-5}$ (mL/(Pa $\cdot$ m$^2$ $\cdot$ h)) | 8.1 | 7.1 | 4.5 | 7.5 | 3.5 | 6.0 | 3.3 | 6.2 | 7.0 |
|  | Membrane resistance × water permeability | 13.0 | 13.5 | 14.9 | 12.8 | 14.7 | 12.0 | 13.9 | 13.0 | 16.1 |
|  | Selective permeability (%) | 99.8 | 98.7 | 99.9 | 98.0 | 99.5 | 98.2 | 99.8 | 99.0 | 98.7 |
|  | pH resistance | A | A | A | A | A | A | A | A | A |
|  | Dimensional stability | A | A | A | A | A | A | A | A | A |

TABLE 3

|  | Compound | Example | | | | | | | | |
|---|---|---|---|---|---|---|---|---|---|---|
|  |  | 19 | 20 | 21 | 22 | 23 | 24 | 25 | 26 | 27 |
| Component A | A-1 | 25.0 | 25.0 | 15.0 | 30.0 | 25.0 | 25.0 | 25.0 | 25.0 | 25.0 |
|  | A-2 | — | — | — | — | — | — | — | — | — |
|  | A-3 | — | — | — | — | — | — | — | — | — |
| Component B | B-1 | — | — | — | — | — | — | — | — | — |
|  | B-2 | 5.0 | — | 10.0 | 5.0 | 5.0 | 5.0 | 5.0 | 5.0 | 5.0 |
|  | B-3 | — | — | — | — | — | — | — | — | — |
|  | B-4 | — | — | — | — | — | — | — | — | — |
|  | B-5 | — | — | — | — | — | — | — | — | — |
|  | B-6 | — | — | — | — | — | — | — | — | — |
|  | B-7 | — | — | — | — | — | — | — | — | — |
|  | B-8 | — | 5.0 | — | — | — | — | — | — | — |
|  | B-9 | — | — | — | — | — | — | — | — | — |
|  | B-10 | — | — | — | — | — | — | — | — | — |
|  | B-11 | — | — | — | — | — | — | — | — | — |
|  | B-12 | — | — | — | — | — | — | — | — | — |
| Component C | C-1 | 20.0 | 20.0 | 30.0 | 10.0 | 30.0 | 10.0 | 20.0 | 20.0 | 20.0 |
|  | C-2 | — | — | — | — | — | — | — | — | — |
|  | C-3 | — | — | — | — | — | — | — | — | — |
| Component D | D-1 | — | — | — | — | — | — | 10.0 | — | — |
|  | D-2 | — | — | — | — | — | — | — | 10.0 | — |
|  | D-3 | — | — | — | — | — | — | — | — | 10.0 |
|  | D-4 | 10.0 | 10.0 | 10.0 | 10.0 | 5.0 | 20.0 | — | — | — |

TABLE 3-continued

| | Compound | \multicolumn{9}{c}{Example} |
| | | 19 | 20 | 21 | 22 | 23 | 24 | 25 | 26 | 27 |
|---|---|---|---|---|---|---|---|---|---|---|
| Component E | Tego glide 100 | 0.1 | 0.1 | 0.1 | 0.1 | 0.1 | 0.1 | 0.1 | 0.1 | 0.1 |
| | Tego airex 901W | — | — | — | — | — | — | — | — | — |
| Component F | Darocur 1173 | — | — | 0.5 | 0.5 | 0.5 | 0.5 | 0.5 | 0.5 | 0.5 |
| | VA-67 | 0.5 | 0.5 | — | — | — | — | — | — | — |
| Neutralizer | NaOH | 5.0 | 5.0 | 5.0 | 5.0 | 5.0 | 5.0 | 5.0 | 5.0 | 5.0 |
| Polymerization inhibitor | MEHQ | 0.1 | 0.1 | 0.1 | 0.1 | 0.1 | 0.1 | 0.1 | 0.1 | 0.1 |
| Solvent | Pure water | 34.3 | 34.3 | 29.3 | 39.3 | 29.3 | 34.3 | 34.3 | 34.3 | 34.3 |
| | IPA | — | — | — | — | — | — | — | — | — |
| | Total mass | 100 | 100 | 100 | 100 | 100 | 100 | 100 | 100 | 100 |
| Measurement result | Membrane resistance ($\Omega \cdot cm^2$) | 2.4 | 2.6 | 1.6 | 2.5 | 1.7 | 3.0 | 1.8 | 1.9 | 2.3 |
| | Water permeability × $10^{-5}$ (mL/(Pa · $m^2$ · h)) | 7.1 | 6.5 | 8.2 | 5.2 | 8.5 | 5.5 | 7.7 | 7.0 | 5.8 |
| | Membrane resistance × water permeability | 17.0 | 16.9 | 13.1 | 13.0 | 14.5 | 16.5 | 13.9 | 13.3 | 13.3 |
| | Selective permeability (%) | 99.0 | 99.0 | 98.0 | 99.0 | 98.5 | 99.2 | 98.2 | 98.5 | 99.2 |
| | pH resistance | A | A | A | A | A | A | A | A | A |
| | Dimensional stability | A | A | A | A | A | A | A | A | A |

TABLE 4

| | Compound | \multicolumn{8}{c}{Example} | \multicolumn{4}{c}{Comparative Example} |
| | | 28 | 29 | 30 | 31 | 32 | 33 | 34 | 35 | 1 | 2 | 3 | 4 |
|---|---|---|---|---|---|---|---|---|---|---|---|---|---|
| Component A | A-1 | 25.0 | 25.0 | — | — | — | — | — | — | 25.0 | — | 25.0 | 25.0 |
| | A-2 | — | — | 25.0 | — | — | — | — | — | — | — | — | — |
| | A-3 | — | — | — | 25.0 | — | — | — | — | — | — | — | — |
| | A-4 | — | — | — | — | 24.4 | 23.7 | 23.0 | 22.4 | — | — | — | — |
| Component A' | A'-4 | — | — | — | — | 0.6 | 1.3 | 2.0 | 2.6 | — | — | — | — |
| Component B | B-1 | — | — | — | — | — | — | — | — | — | — | — | — |
| | B-2 | 5.0 | 5.0 | 5.0 | 5.0 | 5.0 | 5.0 | 5.0 | 5.0 | — | — | — | — |
| | B-3 | — | — | — | — | — | — | — | — | — | — | — | — |
| | B-4 | — | — | — | — | — | — | — | — | — | — | — | — |
| | B-5 | — | — | — | — | — | — | — | — | — | — | — | — |
| | B-6 | — | — | — | — | — | — | — | — | — | — | — | — |
| | B-7 | — | — | — | — | — | — | — | — | — | — | — | — |
| | B-8 | — | — | — | — | — | — | — | — | — | — | — | — |
| | B-9 | — | — | — | — | — | — | — | — | — | — | — | — |
| | B-10 | — | — | — | — | — | — | — | — | — | — | — | — |
| | B-11 | — | — | — | — | — | — | — | — | — | 15.0 | — | 5.0 |
| | B-12 | — | — | — | — | — | — | — | — | — | — | 5.0 | — |
| Component C | C-1 | — | — | 20.0 | 20.0 | — | — | — | — | 35.0 | 45.0 | 20.0 | 20.0 |
| | C-2 | 20.0 | — | — | — | — | — | — | — | — | — | — | — |
| | C-3 | — | 20.0 | — | — | 20.0 | 20.0 | 20.0 | 20.0 | — | — | — | — |
| Component D | D-1 | — | — | — | — | — | — | — | — | — | — | — | — |
| | D-2 | — | — | — | — | — | — | — | — | — | — | — | — |
| | D-3 | — | — | — | — | — | — | — | — | — | — | — | — |
| | D-4 | 10.0 | 10.0 | 10.0 | 10.0 | 10.0 | 10.0 | 10.0 | 10.0 | — | — | 10.0 | 10.0 |
| Component E | Tego glide 100 | 0.1 | 0.1 | 0.1 | 0.1 | 0.1 | 0.1 | 0.1 | 0.1 | 0.1 | 0.1 | 0.1 | 0.1 |
| | Tego airex 901W | — | — | — | — | — | — | — | — | — | — | — | — |
| Component F | Darocur 1173 | 0.5 | 0.5 | 0.5 | 0.5 | 0.5 | 0.5 | 0.5 | 0.5 | 0.5 | 0.5 | 0.5 | 0.5 |
| | VA-67 | — | — | — | — | — | — | — | — | — | — | — | — |
| Neutralizer | NaOH | 5.0 | 5.0 | 5.0 | 5.0 | 5.0 | 5.0 | 5.0 | 5.0 | 5.0 | 5.0 | 5.0 | 5.0 |
| Polymerization inhibitor | MEHQ | 0.1 | 0.1 | 0.1 | 0.1 | 0.1 | 0.1 | 0.1 | 0.1 | 0.1 | 0.1 | 0.1 | 0.1 |
| Solvent | Pure water | 34.3 | 34.3 | 34.3 | 34.3 | 34.3 | 34.3 | 34.3 | 34.3 | 34.3 | 19.3 | 34.3 | 34.3 |
| | IPA | — | — | — | — | — | — | — | — | — | 15.0 | — | — |
| | Total mass | 100 | 100 | 100 | 100 | 100 | 100 | 100 | 100 | 100 | 100 | 100 | 100 |
| Measurement result | Membrane resistance ($\Omega \cdot cm^2$) | 1.9 | 2.3 | 2.5 | 3.0 | 2.3 | 2.3 | 2.3 | 2.3 | 1.7 | 2.5 | 13.4 | 2.0 |

TABLE 4-continued

| Compound | Example | | | | | | | | Comparative Example | | | |
|---|---|---|---|---|---|---|---|---|---|---|---|---|
| | 28 | 29 | 30 | 31 | 32 | 33 | 34 | 35 | 1 | 2 | 3 | 4 |
| Water permeability × $10^{-5}$ (mL/(Pa · m² · h)) | 6.2 | 5.8 | 5.2 | 4.8 | 5.8 | 6.3 | 6.8 | 7.2 | 8.5 | 15.0 | 2.9 | 9.5 |
| Membrane resistance × water permeability | 11.8 | 13.3 | 13.0 | 14.4 | 13.3 | 14.5 | 15.6 | 16.6 | 14.5 | 37.5 | 38.9 | 19.0 |
| Selective permeability (%) | 99.2 | 98.5 | 99.2 | 99.2 | 98.5 | 98.5 | 98.5 | 98.5 | 98.0 | 93.0 | 97.5 | 96.8 |
| pH resistance | A | A | A | A | A | A | A | A | C | D | C | D |
| Dimensional stability | A | A | A | A | A | A | A | A | B | C | C | B |

In Tables 1 to 4, the unit of numerical values in the column of each component of the composition for forming a membrane and the post-treatment solution is part by mass of the active component. Furthermore, "-" in the tables means that the example does not contain the corresponding component. The details of the compounds used in examples and comparative examples will be shown below.

[Component A]

A-1: compound represented by Formula A-1, synthesized by the method described in JP2014-195798A.

A-2: compound represented by Formula A-2, synthesized by the method described in JP2014-195798A.

A-3: compound represented by Formula A-3, synthesized by the method described in JP2014-195798A.

A-4: compound represented by Formula A-4, synthesized by the following method.

[Component A']

A'-4: compound represented by Formula A'-4, synthesized by the following method.

[Component B]

B-1: 2-Hydroxy-1-Acryloxy-3-Methacryloxy Propane, manufactured by SHIN-NAKAMURA CHEMICAL CO., LTD., 701A, C log P value: 0.841

B-2: polyethylene glycol (200) diacrylate, manufactured by SHIN-NAKAMURA CHEMICAL CO., LTD., A-200, C log P value: 1.151

B-3: polyethylene glycol (400) diacrylate, manufactured by SHIN-NAKAMURA CHEMICAL CO., LTD., A-400, C log P value: 0.473

B-4: 1,4-butanediol diacrylate, manufactured by Sigma-Aldrich Co. LLC., 411744, C log P value: 1.958

B-5: Dipropylene Glycol Diacrylate, manufactured by TOKYO CHEMICAL INDUSTRY CO., LTD., D3470, C log P value: 2.156

B-6: Tripropylene Glycol Diacrylate, manufactured by TOKYO CHEMICAL INDUSTRY CO., LTD., T2389, C log P value: 2.531

B-7: Tetramethylol Methane Tetraacrylate, manufactured by SHIN-NAKAMURA CHEMICAL CO., LTD., A-TMMT, C log P value: 2.783

B-8: Di-pentaerythritol Hexaacrylate, manufactured by SHIN-NAKAMURA CHEMICAL CO., LTD., A-DPH, C log P value: 2.940

B-9: compound represented by Formula B-9, C log P value: 1.837, synthesized by the method described in WO2014/050992A.

B-10: compound represented by Formula B-10, C log P value: −0.193, synthesized by the method described in WO2014/050992A.

B-11: N,N'-Methylenebisacrylamide, manufactured by Wako Pure Chemical Industries, Ltd., 043701, C log P value: −0.943

B-12: Ditrimethylol Propane Tetraacrylate, manufactured by SHIN-NAKAMURA CHEMICAL CO., LTD., AD-TMP, C log P value: 5.908

[Component C]

C-1: 2-acrylamide-2-methylpropane sulfonic acid, manufactured by TOKYO CHEMICAL INDUSTRY CO., LTD.

C-2: 3-Sulfopropyl acrylate potassium salt, manufactured by Sigma-Aldrich Co. LLC., 251631

C-3: 2-Sulfoethyl methacrylate, manufactured by Polysciences, Inc., 02597

[Component D]

D-1: hydroxyethyl acrylamide, manufactured by TOKYO CHEMICAL INDUSTRY CO., LTD.

D-2: hydroxyethyl acrylate, manufactured by TOKYO CHEMICAL INDUSTRY CO., LTD.

D-3: hydroxybutyl acrylate, manufactured by TOKYO CHEMICAL INDUSTRY CO., LTD.

D-4: hydroxyethyl methacrylate, manufactured by TOKYO CHEMICAL INDUSTRY CO., LTD.

[Surfactant]

Tego glide 100: manufactured by Evonik

Tego airex 901W: manufactured by Evonik

[Polymerization Initiator]

Darocur 1173: manufactured by BASF SE

VA-67: manufactured by Wako Pure Chemical Industries, Ltd.

[Neutralizer (Alkali Metal Compound)]

NaOH: manufactured by Wako Pure Chemical Industries, Ltd.

[Polymerization Inhibitor]

MEHQ: monomethyl ether hydroquinone, manufactured by TOKYO CHEMICAL INDUSTRY CO., LTD.

[Solvent]

Pure water: manufactured by Wako Pure Chemical Industries, Ltd.

IPA: isopropyl alcohol, manufactured by Wako Pure Chemical Industries, Ltd.

(A-1) 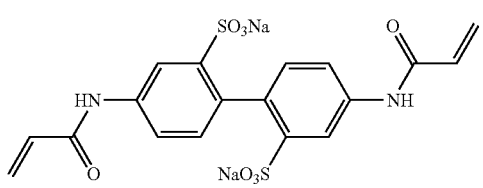

(A-2) 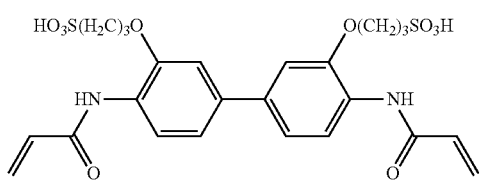

(A-3) 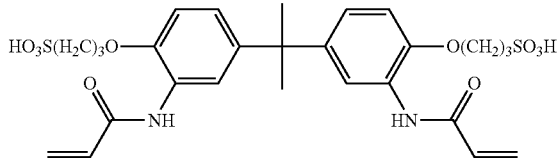

(A-4) 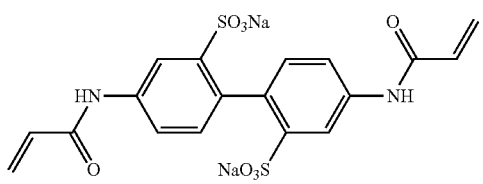

(A'-4) 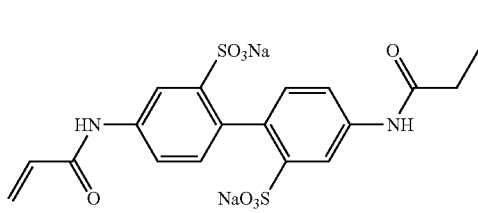

(B-9) 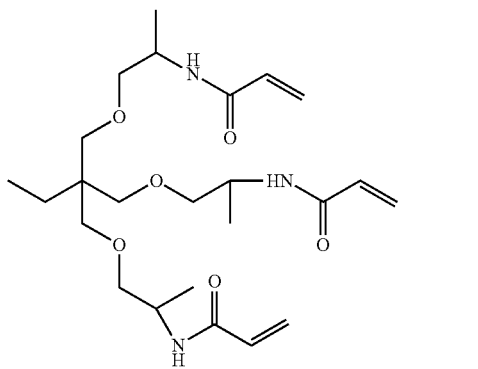

(B-10) 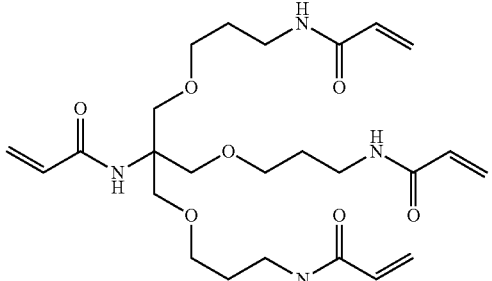

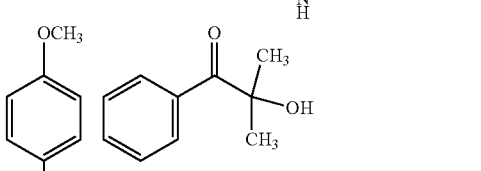

MEHQ  Darocur 1173

VA-67 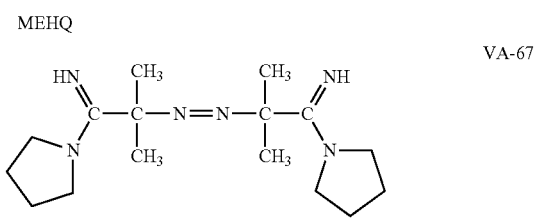

(Synthesis of A-4 Containing A'-4)

A-4 was synthesized by performing the following synthesis step and purification step.

<Synthesis Step>

In a nitrogen atmosphere, 650 mL of deionized water was put into a three-neck flask and stirred at room temperature, and in this state, 650.0 g (1.89 mol) of 4,4'-benzidine-2,2'-disulfonic acid (manufactured by TOKYO CHEMICAL INDUSTRY CO., LTD., product number: B0395) was added thereto. Then, while the solution was being stirred with ice cooling, 604.0 g (3.78 mol) of a 25 w/v % aqueous sodium hydroxide solution (manufactured by Wako Pure Chemical Industries, Ltd., product number: 191-11675) was added dropwise thereto. After the dropwise addition, 301.3 g (3.59 mol) of sodium hydrogen carbonate (manufactured by Wako Pure Chemical Industries, Ltd., product number: 195-01303) was added thereto, and 443.4 g (3.49 mol) of 3-chloropropionyl chloride (manufactured by TOKYO CHEMICAL INDUSTRY CO., LTD., product number: C0654) was added dropwise thereto. After the dropwise addition ended, the solution was stirred for 2 hours at room temperature, and the obtained reaction solution was filtered. The obtained reaction solution was moved to a new three-neck flask, 1.8 g (0.01 mol) of 4-hydroxy-2,2,6,6-tetramethylpiperidin-1-oxyl free radicals (manufactured by TOKYO CHEMICAL INDUSTRY CO., LTD., product number: H0865) were added thereto and dissolved by stirring, and the solution was ice-cooled. While the solution was being stirred with ice cooling, 604.0 g (7.55 mol) of a 50 w/v % aqueous sodium hydroxide solution (manufactured by Wako Pure Chemical Industries, Ltd., product number: 198-13025) was added dropwise thereto. After the dropwise addition ended, the solution was stirred for 2 hours with ice cooling. Then, hydrochloric acid (manufactured by Wako Pure Chemical Industries, Ltd., product number: 080-01061) was added dropwise thereto such that the pH thereof became 8 to 11.

After the dropwise addition, the solution was stirred for 30 minutes, and the obtained crystals were filtered. Thereafter, the crystals were washed with 1000.0 mL acetone in which 0.18 g (1.05 mmol) of 4-hydroxy-2,2,6,6-tetramethylpiperidine 1-oxyl free radicals were dissolved in advance.

<Purification Step>

2166.7 mL of acetone, 433.3 mL of deionized water, and 0.70 g (4.08 mmol) of 4-hydroxy-2,2,6,6-tetramethylpiperidine 1-oxyl free radicals were put into a three-neck flask and cooled with ice. The crystals obtained in the previous step were added thereto, stirred for 2 hours, and separated by filtration. The obtained crystals were dried for 12 hours at 40° C., thereby obtaining 609.1 g (yield: 65%) of intended A-4 containing A'-4.

Through $^1$H-NMR analysis, it was found that the content of the A'-4 with respect to the total mass of A-4 and A'-4 is 2.4% by mass.

The amount of the 50 w/v % aqueous sodium hydroxide solution added dropwise in the synthesis step was reduced to 582.8 g (7.29 mol), 555.56 g (6.94 mol), and 528.5 g (6.60 mol). As a result, the content of A'-4 with respect to the total mass of A-4 and A'-4 became 5.2% by mass, 8.0% by mass, and 10.4% by mass.

In Example 32, A-4 containing A'-4 was used in which the content of A'-4 with respect to the total mass of A-4 and A'-4 was 2.4% by mass.

In Example 33, A-4 containing A'-4 was used in which the content of A'-4 with respect to the total mass of A-4 and A'-4 was 5.2% by mass.

In Example 34, A-4 containing A'-4 was used in which the content of A'-4 with respect to the total mass of A-4 and A'-4 was 8.0% by mass.

In Example 35, A-4 containing A'-4 was used in which the content of A'-4 with respect to the total mass of A-4 and A'-4 was 10.4% by mass.

Example 36

<Evaluation of Storage Stability>

A-1 used in Example 29 was stored for 1 week in an environment with a temperature of 70° C. and a relative humidity of 60%, then made into a 40% by mass aqueous solution, and evaluated regarding the generation of water-insoluble material by measuring turbidity.

By using a haze meter (manufactured by NIPPON DENSHOKU INDUSTRIES Co., LTD: NDH 2000), the turbidity was measured twice by measuring the turbidity before the storage for 1 week (turbidity (initial value)) and measuring the turbidity after the storage for 1 week (turbidity (50° C., 70% RH, 1 week)).

The smaller the difference between the results measured twice as described above, the better the storage stability.

The measurement results are described in Table 5.

In Table 5, the unit of numerical values in the column of each component is part by mass, and "—" in the table means that the example does not contain the corresponding component. The turbidity was calculated by the following equation. As a standard liquid, ultrapure water was used. The unit of the turbidity is %.

Turbidity=scattered light/total light transmittance×100

Example 37

The storage stability was evaluated in the same manner as in Example 36, except that A-1 in Example 36 was changed to A-4 containing A'-4 in which the content of A'-4 with respect to the total mass of A-4 and A'-4 was 2.4% by mass.

The evaluation results are described in Table 5.

Example 38

The storage stability was evaluated in the same manner as in Example 36, except that A-1 in Example 36 was changed to A-4 containing A'-4 in which the content of A'-4 with respect to the total mass of A-4 and A'-4 was 5.2% by mass.

The evaluation results are described in Table 5.

Example 39

The storage stability was evaluated in the same manner as in Example 36, except that A-1 in Example 36 was changed to A-4 containing A'-4 in which the content of A'-4 with respect to the total mass of A-4 and A'-4 was 8.0% by mass.

The evaluation results are described in Table 5.

Example 40

The storage stability was evaluated in the same manner as in Example 36, except that A-1 in Example 36 was changed to A-4 containing A'-4 in which the content of A'-4 with respect to the total mass of A-4 and A'-4 was 10.4% by mass.

The evaluation results are described in Table 5.

TABLE 5

|  |  | Example | | | | |
|---|---|---|---|---|---|---|
|  | Compound | 36 | 37 | 38 | 39 | 40 |
| Component | A-1 | 100 | — | — | — | — |
|  | A-4 | — | 97.6 | 94.8 | 92.0 | 89.6 |
|  | A'-4 | — | 2.4 | 5.2 | 8.0 | 10.4 |
| Storage stability | Turbidity (initial value) | 5 | 6 | 4 | 5 | 5 |
|  | Turbidity (50° C. 70% RH, 1 week) | 95 | 7 | 5 | 5 | 6 |

A-4 used in Examples 37 to 40 contained the component A'-4. As a result, the turbidity changed little even after the storage for 1 week, the occurrence of water-insoluble materials was inhibited, and the storage stability was improved.

EXPLANATION OF REFERENCES

1: membrane
2: flow of water separated from feed solution
3: flow channel of feed solution
4: flow channel of draw solution
5: movement direction of liquid
10: flow channel of water permeability measurement device

What is claimed is:

1. A functional polymer membrane comprising:
   a polymer compound having a constitutional unit represented by Formula I as a constitutional unit A, a constitutional unit represented by Formula I' as a constitutional unit A', and a constitutional unit derived from a polyfunctional monomer having a C log P value of equal to or greater than −0.3 to less than 3.0 as a constitutional unit B,

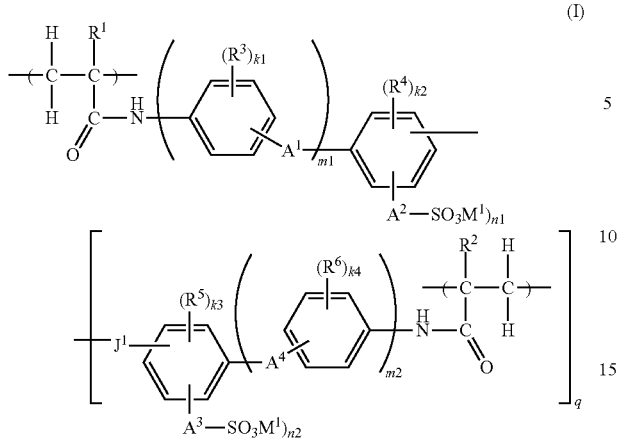

(I)

in Formula I, $R^1$ and $R^2$ each independently represent a hydrogen atom or an alkyl group; $R^3$ to $R^6$ each independently represent a substituent; k1 and k4 each independently represent an integer of 0 to 4; k2 and k3 each independently represent an integer of 0 to 3; in a case where there is a plurality of groups represented by at least any one of $R^3$, $R^4$, $R^5$, or $R^6$, $R^3$ to $R^6$ may be the same as or different from each other and may form a ring by being bonded to each other; $A^1$ to $A^4$ each independently represent a single bond or a divalent linking group; $M^1$ represents a hydrogen atom, an organic base ion, or a metal ion; n1 and n2 each independently represent an integer of 1 to 4; m1 and m2 each independently represent 0 or 1; $J^1$ represents a single bond, —O—, —S—, —SO$_2$—, —CO—, —CR$^7$R$^8$—, or an alkenylene group; $R^7$ and $R^8$ each independently represent a hydrogen atom, an alkyl group, or a halogen atom; p represents an integer of equal to or greater than 1; and q represents an integer of 1 to 4,

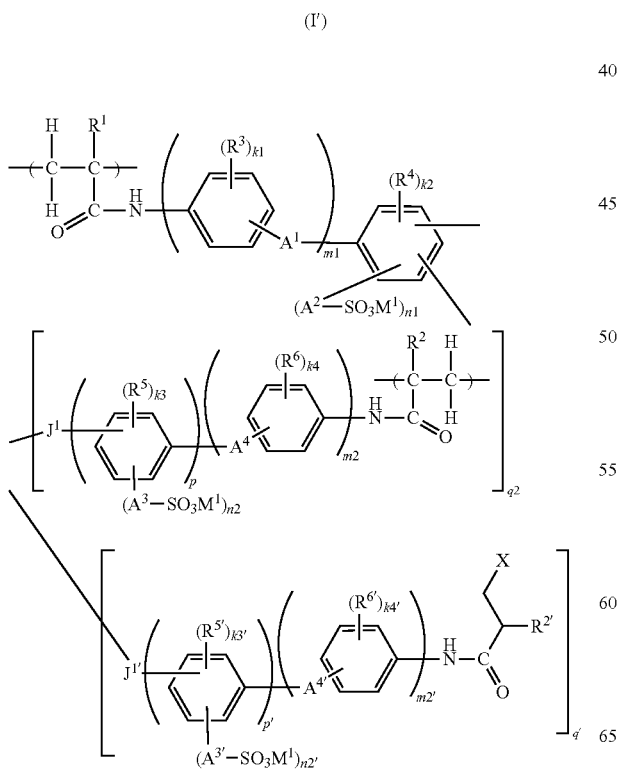

(I')

in Formula I', $R^1$, $R^2$, and $R^{2'}$ each independently represent a hydrogen atom or an alkyl group; $R^3$ to $R^6$, $R^{5'}$, and $R^{6'}$ each independently represent a substituent; k1, k4, and k4' each independently represent an integer of 0 to 4; k2, k3, and k3' each independently represent an integer of 0 to 3; in a case where there is a plurality of groups represented by at least any one of $R^3$, $R^4$, $R^5$, $R^6$, $R^{5'}$, or $R^{6'}$, $R^3$ to $R^6$, $R^{5'}$, and $R^{6'}$ may be the same as or different from each other or may form a ring by being bonded to each other; $A^1$ to $A^4$, $A^{3'}$, and $A^{4'}$ each independently represent a single bond or a divalent linking group; $M^1$ represents a hydrogen atom, an organic base ion or a metal ion; n1, n2, and n2' each independently represent an integer of 1 to 4; m1, m2, and m2' each independently represent 0 or 1; $J^1$ and $J^{1'}$ each independently represent a single bond, —O—, —S—, —SO$_2$—, —CO—, —CR$^7$R$^8$—, or an alkenylene group; $R^7$ and $R^8$ each independently represent a hydrogen atom, an alkyl group, or a halogen atom; p represents an integer of equal to or greater than 1; p' represents an integer of equal to or greater than 1; q2 represents an integer of 0 to 3; q' represents an integer of 1 to 4; and X represents a halogen atom.

2. The functional polymer membrane according to claim 1, wherein the constitutional unit B is represented by Formula CR-1 or CR-2,

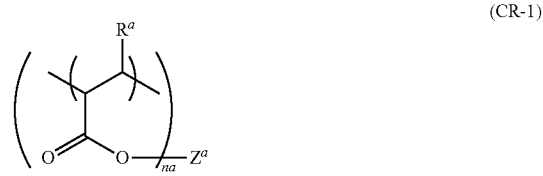

(CR-1)

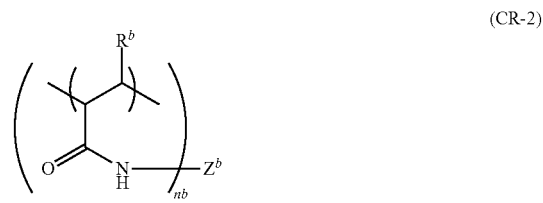

(CR-2)

in Formula CR-1, na represents an integer of equal to or greater than 2, $Z^a$ represents an na-valent organic group, and $R^a$ each independently represents a hydrogen atom or a methyl group, in Formula CR-2, nb represents an integer of equal to or greater than 2, $Z^b$ represents an nb-valent organic group, and $R^b$ each independently represents a hydrogen atom or a methyl group.

3. The functional polymer membrane according to claim 1, wherein the constitutional unit B contains a constitutional unit derived from a (meth)acrylamide compound and/ or a constitutional unit derived from a (meth)acrylate compound.

4. The functional polymer membrane according to claim 1, wherein the constitutional unit B contains a constitutional unit derived from a (meth)acrylate compound.

5. The functional polymer membrane according to claim 1, wherein a content of the constitutional unit A is equal to or greater than 10% by mass to less than 70% by mass with respect to a dry mass of the functional polymer membrane.

6. The functional polymer membrane according to claim 1, wherein a content of the constitutional unit B is equal to or greater than 1% by mass to less than 25% by mass with respect to a dry mass of the functional polymer membrane.

7. The functional polymer membrane according to claim 1, wherein the polymer compound further contains, as a constitutional unit C, a constitutional unit derived from a monofunctional monomer having an anionic group.

8. The functional polymer membrane according to claim 7, wherein the constitutional unit C contains a sulfo group or a salt thereof.

9. The functional polymer membrane according to claim 7, wherein a content of the constitutional unit C is equal to or greater than 5% by mass to less than 40% by mass with respect to a dry mass of the functional polymer membrane.

10. The functional polymer membrane according to claim 1, wherein the polymer compound further contains, as a constitutional unit D, a constitutional unit derived from a monofunctional monomer not having an ionic group.

11. The functional polymer membrane according to claim 10, wherein the constitutional unit D contains a constitutional unit derived from a (meth)acrylamide compound and/or a constitutional unit derived from a (meth)acrylate compound.

12. The functional polymer membrane according to claim 10, wherein the constitutional unit D contains a constitutional unit derived from a (meth)acrylate compound.

13. The functional polymer membrane according to claim 10, wherein a content of the constitutional unit D is equal to or greater than 5% by mass to less than 25% by mass with respect to a dry mass of the functional polymer membrane.

14. The functional polymer membrane according to claim 1, wherein a content of the constitutional unit A' in the polymer compound is equal to or greater than 0.1% by mass to less than 10% by mass with respect to a total mass of the constitutional unit A and the constitutional unit A'.

15. The functional polymer membrane according to claim 1, further comprising: a porous support.

16. The functional polymer membrane according to claim 1 that is an ion-exchange membrane.

17. A separation membrane module comprising: the functional polymer membrane according to claim 1.

18. An ion-exchange device comprising: the functional polymer membrane according to claim 1.

19. A composition for forming a functional polymer membrane, comprising:
a monomer represented by Formula II as a component A;
a monomer represented by Formula II' as a component A'; and
a polyfunctional monomer having a C log P value of equal to or greater than −0.3 to less than 3.0 as a component B,

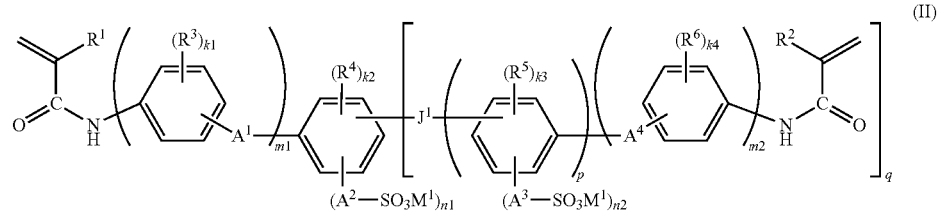

in Formula II, $R^1$ and $R^2$ each independently represent a hydrogen atom or an alkyl group; $R^3$ to $R^6$ each independently represent a substituent; k1 and k4 each independently represent an integer of 0 to 4; k2 and k3 each independently represent an integer of 0 to 3; in a case where there is a plurality of groups represented by at least any one of $R^3$, $R^4$, $R^5$, or $R^6$, $R^3$ to $R^6$ may be the same as or different from each other and may form a ring by being bonded to each other; $A^1$ to $A^4$ each independently represent a single bond or a divalent linking group; $M^1$ represents a hydrogen atom, an organic base ion, or a metal ion; n1; and n2 each independently represent an integer of 1 to 4; m1 and m2 each independently represent 0 or 1; $J^1$ represents a single bond, —O—, —S—, —SO$_2$—, —CO—, —CR$^7$R$^8$—, or an alkenylene group; $R^7$ and $R^8$ each independently represent a hydrogen atom, an alkyl group, or a halogen atom; p represents an integer of equal to or greater than 1; and q represents an integer of 1 to 4,

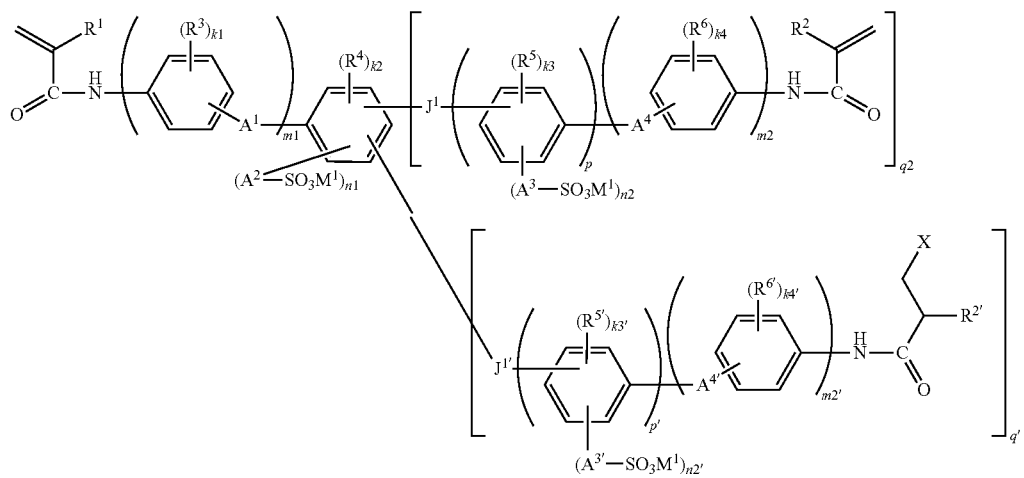

(II′)

in Formula II′, $R^1$, $R^2$, and $R^{2\prime}$ each independently represent a hydrogen atom or an alkyl group; $R^3$ to $R^6$, $R^{5\prime}$, and $R^{6\prime}$ each independently represent a substituent; k1, k4, and k4′ each independently represent an integer of 0 to 4; k2, k3, and k3′ each independently represent an integer of 0 to 3; in a case where there is a plurality of groups represented by at least any one of $R^3$, $R^4$, $R^5$, $R^6$, $R^{5\prime}$, or $R^{6\prime}$, $R^3$ to $R^6$, $R^{5\prime}$, and $R^{6\prime}$ may be the same as or different from each other and may form a ring by being bonded to each other; $A^1$ to $A^4$, $A^{3\prime}$, and $A^{4\prime}$ each independently represent a single bond or a divalent linking group; $M^1$ represents a hydrogen atom, an organic base ion, or a metal ion; n1, n2, and n2′ each independently represent an integer of 1 to 4; m1, m2, and m2′ each independently represent 0 or 1; $J^1$ and $J^{1\prime}$ each independently represent a single bond, —O—, —S—, —SO$_2$—, —CO—, —CR$^7$R$^8$—, or an alkenylene group; $R^7$ and $R^8$ each independently represent a hydrogen atom, an alkyl group, or a halogen atom; p represents an integer of equal to or greater than 1; p′ represents an integer of equal to or greater than 1; q2 represents an integer of 0 to 3; q′ represents an integer of 1 to 4; and X represents a halogen atom.

* * * * *